US011983326B2

(12) United States Patent
Lacey

(10) Patent No.: US 11,983,326 B2
(45) Date of Patent: May 14, 2024

(54) HAND GESTURE INPUT FOR WEARABLE SYSTEM

(71) Applicant: Magic Leap, Inc., Plantation, FL (US)

(72) Inventor: Paul Lacey, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/185,597

(22) Filed: Feb. 25, 2021

(65) Prior Publication Data
US 2021/0263593 A1    Aug. 26, 2021

Related U.S. Application Data

(60) Provisional application No. 63/027,272, filed on May 19, 2020, provisional application No. 62/981,934, filed on Feb. 26, 2020.

(51) Int. Cl.
| | | |
|---|---|---|
| *G06F 3/01* | (2006.01) | |
| *G02B 27/00* | (2006.01) | |
| *G06V 40/20* | (2022.01) | |

(52) U.S. Cl.
CPC ......... *G06F 3/017* (2013.01); *G02B 27/0093* (2013.01); *G06V 40/28* (2022.01)

(58) Field of Classification Search
CPC .. G06F 3/017; G02B 27/0093; G06K 9/00355
USPC ........................................................ 715/763
See application file for complete search history.

(56) References Cited

U.S. PATENT DOCUMENTS

| | | | | |
|---|---|---|---|---|
| 10,296,102 | B1* | 5/2019 | Misra | G06T 7/215 |
| 2010/0235034 | A1* | 9/2010 | Higgins | G06F 3/017 |
| | | | | 701/28 |
| 2012/0062736 | A1* | 3/2012 | Xiong | G06F 3/0425 |
| | | | | 382/199 |

(Continued)

FOREIGN PATENT DOCUMENTS

| | | | | | |
|---|---|---|---|---|---|
| CN | 106355598 | A | * | 1/2017 | G06T 5/002 |
| EP | 2872967 | A2 | | 5/2015 | |

(Continued)

OTHER PUBLICATIONS

International Application No. PCT/US2021/019677, International Search Report and Written Opinion dated May 6, 2021, 7 pages.

(Continued)

*Primary Examiner* — Hwei-Min Lu
(74) *Attorney, Agent, or Firm* — KILPATRICK TOWNSEND & STOCKTON LLP

(57) ABSTRACT

Techniques are disclosed for allowing a user's hands to interact with virtual objects. An image of at least one hand may be received from an image capture devices. A plurality of keypoints associated with at least one hand may be detected. In response to determining that a hand is making or is transitioning into making a particular gesture, a subset of the plurality of keypoints may be selected. An interaction point may be registered to a particular location relative to the subset of the plurality of keypoints based on the particular gesture. A proximal point may be registered to a location along the user's body. A ray may be cast from the proximal point through the interaction point. A multi-DOF controller for interacting with the virtual object may be formed based on the ray.

20 Claims, 36 Drawing Sheets

(56) References Cited

U.S. PATENT DOCUMENTS

| | | | |
|---|---|---|---|
| 2013/0057469 A1* | 3/2013 | Ajika | G06T 7/73 345/156 |
| 2013/0265218 A1* | 10/2013 | Moscarillo | G06F 3/0426 345/156 |
| 2014/0201674 A1 | 7/2014 | Holz | |
| 2015/0062004 A1* | 3/2015 | Rafii | G06F 3/011 345/156 |
| 2015/0117708 A1* | 4/2015 | Guigues | G06T 7/246 382/103 |
| 2015/0153833 A1* | 6/2015 | Pinault | G06F 3/011 345/156 |
| 2015/0370321 A1* | 12/2015 | Lundberg | G06T 19/006 382/190 |
| 2016/0179205 A1* | 6/2016 | Katz | G06F 3/013 345/156 |
| 2016/0188109 A1* | 6/2016 | Wang | G06F 3/0418 345/173 |
| 2017/0277963 A1* | 9/2017 | Matsunami | G06V 40/50 |
| 2017/0315615 A1 | 11/2017 | Cook et al. | |
| 2017/0371403 A1* | 12/2017 | Wetzler | G06F 18/00 |
| 2018/0275764 A1* | 9/2018 | Lee | G06V 40/28 |
| 2018/0300952 A1* | 10/2018 | Evans | G06F 9/453 |
| 2019/0108676 A1 | 4/2019 | Holz | |
| 2019/0180473 A1* | 6/2019 | Guleryuz | G06V 40/10 |
| 2019/0212827 A1* | 7/2019 | Kin | G02B 27/0172 |
| 2019/0355180 A1 | 11/2019 | Powderly et al. | |
| 2020/0225736 A1* | 7/2020 | Schwarz | G06T 19/006 |
| 2020/0225757 A1* | 7/2020 | Schwarz | G06F 3/017 |
| 2020/0226814 A1* | 7/2020 | Tang | G06F 3/0304 |
| 2020/0388247 A1* | 12/2020 | Ravasz | G09G 5/377 |
| 2021/0090332 A1* | 3/2021 | Ravasz | G06V 40/107 |

FOREIGN PATENT DOCUMENTS

| | | |
|---|---|---|
| WO | 2019032967 A1 | 2/2019 |
| WO | 2021173839 A1 | 9/2021 |

OTHER PUBLICATIONS

Zhu et al., Real-Time Hand Gesture Recognition with Kinect for Playing Racing Video Games, 2014 International Joint Conference on Neural Networks (IJCNN), Available Online at http://boyuan.global-optimization.com/Mypaper/IJCNN2014-190.pdf, Jul. 11, 2014, pp. 3240-3246.

Application No. PCT/US2021/019677, "International Preliminary Report on Patentability", dated Sep. 9, 2022, 6 pages.

European Application No. 21761499.9, "Extended European Search Report", dated Jul. 19, 2023, 8 pages.

* cited by examiner

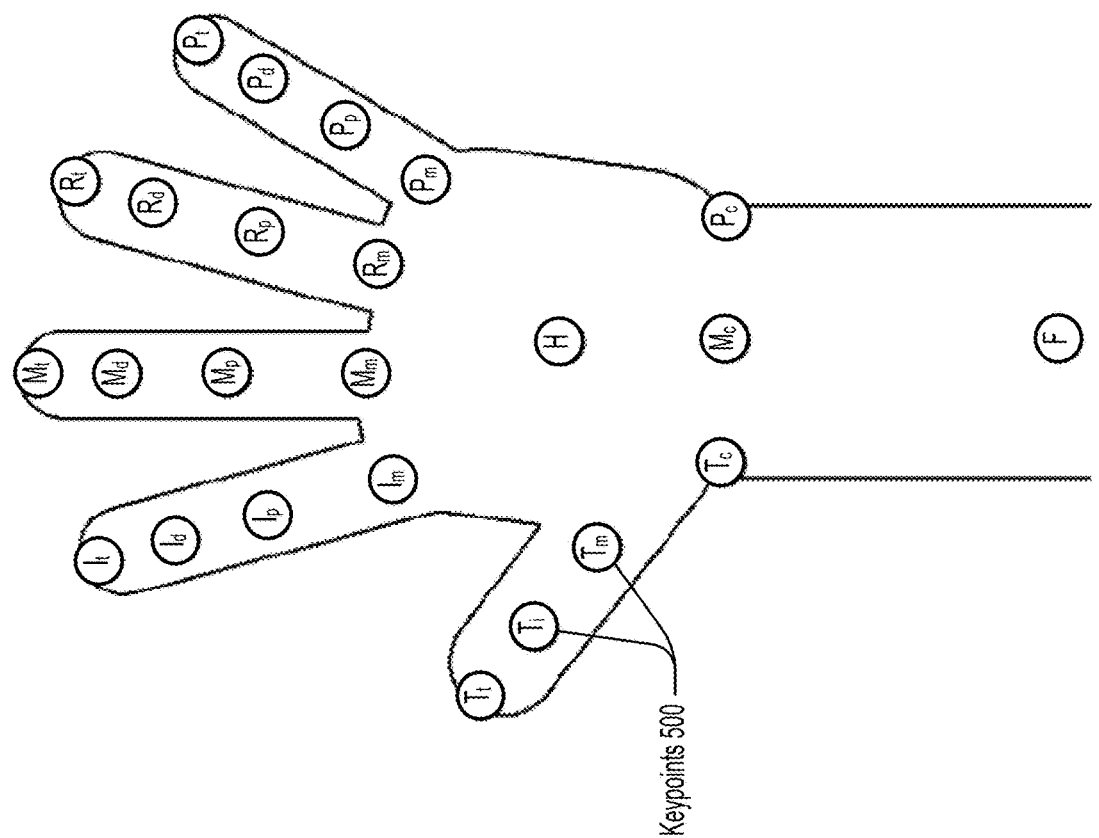

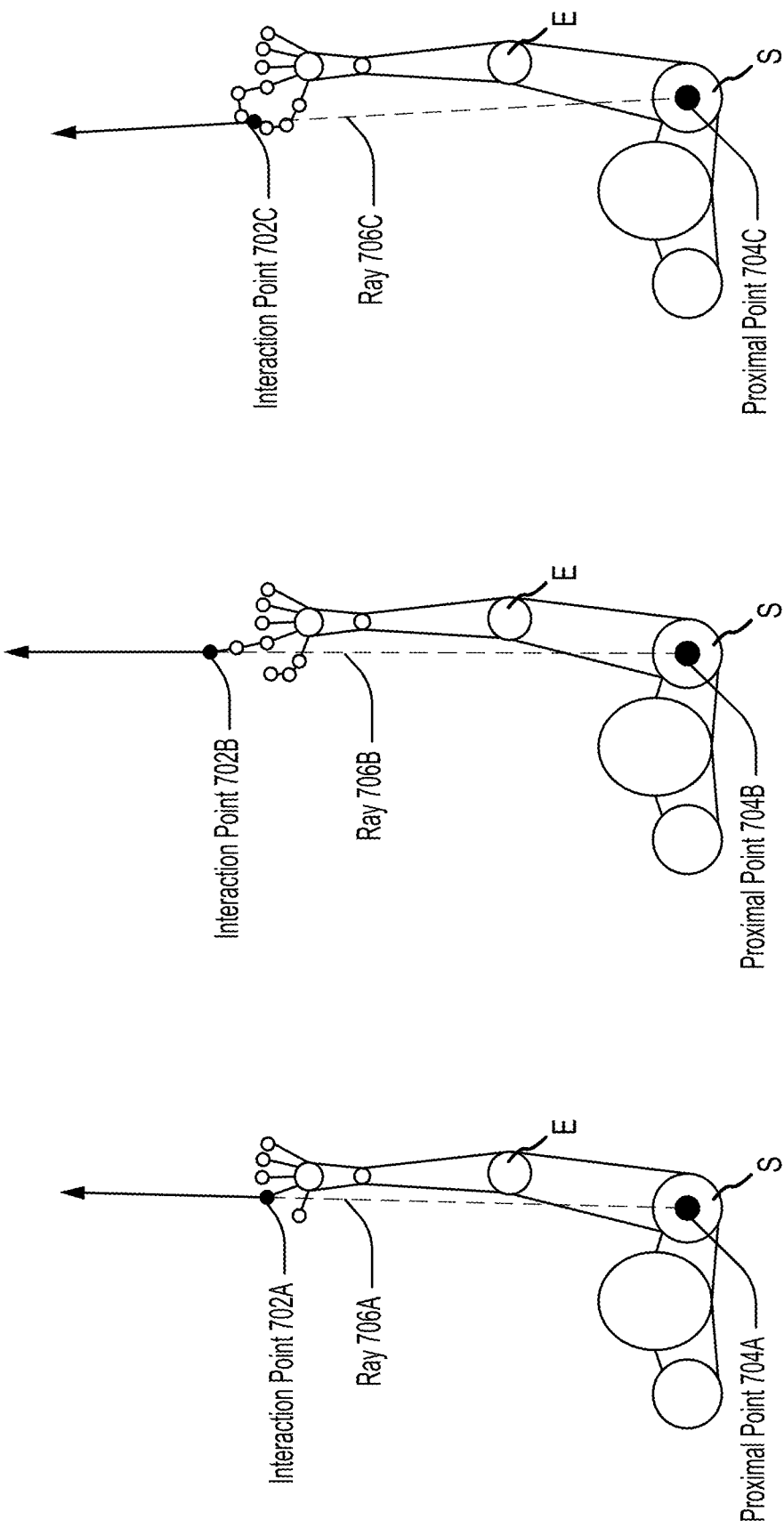

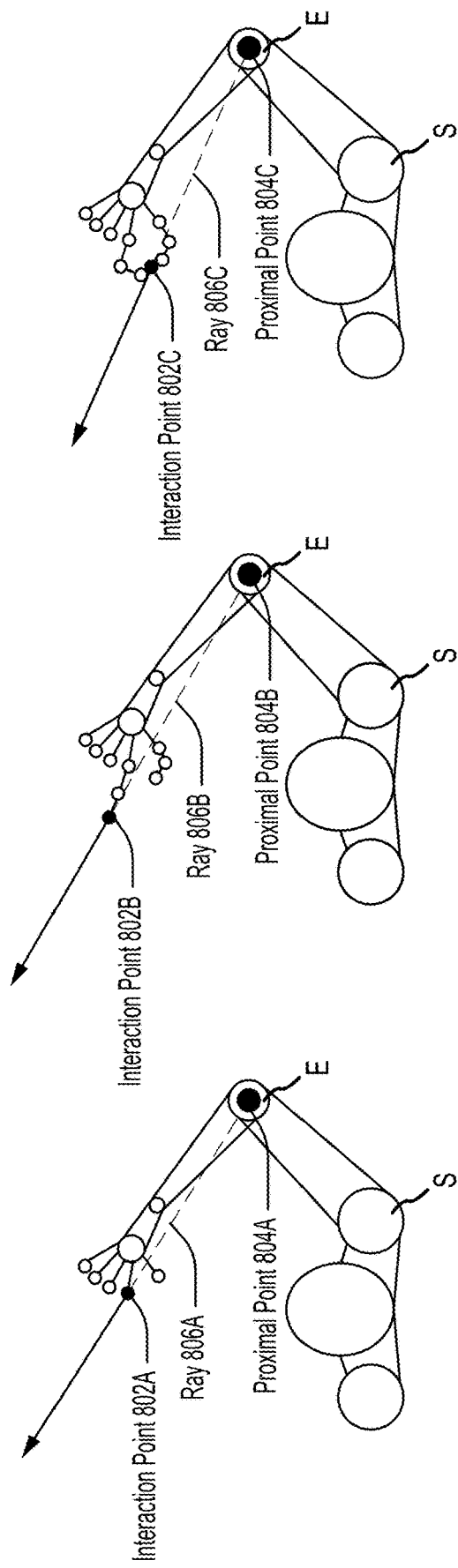

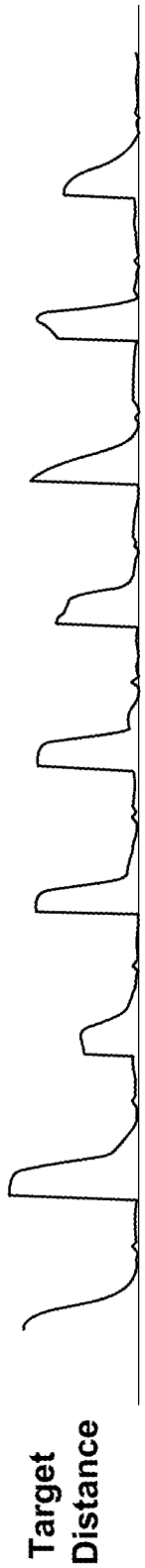
FIG. 17A Target Distance
FIG. 17B Angular Distance
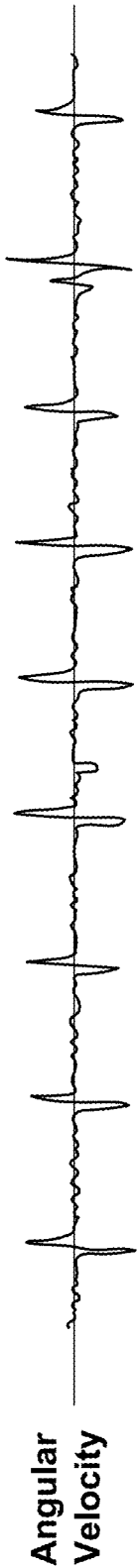
FIG. 17C Angular Velocity
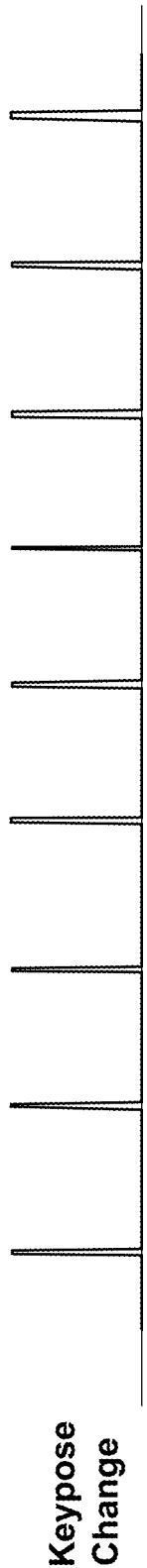
FIG. 17D Keypose Change

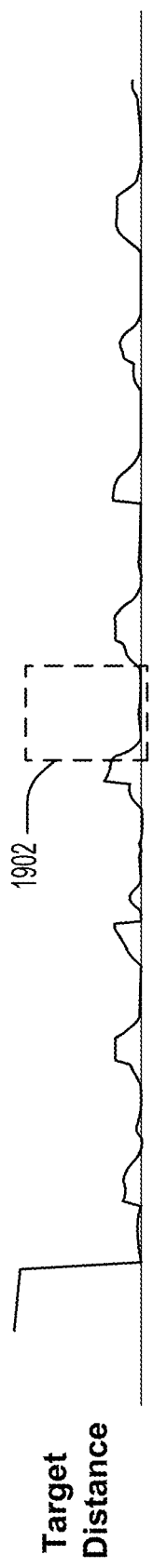
FIG. 19A — Target Distance
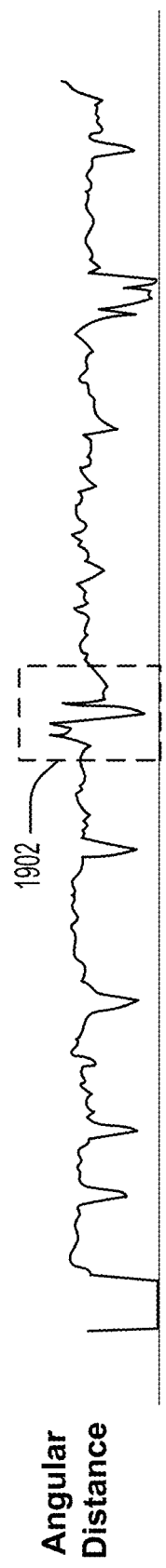
FIG. 19B — Angular Distance
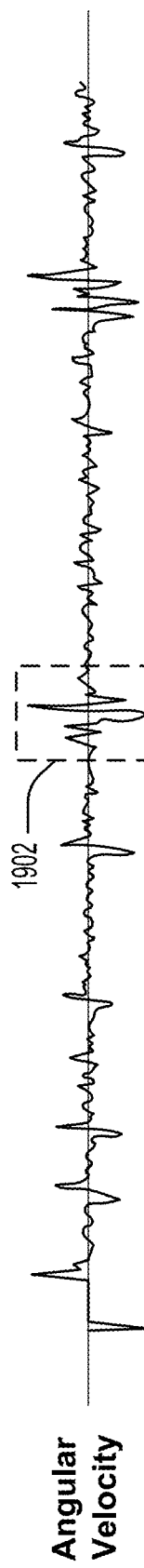
FIG. 19C — Angular Velocity
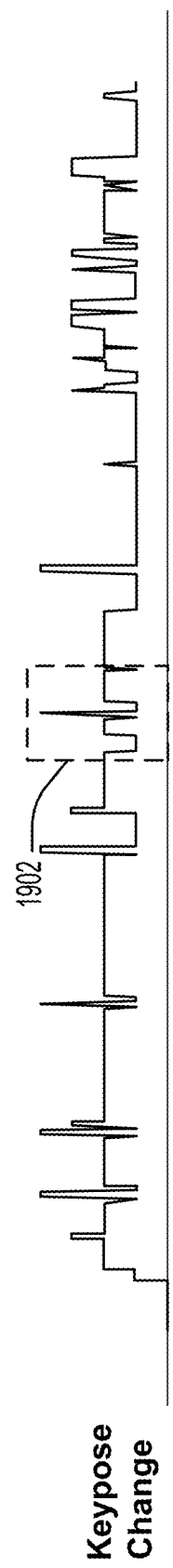
FIG. 19D — Keypose Change

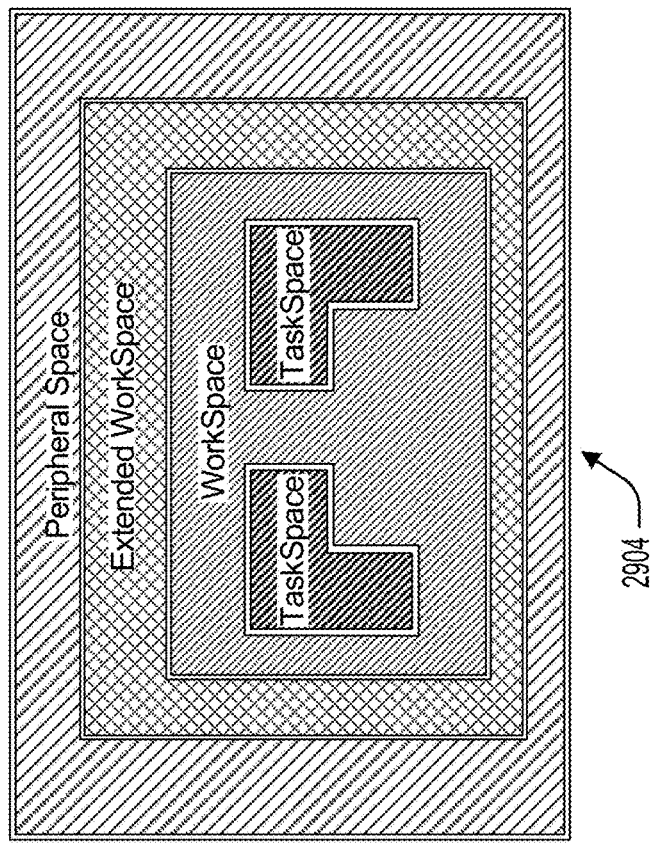
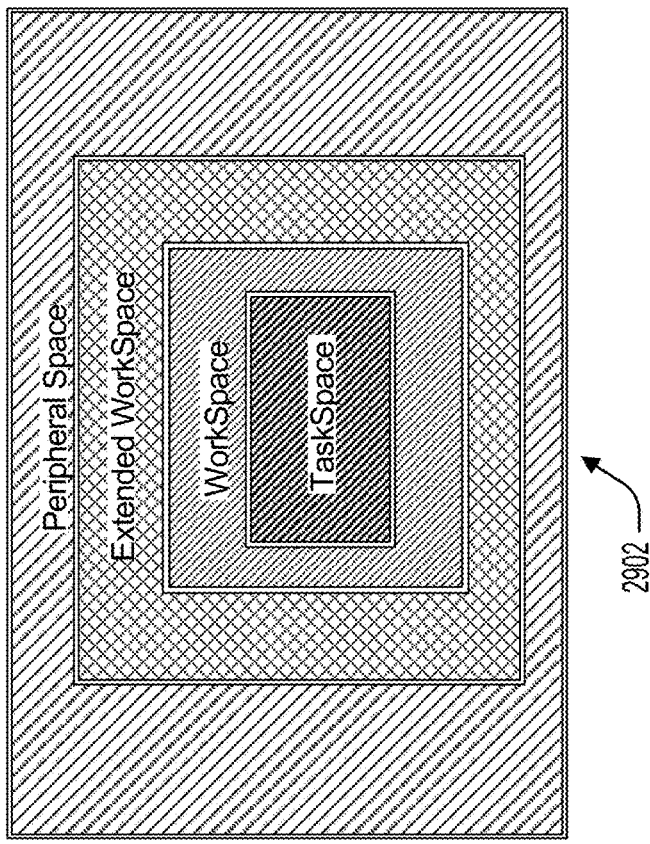
FIG. 29

HAND GESTURE INPUT FOR WEARABLE SYSTEM

CROSS-REFERENCES TO RELATED APPLICATIONS

This application claims the benefit of priority to U.S. Provisional Patent Application No. 62/981,934, filed Feb. 26, 2020, entitled "HAND GESTURE INPUT FOR WEARABLE SYSTEM," and U.S. Provisional Patent Application No. 63/027,272, filed May 19, 2020, entitled "HAND GESTURE INPUT FOR WEARABLE SYSTEM," the entire contents of which are incorporated herein by reference for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide methods for operating an augmented reality (AR), virtual reality (VR), or mixed reality (MR) wearable system in which user hand gestures are used to interact within a virtual environment.

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of interacting with a virtual object, the method comprising: receiving an image of a user's hand; analyzing the image to detect a plurality of keypoints associated with the user's hand; determining, based on analyzing the image, whether the user's hand is making or is transitioning into making a gesture from a plurality of gestures; and in response to determining that the user's hand is making or is transitioning into making the gesture: determining a particular location relative to the plurality of keypoints, wherein the particular location is determined based on the plurality of keypoints and the gesture; registering an interaction point to the particular location; and forming a multi-DOF controller for interacting with the virtual object based on the interaction point.

Example 2 is a system configured to perform the method of example(s) 1.

Example 3 is a non-transitory machine-readable medium comprising instructions that, when executed by one or more processors, cause the one or more processors to perform the method of example(s) 1.

Example 4 is a method of interacting with a virtual object, the method comprising: receiving an image of a user's hand from one or more image capture devices of a wearable system; analyzing the image to detect a plurality of keypoints associated with the user's hand; determining, based on analyzing the image, whether the user's hand is making or is transitioning into making a particular gesture from a plurality of gestures; in response to determining that the user's hand is making or is transitioning into making the particular gesture: selecting a subset of the plurality of keypoints that correspond to the particular gesture; determining a particular location relative to the subset of the plurality of keypoints, wherein the particular location is determined based on the subset of the plurality of keypoints and the particular gesture; registering an interaction point to the particular location; registering a proximal point to a location along the user's body; casting a ray from the proximal point through the interaction point; and forming a multi-DOF controller for interacting with the virtual object based on the ray.

Example 5 is the method of example(s) 4, wherein the plurality of gestures includes at least one of a grasping gesture, a pointing gesture, or a pinching gesture.

Example 6 is the method of example(s) 4, wherein the subset of the plurality of keypoints is selected from a plurality of subsets of the plurality of keypoints, wherein each of the plurality of subsets of the plurality of keypoints corresponds to a different gesture from the plurality of gestures.

Example 7 is the method of example(s) 4, further comprising: displaying a graphical representation of the multi-DOF controller.

Example 8 is the method of example(s) 4, wherein the location to which the proximal point is registered is at an estimated location of the user's shoulder, an estimated location of the user's elbow, or between the estimated location of the user's shoulder and the estimated location of the user's elbow.

Example 9 is the method of example(s) 4, further comprising: capturing, by an image capture device, the image of the user's hand.

Example 10 is the method of example(s) 9, wherein the image capture device is an element of a wearable system.

Example 11 is the method of example(s) 9, wherein the image capture device is mounted to a headset of a wearable system.

Example 12 is the method of example(s) 4, further comprising: determining, based on analyzing the image, whether the user's hand is performing an action event.

Example 13 is the method of example(s) 12, further comprising: in response to determining that the user's hand is performing the action event, modifying the virtual object based on the multi-DOF controller and the action event.

Example 14 is the method of example(s) 13, wherein the user's hand is determined to be performing the action event based on the particular gesture.

Example 15 is the method of example(s) 4, wherein the user's hand is determined to be making or transitioning into making the particular gesture based on the plurality of keypoints.

Example 16 is the method of example(s) 15, wherein the user's hand is determined to be making or transitioning into making the particular gesture based on a neural network inference using the plurality of keypoints.

Example 17 is the method of example(s) 4, wherein the user's hand is determined to be making or transitioning into making the particular gesture based on a neural network inference using the image.

Example 18 is the method of example(s) 4, wherein a plurality of keypoints are on the user's hand.

Example 19 is the method of example(s) 4, wherein the multi-DOF controller is a 6-DOF controller.

Example 20 is a system configured to perform the methods of any of example(s) 4-19.

Example 21 is a non-transitory machine-readable medium comprising instructions that, when executed by one or more processors, cause the one or more processors to perform the methods of any of example(s) 4-19.

Example 22 is a method comprising: receiving a sequence of images of a user's hand; analyzing each image in the sequence of images to detect a plurality of keypoints on the user's hand; determining, based on analyzing one or more images in the sequence of images, whether the user's hand is making or transitioning to making any of a plurality of different gestures; in response to a determination that the user's hand is making or transitioning to making a particular one of the plurality of different gestures: selecting, from among a plurality of locations relative to the plurality of keypoints that correspond to the plurality of different gestures, respectively, a particular location relative to the plurality of keypoints that corresponds to the particular gesture; selecting, from among a plurality of different subsets of the plurality of keypoints that correspond to the plurality of different gestures, respectively, a particular subset of the plurality of keypoints that corresponds to the particular gesture; while the user's hand is determined to be making or transitioning to making the particular gesture: registering an interaction point to the particular location relative to the plurality of keypoints on the user's hand; registering a proximal point to an estimated location of the user's shoulder, to an estimated location of the user's elbow, or to a location along the user's upper arm between the estimated location of the user's shoulder and the estimated location of the user's elbow; casting a ray from the proximal point through the interaction point; displaying a graphical representation of a multi-DoF controller that corresponds to the ray; and repositioning and/or reorienting the multi-DoF controller based on the locations of the interaction point, the proximal point, and the particular subset of the plurality of keypoints.

Example 23 is the method of example(s) 22, wherein the sequence of images are received from one or more outward-facing cameras on a headset.

Example 24 is the method of example(s) 22, wherein the plurality of different gestures includes at least one of a grasping gesture, a pointing gesture, or a pinching gesture.

Example 25 is the method of example(s) 22, further comprising: while the user's hand is determined to be making a grasping gesture: registering the interaction point to a keypoint along the user's index finger; determining an orientation or direction of the ray based at least in part on: the particular location of the interaction point; a position of at least one portion of the user's body other than the user's hand; and/or the relative positions of a subset of the plurality of keypoints that includes three or more of keypoints $I_m$, $T_m$, $M_m$, and H.

Example 26 is the method of example(s) 22, further comprising: while the user's hand is determined to be making a pointing gesture: registering the interaction point to a keypoint at a tip of the user's index finger; determining an orientation or direction of the ray based at least in part on: the particular location of the interaction point; a position of at least one portion of the user's body other than the user's hand; and/or the relative positions of a subset of the plurality of keypoints that includes three or more of keypoints $I_t$, $I_d$, $I_p$, $I_m$, $T_t$, $T_i$, $T_m$, $M_m$, and H; and detecting action events based at least in part on an angle $\theta$ measured between $\overline{\gamma I_t}$ and $\overline{\gamma T_t}$ (i.e., $\theta = \angle I_t \gamma T_t$), where $\gamma$ represents a midpoint of $\overline{T_m I_m}$.

Example 27 is the method of example(s) 26, wherein a hover action event is detected if $\theta$ is determined to be greater than a predetermined threshold value.

Example 28 is the method of example(s) 26, wherein a touch action event is detected if $\theta$ is determined to be less than a predetermined threshold value.

Example 29 is the method of example(s) 22, further comprising: while the user's hand is determined to be making a pinching gesture: registering the interaction point to a location along $\overline{T_t I_t}$ or $\overline{T_t I_p}$, $\overline{T_m I_m}$, or $\overline{T_t I_d}$; determining an orientation or direction of the ray based at least in part on: the particular location of the interaction point; a position of at least one portion of the user's body other than the user's hand; and/or the relative positions of a subset of the plurality of keypoints that includes three or more of keypoints $I_t$, $I_d$, $I_p$, $I_m$, $T_t$, $T_i$, $T_m$, $M_m$, and H; and detecting action events based at least in part on an angle $\theta$ measured between $\overline{\gamma I_t}$ and $\overline{\gamma T_t}$ (i.e., $\theta = \angle I_t \gamma T_t$), where $\gamma$ represents a midpoint of $\overline{T_m I_m}$.

Example 30 is the method of example(s) 29, wherein a hover action event is detected if $\theta$ is determined to be greater than a predetermined threshold value.

Example 31 is the method of example(s) 29, wherein a touch action event is detected if $\theta$ is determined to be less than a predetermined threshold value.

Example 32 is the method of example(s) 29, wherein a tap action event is detected based on a duration of time for which $\theta$ is determined to be less than a predetermined threshold value.

Example 33 is the method of example(s) 29, wherein a hold action event is detected based on a duration of time for which $\theta$ is determined to be less than a predetermined threshold value.

Example 34 is the method of example(s) 22, further comprising: while the user's hand is determined to be transitioning between making a grasping gesture and making a pointing gesture: registering the interaction point to a location along $\overline{I_m T_p}$, $\overline{I_p I_t}$, $\overline{I_m I_t}$, $\overline{I_p I_d}$, or $\overline{I_d I_t}$; determining an orientation or direction of the ray in the same way as is done for the pointing gesture; and determining an orientation or direction of the ray based at least in part on: the particular location of the interaction point; a position of at least one portion of the user's body other than the user's hand; and/or the relative positions of a subset of the plurality of keypoints that includes three or more of keypoints $I_t$, $I_d$, $I_p$, $I_m$, $T_t$, $T_i$, $T_m$, $M_m$, and H.

Example 35 is the method of example(s) 34, wherein the user's hand is determined to be transitioning between making the grasping gesture and making the pointing gesture when the user's index finger is partially extended outward, while other fingers of the user's hand are curled inward.

Example 36 is the method of example(s) 22, further comprising: while the user's hand is determined to be transitioning between making a pointing gesture and making a pinching gesture: registering the interaction point to a location along $\overline{I_t \alpha}$; determining an orientation or direction of the ray in the same way as is done for the pointing gesture and/or the pinching gesture; and determining an orientation or direction of the ray based at least in part on: the particular location of the interaction point; a position of at least one portion of the user's body other than the user's hand; and/or the relative positions of a subset of the plurality of keypoints that includes three or more of keypoints $I_t$, $I_d$, $I_p$, $I_m$, $T_t$, $T_i$, $T_m$, $M_m$, and H.

Example 37 is the method of example(s) 36, wherein the user's hand is determined to be transitioning between making the pointing gesture and making the pinching gesture when the user's thumb and index finger are at least partially extended outward and at least partially curled toward one another.

Example 38 is the method of example(s) 22, further comprising: while the user's hand is determined to be transitioning between making a pinching gesture and making a grasping gesture: registering the interaction point to a location along $\overline{\alpha I_m}$; determining an orientation or direction of the ray in the same way as is done for the pinching gesture; and determining an orientation or direction of the ray based at least in part on: the particular location of the interaction point; a position of at least one portion of the user's body other than the user's hand; and/or the relative positions of a subset of the plurality of keypoints that includes three or more of keypoints $I_t$, $I_d$, $I_p$, $I_m$, $T_t$, $T_i$, $T_m$, $M_m$, and H.

Example 39 is the method of example(s) 38, wherein the user's hand is determined to be transitioning between making the pinching gesture and making the grasping gesture when the user's thumb and index finger are at least partially extended outward and at least partially curled toward one another.

Example 40 is a system configured to perform the methods of any of example(s) 22-39.

Example 41 is a non-transitory machine-readable medium comprising instructions that, when executed by one or more processors, cause the one or more processors to perform the methods of any of example(s) 22-39.

Example 42 is a method of interacting with a virtual object, the method comprising: receiving one or more images of a first hand and a second hand of a user; analyzing the one or more images to detect a plurality of keypoints associated with each of the first hand and the second hand; determining an interaction point for each of the first hand and the second hand based on the plurality of keypoints associated with each of the first hand and the second hand; generating one or more bimanual deltas based on the interaction point for each of the first hand and the second hand; and interacting with the virtual object using the one or more bimanual deltas.

Example 43 is the method of example(s) 42, further comprising: determining a bimanual interaction point based on the interaction point for each of the first hand and the second hand.

Example 44 is the method of example(s) 42, wherein: the interaction point for the first hand is determined based on the plurality of keypoints associated with the first hand; and the interaction point for the second hand is determined based on the plurality of keypoints associated with the second hand.

Example 45 is the method of example(s) 42, wherein determining the interaction point for each of the first hand and the second hand includes: determining, based on analyzing the one or more images, whether the first hand is making or is transitioning into making a first particular gesture from a plurality of gestures; and in response to determining that the first hand is making or is transitioning into making the first particular gesture: selecting a subset of the plurality of keypoints associated with the first hand that correspond to the first particular gesture; determining a first particular location relative to the subset of the plurality of keypoints associated with the first hand, wherein the first particular location is determined based on the subset of the plurality of keypoints associated with the first hand and the first particular gesture; and registering the interaction point for the first hand to the first particular location.

Example 46 is the method of example(s) 45, wherein determining the interaction point for each of the first hand and the second hand further includes: determining, based on analyzing the one or more images, whether the second hand is making or is transitioning into making a second particular gesture from the plurality of gestures; in response to determining that the second hand is making or is transitioning into making the second particular gesture: selecting a subset of the plurality of keypoints associated with the second hand that correspond to the second particular gesture; determining a second particular location relative to the subset of the plurality of keypoints associated with the second hand, wherein the second particular location is determined based on the subset of the plurality of keypoints associated with the second hand and the second particular gesture; and registering the interaction point for the second hand to the second particular location.

Example 47 is the method of example(s) 46, wherein the plurality of gestures includes at least one of a grasping gesture, a pointing gesture, or a pinching gesture.

Example 48 is the method of example(s) 42, wherein the one or more images include a first image of the first hand and a second image of the second hand.

Example 49 is the method of example(s) 42, wherein the one or more images include a single image of the first hand and the second hand.

Example 50 is the method of example(s) 42, wherein the one or more images include a series of time-sequenced imaged.

Example 51 is the method of example(s) 42, wherein the one or more bimanual deltas are determined based on a frame-to-frame movement of the interaction point for each of the first hand and the second hand.

Example 52 is the method of example(s) 51, wherein the one or more bimanual deltas include a translation delta corresponding to a frame-to-frame translational movement of the interaction point for each of the first hand and the second hand.

Example 53 is the method of example(s) 51, wherein the one or more bimanual deltas include a rotation delta corresponding to a frame-to-frame rotational movement of the interaction point for each of the first hand and the second hand.

Example 54 is the method of example(s) 51, wherein the one or more bimanual deltas include a sliding delta corresponding to a frame-to-frame separation movement of the interaction point for each of the first hand and the second hand.

Example 55 is a system configured to perform the methods of any of example(s) 42-54.

Example 56 is a non-transitory machine-readable medium comprising instructions that, when executed by one or more processors, cause the one or more processors to perform the methods of any of example(s) 42-54.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIG. 5 illustrates an example of various keypoints that may be detected or tracked by a wearable system.

FIGS. 7A-7C illustrate examples of ray casting for various gestures while a user's arm is extended outward.

FIGS. 8A-8C illustrate examples of ray casting for various gestures while a user's arm is retracted inward.

FIGS. 17A-17D illustrate example experimental data for detecting an action event while a user's hand is making a pinching gesture.

FIGS. 19A-19D illustrate example noisy experimental data for detecting an action event while a user's hand is making a pinching gesture.

FIG. 29 illustrates example manual interaction fields and bimanual interaction fields.

DETAILED DESCRIPTION OF SPECIFIC EMBODIMENTS

Figure 1:
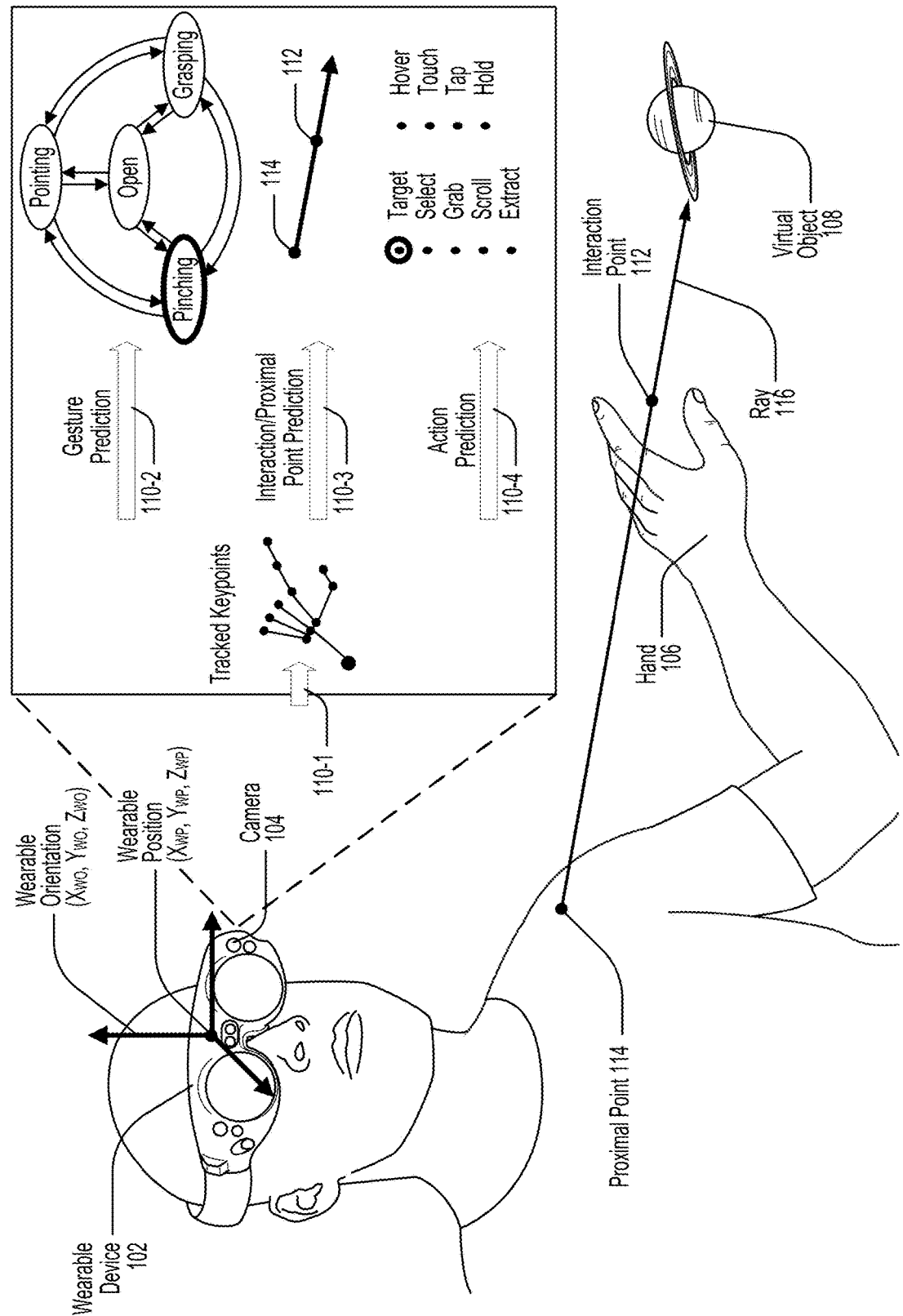
FIG. 1 illustrates an example operation of a wearable system providing hand gesture input for interacting with a virtual object.

A wearable system can present an interactive augmented reality (AR), virtual reality (VR), and/or mixed reality (MR) environment in which virtual data elements are interacted with by a user through a variety of inputs. While many modern computing systems are engineered to generate a given output based on a single direct input (e.g., a computer mouse can guide a cursor in response to a user's direct manipulation, etc.), in a data rich and dynamic interaction environment such as an AR/VR/MR environment, a high degree of specificity may be desirable to accomplish a particular task. Otherwise, in the absence of precise inputs, a computing system may suffer a high error rate and may cause incorrect computer operations to be performed. For example, when a user intends a move an object in a three-dimensional (3D) space using a touchpad, the computing system may have difficulty interpreting a desired 3D movement using a device with an inherently two-dimensional (2D) input space.

The use of hand gestures as an input within AR/VR/MR environments has a number of attractive features. First, in an AR environment in which virtual content is overlaid onto the real world, hand gestures provide an intuitive interaction method which bridges both worlds. Second, there exist a wide range of expressive hand gestures that could potentially be mapped to various input commands. For example, a hand gesture can be exhibiting a number of distinctive parameters simultaneously, such as handshape (e.g., the distinctive configurations that a hand can take), orientation (e.g., the distinctive relative degree of rotation of a hand), location, and movement. Third, with recent hardware improvements in imaging devices and processing units, a hand gesture input offers sufficient accuracy such that the system's complexity can be reduced over other inputs such as handheld controllers, which employ various sensors such as electromagnetic tracking emitters/receivers.

One approach to recognizing hand gestures is to track the positions of various keypoints on one or both of the user's hands. In one implementation, a hand tracking system may identify the 3D positions of over 20 keypoints on each hand. Next, a gesture associated with the hand may be recognized by analyzing the keypoints. For example, the distances between different keypoints may be indicative of whether a user's hand is in a first (e.g., a low average distance) or is open and relaxed (e.g., a high average distance). As another example, various angles formed by 3 or more keypoints (e.g., including at least 1 keypoint along the user's index finger) may be indicative of whether a user's hand is pointing or pinching.

Once a gesture is recognized, an interaction point through which the user can interact with a virtual object can be determined. The interaction point may be registered to one of the keypoints or to a location between the keypoints, with each gesture having a unique algorithm for determining the interaction point. For example, when making a pointing gesture, the interaction point may be registered to the keypoint at the tip of the user's index finger. As another example, when making an open pinching gesture, the interaction point may be registered to the midpoint between the tip of the user's index finger and the tip of the user's thumb. Certain gestures may further allow for a radius associated with the interaction point to be determined. As an example, for a pinching gesture, the radius may related be the distance between the tip of the user's index finger and the tip of the user's thumb.

Continuing to track the entire network of keypoints after the gesture has been recognized and/or after the interaction point has been determined can be computationally burdensome. As such, in some embodiments of the present disclosure, a subset of the total number of keypoints can continue to be tracked once the gesture has been recognized. This subset of keypoints can be used to periodically update the interaction point at a more manageable computational burden than would be the case using the total number of keypoints. In some examples, this subset of keypoints can be used to periodically update the orientation of a virtual multi-DOF controller (e.g., virtual cursor or pointer associated with the interaction point), as described in further detail below, with a relatively high degree of computational efficiency. Furthermore, the subset of keypoints can be analyzed to determine whether the user's hand is no longer making the gesture or, for example, has transitioned from making a first gesture into a second gesture or has transitioned from the first gesture into an unrecognized gesture.

In addition to determining the interaction point, a proximal point along the user's body (or in space) can be determined such that a control ray (or simply "ray") can be formed extending between the two points. The ray (or a portion thereof) may serve as a cursor or pointer (e.g., as part of a multi-DOF controller) for interacting with virtual content in 3D space. In some instances, the proximal point may be registered to the user's shoulder, the user's elbow, or along the user's arm (e.g., between the user's shoulder and elbow). The proximal point may alternatively be registered to one or more other locations within or along the surface of the user's body, such as knuckle(s), hand, wrist, forearm, elbow, arm (e.g., upper arm), shoulder, shoulder blade, neck, head, eye(s), face (e.g., cheek), chest, torso (e.g., naval region), or a combination thereof. The ray may then extend from the proximal point and through the interaction point by a particular distance. Each of the interaction point, the proximal point, and the ray may be dynamically updated to provide a responsive and comfortable user experience.

Embodiments herein relate to both single hand interaction, referred to manual interaction, as well as two hand interaction, referred to as bimanual interaction. Tracking a manual pose may include tracking a single hand's interaction point (e.g., its position, orientation, and radius) and optionally its corresponding proximal point and ray, as well as any gesture the hand is making. For bimanual interaction, the interaction point for each of the user's hands may be tracked (e.g., the positions, orientations, and radii) and optionally corresponding proximal points, rays, and gestures. Bimanual interaction may further entail tracking of a bimanual interaction point between the two hands, which may have a position (e.g., average of the positions), an orientation (e.g., average of the orientations), and a radius (e.g., average of the radii). A frame-to-frame movement of the bimanual interaction point can be captured through a bimanual delta, which may be calculated based on the deltas for the two hands as described below.

The bimanual delta may include a translation component, referred to as a translation delta, and a rotation component, referred to as a rotation delta. The translation delta may be determined based on translation deltas for the two hands. For example, the translation delta may be determined based on (e.g., the average of) a left translation delta corresponding to the frame-to-frame translational movement of the user's left hand and a right translation delta corresponding to the frame-to-frame translational movement of the user's right hand. Similarly, the rotation delta may be determined based on rotation deltas for the two hands. For example, the rotation delta may be determined based on (e.g., the average of) a left rotation delta corresponding to the frame-to-frame rotational movement of the user's left hand and a right rotation delta corresponding to the frame-to-frame rotational movement of the user's right hand.

Alternatively or additionally, the rotation delta may be determined based on the rotational movement of the line formed between the positions of the interaction points. For example, a user may pinch two corners of a digital cube and cause the cube to rotate by rotating the positions of the interaction points of the two hands. This rotation may occur independently of whether each hand's interaction point is rotating on its own or, in some embodiments, the rotation of the cube may be further facilitated by the rotation of the interaction points. In some instances, the bimanual delta may include other components such as a separation component, referred to as a separation delta (or scaling delta), which is determined based on the distance between the positions of the interaction points, with positive separation deltas corresponding to the hands moving apart and negative separation deltas corresponding to the hands moving closer together.

Various types of bimanual interactions may fall into one of three categories. The first category is independent bimanual interaction, in which each hand interacts with virtual objects independently (e.g., a user is typing on a virtual keyboard and each hand configuration is independent of the other). The second category is cooperative bimanual interaction, in which both hands cooperatively interact with virtual objects (e.g., resizing, rotating, and/or translating a virtual cube by pinching opposite corners with both hands). The third category is managed bimanual interaction, in which one hand manages how the other hand is interpreted (e.g., right hand is cursor while left hand is qualifier that switches cursor between pen and eraser).

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example operation of a wearable system providing hand gesture input for interacting with a virtual object 108, in accordance with some embodiments of the present disclosure. The wearable system may include a wearable device 102 (e.g., a headset) that is worn by the user and includes at least one forward-facing camera 104 that includes a user's hand 106 within its field of view (FOV). Accordingly, the captured image(s) from camera 104 may include hand 106, allowing subsequent processing of the image(s) to be performed by the wearable system to, for example, detect keypoints associated with hand 106. In some embodiments, the wearable system and the wearable device 102 described in reference to FIG. 1 may correspond to the wearable system 200 and the wearable device 201 as described in further detail below in reference to FIG. 2, respectively.

The wearable system may maintain a reference frame within which positions and orientations of elements within the AR/VR/MR environment may be determined. In some embodiments, the wearable system may determine a position of wearable device 102 ("wearable position") defined as $(X_{WP}, Y_{WP}, Z_{WP})$ with respect to the reference frame and an orientation ("wearable orientation") defined as $(X_{WO}, Y_{WO}, Z_{WO})$ with respect to a reference frame. The position of wearable device 102 may be expressed in X, Y, and Z Cartesian values or in longitude, latitude, and elevation values, among other possibilities. The orientation of wearable device 102 may be expressed in X, Y, and Z Cartesian values or in pitch angle, yaw angle, and roll angle values, among other possibilities. The reference frame for each of the positions and orientations may be a world reference frame or, alternatively or additionally, the position and orientation of wearable device 102 may be used as the reference frame such that, for example, the position of wearable device 102 may be set as (0, 0, 0) and the orientation of wearable device 102 may be set as (0°, 0°, 0°).

The wearable system may perform one or more processing steps 110 using the image(s) captured by camera 104. In some examples, one or more processing steps 110 may be performed by one or more processors and may be carried out at least in part by one or more processors of the wearable system, one or more processors communicatively coupled to the wearable system, or a combination thereof. At step 110-1, a plurality of keypoints (e.g., nine or more keypoints) are detected or tracked based on the captured image(s). At step 110-2, the tracked keypoints are used to determine whether hand 106 is making or is transitioning into making one of a predetermined set of gestures. In the illustrated example, hand 106 is determined to be making a pinching gesture. Alternatively or additionally, the gesture may be predicted directly from the image without the intermediate step of detecting keypoints. Accordingly, steps 110-1 and 110-2 may be performed concurrently or sequentially in either order. In response to determining that the user's hand is making or transitioning to making a particular gesture (e.g., a pinching gesture), a subset of the plurality of keypoints (e.g., eight or fewer keypoints) that are associated with the particular gesture may be selected and tracked.

At step 110-3, an interaction point 112 is determined by registering interaction point 112 to a particular location relative to the selected subset of keypoints based on the predicted gesture (or the predicted gesture transition) from step 110-2. Also at step 110-3, a proximal point 114 is determined by registering proximal point 114 to a location along the user's body based at least in part on one or more of a variety of factors. Further at step 110-3, a ray 116 is cast from proximal point 114 through interaction point 112. At step 110-4, an action event performed by hand 106 is predicted based on the keypoints (e.g., based on movement of keypoints over time). In the illustrated example, hand 106 is determined to be performing a targeting action, which may be recognized by the wearable system when the user performs a dynamic pinch open gesture.

Figure 2:
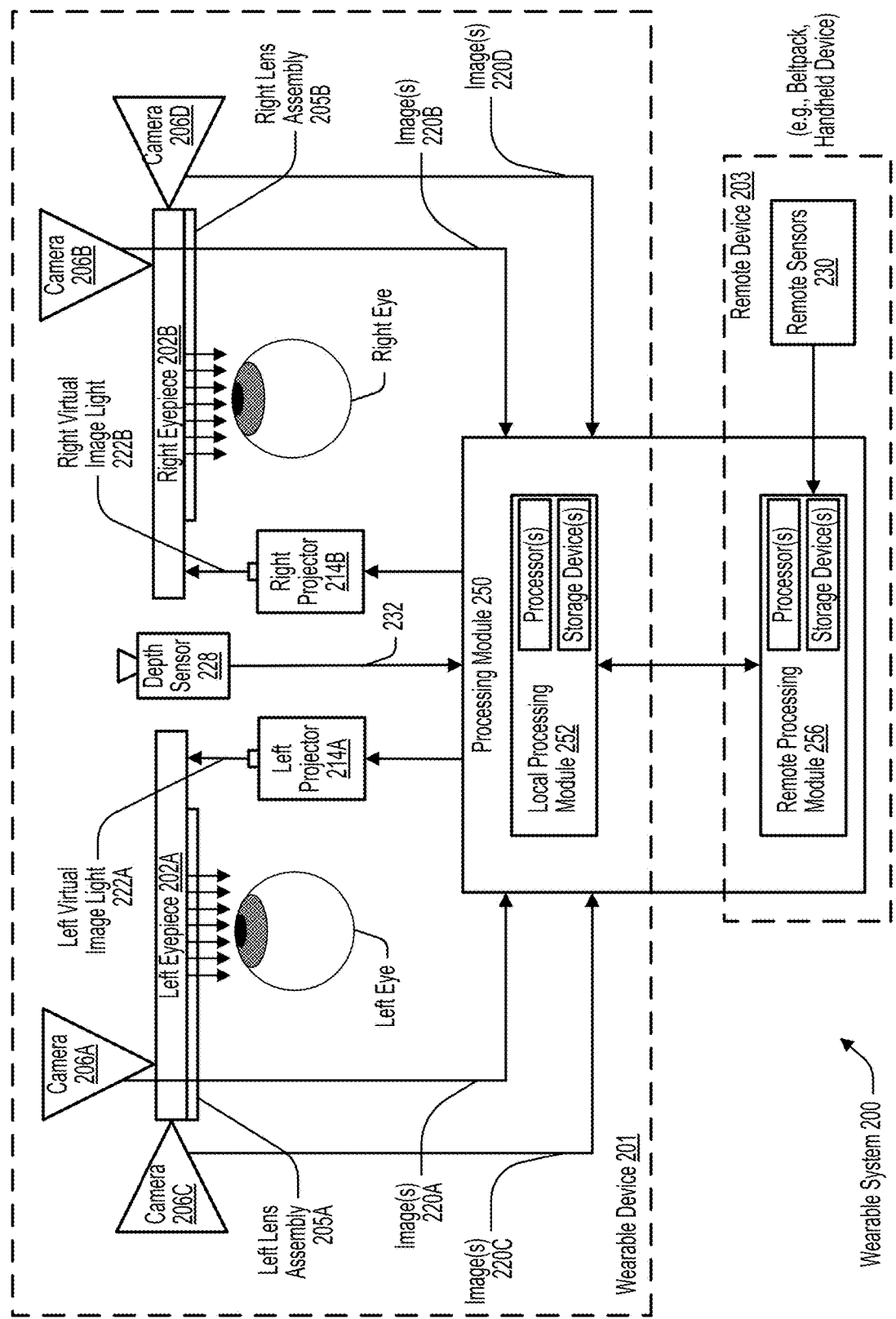
FIG. 2 illustrates a schematic view of an example AR/VR/MR wearable system.

FIG. 2 illustrates a schematic view of an example AR/VR/MR wearable system 200, according to some embodiments of the present disclosure. Wearable system 200 may include a wearable device 201 and at least one remote device 203 that is remote from wearable device 201 (e.g., separate hardware but communicatively coupled). As mentioned above, in some embodiments, the wearable system 200 and the wearable device 201 as described in reference to FIG. 2 may correspond to the wearable system and the wearable device 102 as described above in reference to FIG. 1, respectively. While wearable device 201 is worn by a user (generally as a headset), remote device 203 may be held by the user (e.g., as a handheld controller) or mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Wearable device 201 may include a left eyepiece 202A and a left lens assembly 205A arranged in a side-by-side configuration and a right eyepiece 202B and a right lens assembly 205B also arranged in a side-by-side configuration. In some embodiments, wearable device 201 includes one or more sensors including, but not limited to: a left front-facing world camera 206A attached directly to or near left eyepiece 202A, a right front-facing world camera 206B attached directly to or near right eyepiece 202B, a left side-facing world camera 206C attached directly to or near left eyepiece 202A, and a right side-facing world camera 206D attached directly to or near right eyepiece 202B. Wearable device 201 may include one or more image projection devices such as a left projector 214A optically linked to left eyepiece 202A and a right projector 214B optically linked to right eyepiece 202B.

Wearable system 200 may include a processing module 250 for collecting, processing, and/or controlling data within the system. Components of processing module 250 may be distributed between wearable device 201 and remote device 203. For example, processing module 250 may include a local processing module 252 on the wearable portion of wearable system 200 and a remote processing module 256 physically separate from and communicatively linked to local processing module 252. Each of local processing module 252 and remote processing module 256 may include one or more processing units (e.g., central processing units (CPUs), graphics processing units (GPUs), etc.) and one or more storage devices, such as non-volatile memory (e.g., flash memory).

Processing module 250 may collect the data captured by various sensors of wearable system 200, such as cameras 206, depth sensor 228, remote sensors 230, ambient light sensors, eye trackers, microphones, inertial measurement units (IMUs), accelerometers, compasses, Global Navigation Satellite System (GNSS) units, radio devices, and/or gyroscopes. For example, processing module 250 may receive image(s) 220 from cameras 206. Specifically, processing module 250 may receive left front image(s) 220A from left front-facing world camera 206A, right front image(s) 220B from right front-facing world camera 206B, left side image(s) 220C from left side-facing world camera 206C, and right side image(s) 220D from right side-facing world camera 206D. In some embodiments, image(s) 220 may include a single image, a pair of images, a video comprising a stream of images, a video comprising a stream of paired images, and the like. Image(s) 220 may be periodically generated and sent to processing module 250 while wearable system 200 is powered on, or may be generated in response to an instruction sent by processing module 250 to one or more of the cameras.

Cameras 206 may be configured in various positions and orientations along the outer surface of wearable device 201 so as to capture images of the user's surrounding. In some instances, cameras 206A, 206B may be positioned to capture images that substantially overlap with the FOVs of a user's left and right eyes, respectively. Accordingly, placement of cameras 206 may be near a user's eyes but not so near as to obscure the user's FOV. Alternatively or additionally, cameras 206A, 206B may be positioned so as to align with the incoupling locations of virtual image light 222A, 222B, respectively. Cameras 206C, 206D may be positioned to capture images to the side of a user, e.g., in a user's peripheral vision or outside the user's peripheral vision. Image(s) 220C, 220D captured using cameras 206C, 206D need not necessarily overlap with image(s) 220A, 220B captured using cameras 206A, 206B.

In various embodiments, processing module 250 may receive ambient light information from an ambient light sensor. The ambient light information may indicate a brightness value or a range of spatially-resolved brightness values. Depth sensor 228 may capture a depth image 232 in a front-facing direction of wearable device 201. Each value of depth image 232 may correspond to a distance between depth sensor 228 and the nearest detected object in a particular direction. As another example, processing module 250 may receive gaze information from one or more eye trackers. As another example, processing module 250 may receive projected image brightness values from one or both of projectors 214. Remote sensors 230 located within remote device 203 may include any of the above-described sensors with similar functionality.

Virtual content is delivered to the user of wearable system 200 primarily using projectors 214 and eyepieces 202. For instance, eyepieces 202A, 202B may comprise transparent or semi-transparent waveguides configured to direct and outcouple light generated by projectors 214A, 214B, respectively. Specifically, processing module 250 may cause left projector 214A to output left virtual image light 222A onto left eyepiece 202A, and may cause right projector 214B to output right virtual image light 222B onto right eyepiece 202B. In some embodiments, each of eyepieces 202A, 202B may comprise a plurality of waveguides corresponding to different colors. In some embodiments, lens assemblies 205A, 205B may be coupled to and/or integrated with eyepieces 202A, 202B. For example, lens assemblies 205A, 205B may be incorporated into a multi-layer eyepiece and may form one or more layers that make up one of eyepieces 202A, 202B.

During operation, wearable system 200 can support various user interactions with objects in a field of regard (FOR) (i.e., the entire region available for viewing or imaging) based on contextual information. For example, wearable system 200 can adjust the size of the aperture of a cone with which a user interacts with objects using cone casting. As another example, wearable system 200 can adjust the amount of movement of virtual objects associated with an actuation of a user input device based on the contextual information. Detailed examples of these interactions are provided below.

A user's FOR can contain a group of objects which can be perceived by the user via wearable system 200. The objects within the user's FOR may be virtual and/or physical objects. The virtual objects may include operating system objects such as e.g., a recycle bin for deleted files, a terminal for inputting commands, a file manager for accessing files or directories, an icon, a menu, an application for audio or video streaming, a notification from an operating system, and so on. The virtual objects may also include objects in an application such as e.g., avatars, virtual objects in games, graphics or images, etc. Some virtual objects can be both an operating system object and an object in an application. In some embodiments, wearable system 200 can add virtual elements to the existing physical objects. For example, wearable system 200 may add a virtual menu associated with a television in the room, where the virtual menu may give the user the option to turn on or change the channels of the television using wearable system 200.

The objects in the user's FOR can be part of a world map. Data associated with objects (e.g. location, semantic information, properties, etc.) can be stored in a variety of data structures such as, e.g., arrays, lists, trees, hashes, graphs, and so on. The index of each stored object, wherein applicable, may be determined, for example, by the location of the object. For example, the data structure may index the objects by a single coordinate such as the object's distance from a fiducial position (e.g., how far to the left (or right) of the fiducial position, how far from the top (or bottom) of the fiducial position, or how far depth-wise from the fiducial position). In some implementations, wearable system 200 is capable of displaying virtual objects at different depth planes relative to the user such that interactable objects can be organized into multiple arrays located at different fixed depth planes.

A user can interact with a subset of the objects in the user's FOR. This subset of objects may sometimes be referred to as interactable objects. The user can interact with objects using a variety of techniques, such as e.g. by selecting the objects, by moving the objects, by opening a menu or toolbar associated with an object, or by choosing a new set of interactable objects. The user may interact with the interactable objects by using hand gestures or poses to actuate a user input device, such as, e.g., clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with a user input device, etc. The user may also interact with interactable objects using head, eye, or body pose, such as e.g., gazing or pointing at an object for a period of time. These hand gestures and poses of the user can cause wearable system 200 to initiate a selection event in which, for example, a user interface operation is performed (a menu associated with the target interactable object is displayed, a gaming operation is performed on an avatar in a game, etc.).

Figure 3:
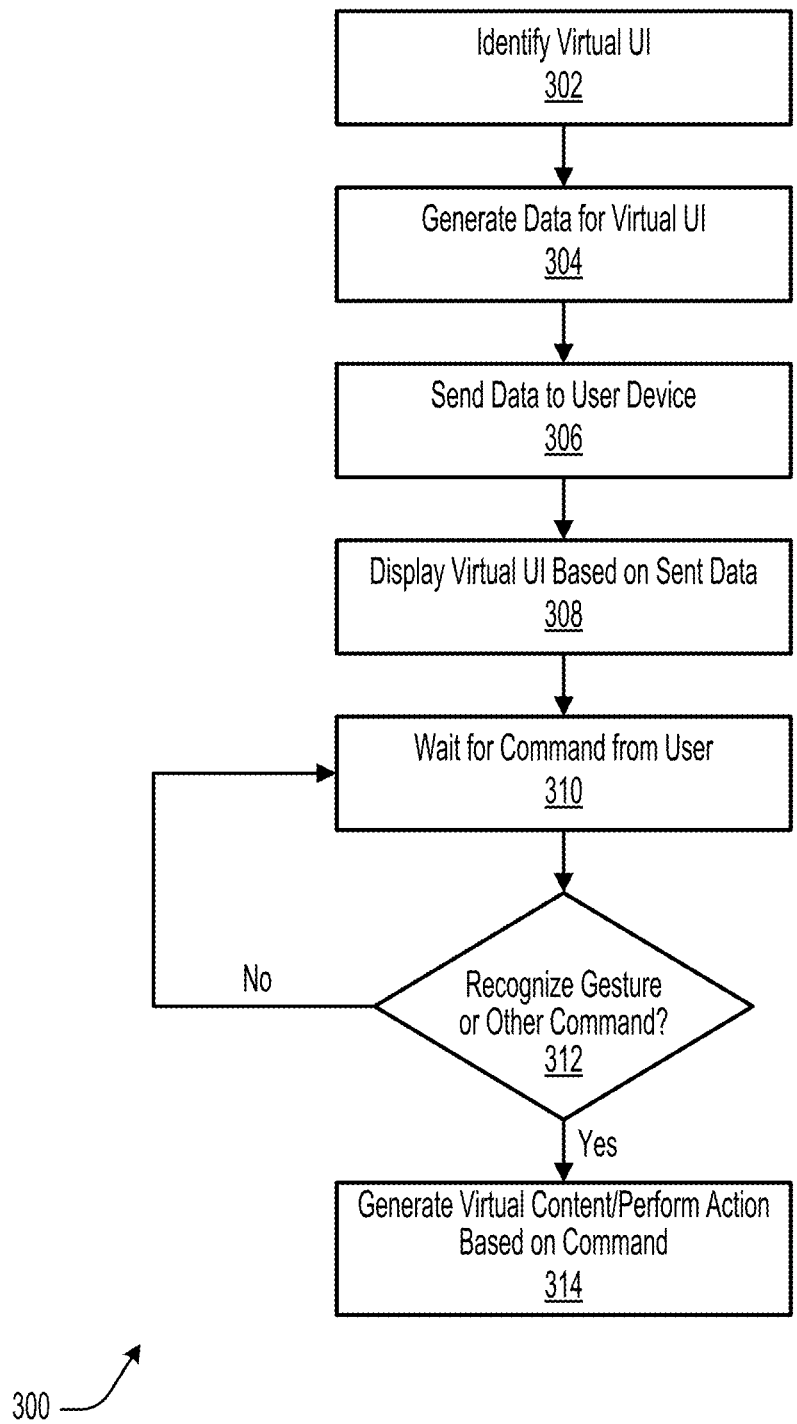
FIG. 3 illustrates an example method for interacting with a virtual user interface.

FIG. 3 illustrates an example method 300 for interacting with a virtual user interface, in accordance with some embodiments of the present disclosure. At step 302, the wearable system may identify a particular user interface (UI). The type of UI may be predetermined by the user. The wearable system may identify that a particular UI needs to be populated based on a user input (e.g., gesture, visual data, audio data, sensory data, direct command, etc.). At step 304, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. If the UI is hand centric, the map coordinates of the user's hands may be determined. These map points may be derived through data received through the FOV cameras, sensory input, or any other type of collected data.

At step 306, the wearable system may send the data to the display from the cloud or the data may be sent from a local database to the display components. At step 308, the UI is displayed to the user based on the sent data. For example, a light field display can project the virtual UI into one or both of the user's eyes. Once the virtual UI has been created, the wearable system may simply wait for a command from the user to generate more virtual content on the virtual UI at step 310. For example, the UI may be a body centric ring around the user's body. The wearable system may then wait for the command (a gesture, a head or eye movement, input from a user input device, etc.), and if it is recognized (step 312), virtual content associated with the command may be displayed to the user (step 314). As an example, the wearable system may wait for user's hand gestures before mixing multiple steam tracks.

As described herein, a user can interact with objects in his environment using hand gestures or poses. For example, a user may look into a room and see tables, chairs, walls, and a virtual television display on one of the walls. To determine which objects the user is looking toward, wearable system 200 may use a cone casting technique that, described generally, projects a cone in the direction the user is looking and identifies any objects that intersect with the cone. The cone casting can involve casting a single ray, having no lateral thickness, from a headset (of wearable system 200) toward physical or virtual objects. Cone casting with a single ray may also be referred to as ray casting.

Ray casting can use a collision detection agent to trace along the ray and to identify if and where any objects intersect with the ray. Wearable system 200 can track the user's pose (e.g., body, head, or eye direction) using IMUs (e.g., accelerometers), eye-tracking cameras, etc., to determine the direction toward which the user is looking. Wearable system 200 can use the user's pose to determine which direction to cast the ray. The ray casting techniques can also be used in connection with a user input device such as a handheld, multiple-degree of freedom (DOF) input device. For example, a user can actuate the multi-DOF input device to anchor the size and/or length of the ray while the user moves around. As another example, rather than casting the ray from the headset, wearable system 200 can cast the ray from the user input device. In certain embodiments, rather than casting a ray with negligible thickness, the wearable system can cast a cone having a non-negligible aperture (transverse to a central ray).

Figure 4A:
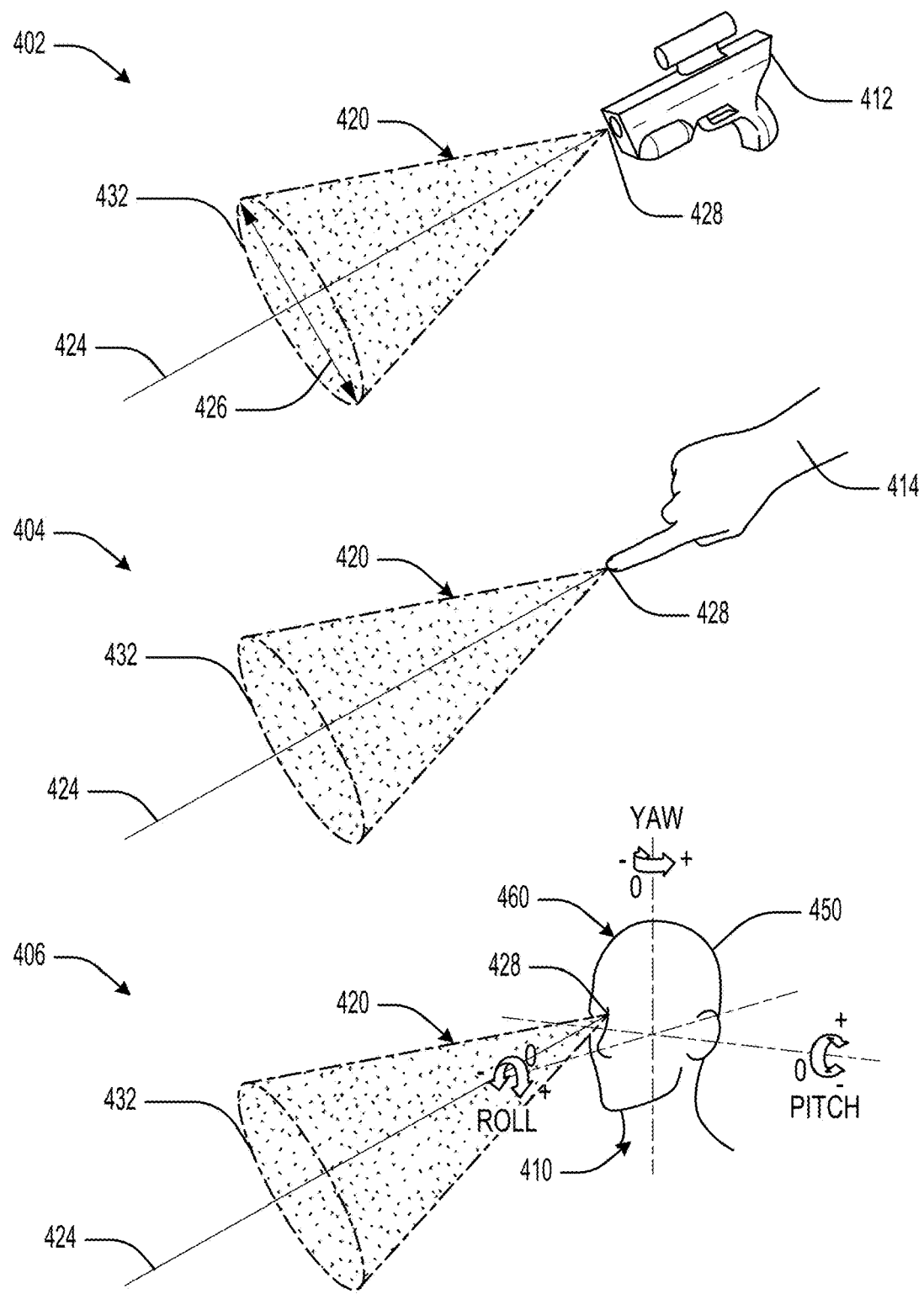
FIG. 4A illustrates examples of ray and cone casting.

FIG. 4A illustrates examples of ray and cone casting, according to some embodiments of the present disclosure. Cone casting can cast a conic (or other shape) volume 420 with an adjustable aperture. Cone 420 can be a geometric cone which has an interaction point 428 and a surface 432. The size of the aperture can correspond to the size of surface 432 of the cone. For example, a large aperture may correspond to a large surface area of surface 432. As another example, a large aperture can correspond to a large diameter 426 of surface 432 while a small aperture can correspond to a small diameter 426 of surface 432. As illustrated in FIG. 4A, interaction point 428 of cone 420 can have its origin at various positions, e.g., the center of the user's head (e.g., between the user's eyes), a point on one of the user's limbs (e.g., a hand, such as a finger of the hand), a user input device or totem being held or operated by the user (e.g., a toy weapon). It is to be understood that interaction point 428 represents one example of an interaction point that may be generated using one or more of the systems and techniques described herein, and that other interaction point arrangements are possible and within the scope of the present invention.

A central ray 424 can represent the direction of the cone. The direction of the cone can correspond to the user's body pose (such as head pose, hand gestures, etc.) or the user's direction of gaze (also referred to as eye pose). The example 406 in FIG. 4A illustrates cone casting with poses, where the wearable system can determine direction 424 of the cone using the user's head pose or eye pose. This example also illustrates a coordinate system for the head pose. A head 450 may have multiple degrees of freedom. As head 450 moves toward different directions, the head pose will change relative to the natural resting direction 460. The coordinate system in FIG. 4A shows three angular degrees of freedom (e.g. yaw, pitch, and roll) that can be used for measuring the head pose relative to the natural resting state 460 of the head. As illustrated in FIG. 4A, head 450 can tilt forward and backward (e.g. pitching), turning left and right (e.g. yawing), and tilting side to side (e.g. rolling). In other implementations, other techniques or angular representations for measuring head pose can be used, for example, any other type of Euler angle system. The wearable system may determine the user's head pose using IMUS.

The example 404 shows another example of cone casting with poses, where the wearable system can determine direction 424 of the cone based on a user's hand gestures. In this example, interaction point 428 of cone 420 is at the finger tip of the user's hand 414. As the user points his finger to another location, the position of cone 420 (and central ray 424) can be moved accordingly.

The direction of the cone can also correspond to a position or orientation of the user input device or an actuation of the user input device. For example, the direction of the cone may be based on a user drawn trajectory on a touch surface of the user input device. The user can move his finger forward on the touch surface to indicate that the direction of the cone is forward. The example 402 illustrates another cone casting with a user input device. In this example, interaction point 428 is located at the tip of a weapon-shaped user input device 412. As user input device 412 is moved around, cone 420 and central ray 424 can also move together with user input device 412.

The wearable system can initiate a cone cast when a user actuates user input device 412 by, for example, clicking on a mouse, tapping on a touch pad, swiping on a touch screen, hovering over or touching a capacitive button, pressing a key on a keyboard or a game controller (e.g., a 5-way d-pad), pointing a joystick, wand, or totem toward the object, pressing a button on a remote control, or other interactions with user input device 412, etc.

The wearable system may also initiate a cone cast based on a pose of a user, such as, e.g., an extended period of gaze toward one direction or a hand gesture (e.g., waving in front of the outward-facing imaging system). In some implementations, the wearable system can automatically begin the cone cast event based on contextual information. For example, the wearable system may automatically begin the cone cast when the user is at the main page of the AR display. In another example, the wearable system can determine relative positions of the objects in a user's direction of gaze. If the wearable system determines that the objects are located relatively far apart from each other, the wearable system may automatically begin a cone cast so the user does not have to move with precision to select an object in a group of the sparsely located objects.

The direction of the cone can further be based on the position or orientation of the headset. For example, the cone may be casted at a first direction when the headset is tilted while at a second direction when the headset is not tilted.

Cone 420 may have a variety of properties such as, e.g., size, shape, or color. These properties may be displayed to the user so that the cone is perceptible to the user. In some cases, portions of cone 420 may be displayed (e.g., an end of the cone, a surface of the cone, a central ray of the cone, etc.). In other embodiments, cone 420 may be a cuboid, polyhedron, pyramid, frustum, etc. The distal end of the cone can have any cross section, e.g., circular, oval, polygonal, or irregular.

Figure 4B:
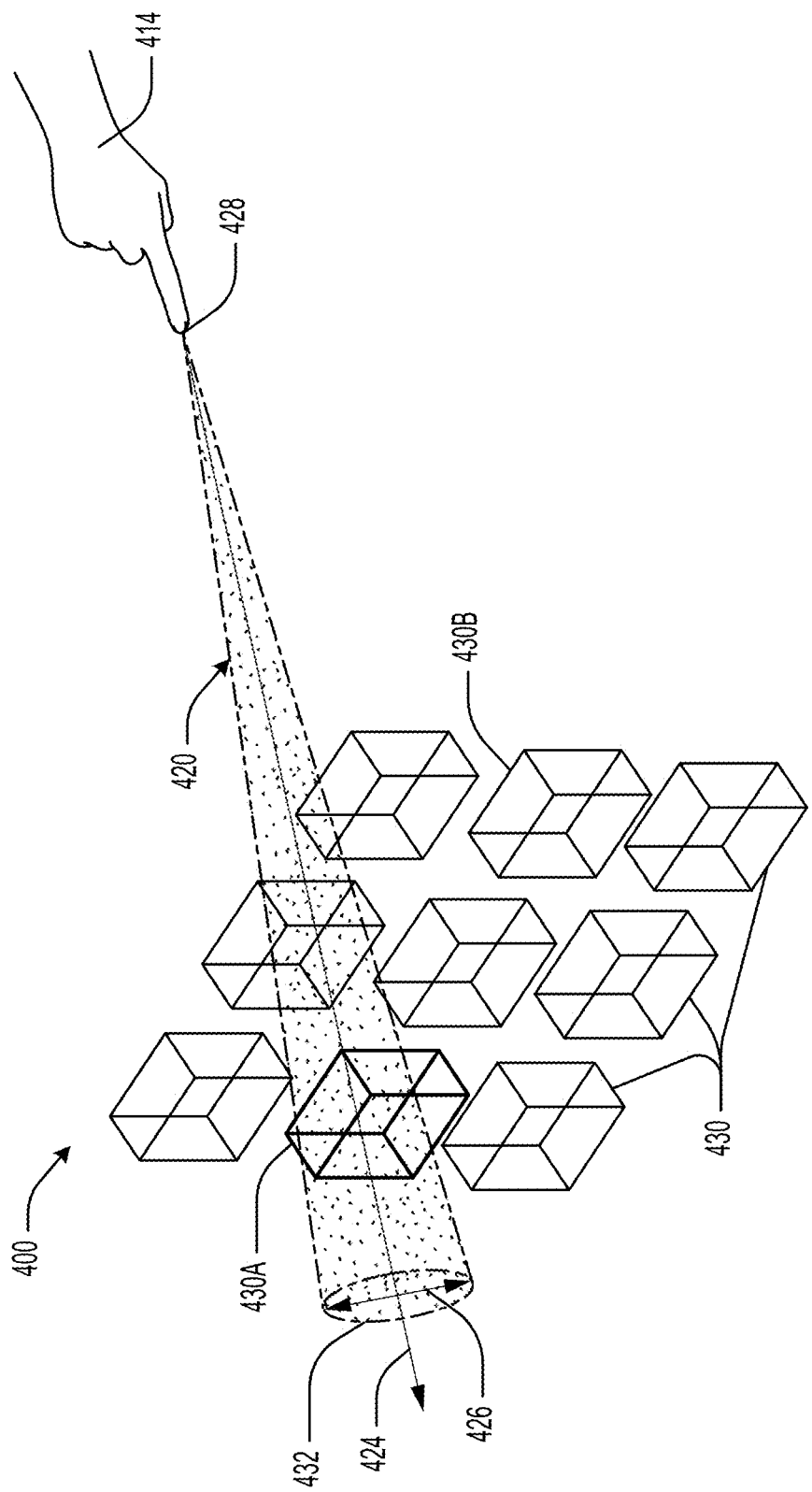
FIG. 4B illustrates an example of cone casting on a group of objects.

In FIGS. 4A and 4B, cone 420 can have a vertex positioned at an interaction point 428 and a distal end formed at a plane 432. Interaction point 428 (also referred to as zero point of central ray 424) can be associated with the place from which cone cast originates. Interaction point 428 may be anchored to a location in the 3D space, such that the virtual cone appears to be emitted from the location. The location may be a position on a user's head (such as between the user's eyes), a user input device (such as, e.g., a 6 DOF handheld controller or a 3DOF handheld controller) functioning as a pointer, the tip of a finger (which can be detected by gesture recognition), and so on. For a handheld controller, the location to which interaction point 428 is anchored may depend on the form factor of the device. For example, in weapon-shaped controller 412 (for use in a shooting game), interaction point 428 may be at the tip of the muzzle of the controller 412. In this example, interaction point 428 of the cone can originate at the center of the barrel and cone 420 (or central ray 424) of cone 420 can project forward such that the center of the cone cast would be concentric with the barrel of the weapon-shaped controller 412. Interaction point 428 of the cone can be anchored to any location in the user's environment in various embodiments.

Once interaction point 428 of cone 420 is anchored to a location, the direction and movement of cone 420 may be based on the movement of the object associated with the location. For example, as described with reference to the example 406, when the cone is anchored to the user's head, cone 420 can move based on the user's head pose. As another example, in the example 402, when cone 420 is anchored to a user input device, cone 420 can be moved based on the actuation of the user input device, such as, e.g., based on changes in the position or orientation of the user input device. As another example, in the example 404, when cone 420 is anchored to a user's hand, cone 420 can be moved based on the movement of the user's hand.

Surface 432 of the cone can extend until it reaches a termination threshold. The termination threshold may involve a collision between the cone and a virtual or physical object (e.g., a wall) in the environment. The termination threshold may also be based on a threshold distance. For example, surface 432 can keep extending away from interaction point 428 until the cone collides with an object or until the distance between surface 432 and interaction point 428 has reached a threshold distance (e.g., 20 centimeters, 1 meter, 2 meters, 10 meters, etc.). In some embodiments, the cone can extend beyond objects even though the collisions may happen between the cone and the objects. For example, surface 432 can extend through real world objects (such as tables, chairs, walls, etc.) and terminate when it hits a termination threshold. Assuming that the termination threshold is the wall of a virtual room which is located outside of the user's current room, the wearable system can extend the cone beyond the current room until it reaches a surface of the virtual room. In certain embodiments, world meshes can be used to define the extents of one or more rooms. The wearable system can detect the existence of the termination threshold by determining whether the virtual cone has intersected with a portion of the world meshes. In some embodiments, the user can easily target virtual objects when the cone extends through real world objects. As an example, the headset can present a virtual hole on the physical wall, through which the user can remotely interact with the virtual content in the other room even though the user is not physically in the other room.

Cone 420 can have a depth. The depth of cone 420 may be expressed by the distance between interaction point 428 and surface 432. The depth of the cone can be adjusted automatically by the wearable system, the user, or in combination. For example, when the wearable system determines that the objects are located far away from the user, the wearable system may increase the depth of the cone. In some implementations, the depth of the cone may be anchored to a certain depth plane. For example, a user may choose to anchor the depth of the cone to a depth plane that is within 1 meter of the user. As a result, during a cone cast, the wearable system will not capture objects that are outside of the 1 meter boundary. In certain embodiments, if the depth of the cone is anchored to a certain depth plane, the cone cast will only capture the objects at the depth plane. Accordingly, the cone cast will not capture objects that are closer to the user or farther away from the user than the anchored depth plane. In addition to or in alternative to setting the depth of cone 420, the wearable system can set surface 432 to a depth plane such that the cone casting can allow user interactions with objects at the depth plane or less than the depth planes.

The wearable system can anchor the depth, interaction point 428, or surface 432 of the cone upon detection of a certain hand gesture, a body pose, a direction of gaze, an actuation of a user input device, a voice command, or other techniques. In addition to or in alternative to the examples described herein, the anchoring location of interaction point 428, surface 432, or the anchored depth can be based contextual information, such as, e.g., the type of user interactions, the functions of the object to which the cone is anchored, etc. For example, interaction point 428 can be anchored to the center of the user's head due to user usability and feel. As another example, when a user points at objects using hand gestures or a user input device, interaction point 428 can be anchored to the tip of the user's finger or the tip of the user input device to increase the accuracy of the direction that the user is point to.

The wearable system can generate a visual representation of at least a portion of cone 420 or ray 424 for display to a user. The properties of cone 420 or ray 424 may be reflected in the visual representation of cone 420 or ray 424. The visual representation of cone 420 can correspond to at least a portion of the cone, such as the aperture of the cone, the surface of the cone, the central ray, etc. For example, where the virtual cone is a geometric cone, visual representation of the virtual cone may include a grey geometric cone extending from a position in-between the user's eyes. As another example, the visual representation may include the portion of the cone that interacts with the real or virtual content. Assuming the virtual cone is the geometric cone, the visual representation may include a circular pattern representing the base of the geometric cone because the base of the geometric cone can be used to target and select a virtual object. In certain embodiments, the visual representation is triggered based on a user interface operation. As an example, the visual representation may be associated with an object's state. The wearable system can present the visual representation when an object changes from a resting state or a hover state (where the object can be moved or selected). The wearable system can further hide the visual representation when the object changes from the hover state to a selected state. In some implementations, when the objects are at the hover state, the wearable system can receive inputs from a user input device (in addition to or in alternative to a cone cast) and can allow a user to select a virtual object using the user input device when the objects are at the hover state.

In certain embodiments, cone 420, ray 424, or a portion thereof may be invisible to the user (e.g., may not be displayed for the user). The wearable system may assign a focus indicator to one or more objects indicating the direction and/or location of the cone. For example, the wearable system may assign a focus indicator to an object which is in front of the user and intersects with the user's direction of gaze. The focus indicator can comprise a halo, a color, a perceived size or depth change (e.g., causing the target object to appear closer and/or larger when selected), a change in the shape of the cursor sprite graphic (e.g. the cursor is changed from a circle to an arrow), or other audible, tactile, or visual effects which draw the user's attention. Cone 420 can have an aperture transverse to ray 424. The size of the aperture can correspond to the size of surface 432 of the cone. For example, a large aperture can correspond to a large diameter 426 on surface 432 while a small aperture can correspond to a small diameter 426 on surface 432.

As further described with reference to FIG. 4B, the aperture can be adjusted by the user, the wearable system, or in combination. For example, the user may adjust the aperture through user interface operations such as selecting an option of the aperture shown on the AR display. The user may also adjust the aperture by actuating the user input device, for example, by scrolling the user input device, or by pressing a button to anchor the size of the aperture. In addition or alterative to inputs from the user, the wearable system can update the size of the aperture based on one or more contextual factors.

Cone casting can be used to increase precision when interacting with objects in the user's environment, especially when those objects are located at a distance where small amounts of movement from the user could translate to large movements of the ray. Cone casting could also be used to decrease the amount of movement necessary from the user in order to have the cone overlap one or more virtual objects. In some implementations, the user can manually update the aperture of the cone and improve the speed and precision of selecting a target object, for example, by using narrower cones when there are many objects and wider cones when there are fewer objects. In other implementations, the wearable system can determine contextual factors associated with objects in the user's environment and permit automatic cone updating, additionally or alternatively to manual updating, which can advantageously make it easier for users to interact with objects in the environment since less user input is needed.

FIG. 4B illustrates an example of cone or ray casting on a group of objects 430 (e.g. objects 430A, 430B) in the user's FOR 400. The objects may be virtual and/or physical objects. During a cone or ray cast, the wearable system can cast a cone 420 or ray 424 (visible or invisible to the user) in a direction and identify any objects that intersect with cone 420 or ray 424. For example, object 430A (shown in bold) intersects with cone 420. Object 430B is outside cone 420 and does not intersect with cone 420.

The wearable system can automatically update the aperture based on contextual information. The contextual information may include information related to the user's environment (e.g. light conditions of the user's virtual or physical environment), the user's preferences, the user's physical conditions (e.g. whether a user is near-sighted), information associated with objects in the user's environment, such as the type of the objects (e.g., physical or virtual) in the user's environment, or the layout of the objects (e.g., the density of the objects, the locations and sizes of the objects, and so forth), the characteristics of the objects that a user is interacting with (e.g., the functions of the objects, the type of user interface operations supported by the objects, etc.), in combination or the like. The density can be measured in a variety of ways, e.g., a number of objects per projected area, a number of objects per solid angle, etc. The density may be represented in other ways such as, e.g., a spacing between neighboring objects (with smaller spacing reflecting increased density). The wearable system can use location information of the objects to determine the layout and density of the objects in a region. As shown in FIG. 4B, the wearable system may determine that the density of the group of objects 430 is high. The wearable system may accordingly use a cone 420 with a smaller aperture.

The wearable system can dynamically update the aperture (e.g. size or shape) based on the user's pose. For example, the user may initially point toward group 430 of objects in FIG. 4B, but as the user moves his hand, the user may now point at a group of objects in that are located sparsely relative to each other. As a result, the wearable system may increase the size of the aperture. Similarly, if the user moves his hand back toward group 430 of objects, the wearable system may decrease the size of the aperture.

Additionally or alternatively, the wearable system can update the aperture size based on user's preference. For example, if the user prefers to select a large group of items at the same time, the wearable system may increase the size of the aperture.

As another example of dynamically updating aperture based on contextual information, if a user is in a dark environment or if the user is near-sighted, the wearable system may increase the size of the aperture so that it is easier for the user to capture objects. In certain implementations, a first cone cast can capture multiple objects. The wearable system can perform a second cone cast to further select a target object among the captured objects. The wearable system can also allow a user to select the target object from the captured objects using body poses or a user input device. The object selection process can be a recursive process where one, two, three, or more cone casts may be performed to select the target object.

FIG. 5 illustrates an example of various keypoints 500 associated with a user's hand that may be detected or tracked by the wearable system, in accordance with some embodiments of the present disclosure. For each of the keypoints, uppercase characters correspond to the region of the hand as follows: "T" corresponds to the thumb, "I" corresponds to the index finger, "M" corresponds to the middle finger, "R" corresponds to the ring finger, "P" corresponds to the pinky, "H" corresponds to the hand, and "F" corresponds to the forearm. Lowercase characters correspond to a more specific location within each region of the hand as follows: "t" corresponds to the tip (e.g., the fingertip), "i" corresponds to the interphalangeal joint ("IP joint"), "d" corresponds to the distal interphalangeal joint ("DIP joint"), "p" corresponds to the proximal interphalangeal joint ("PIP joint"), "m" corresponds to the metacarpophalangeal joint ("MCP joint"), and "c" corresponds to the carpometacarpal joint ("CMC joint").

FIGS. 6A-6F illustrate examples of possible subsets of keypoints 500 that may be selected based on the gesture that is identified by the wearable system, in accordance with some embodiments of the present disclosure. In each of the examples, keypoints included in the selected subset are outlined in bold, keypoints not included in the selected subset are outlined with a dashed line, and optional keypoints that may be selected to facilitate in subsequent determinations are outlined with a solid line. In each of the examples, upon selecting the subset of keypoints, each of the keypoints in the subset may be used to determine the interaction point, the orientation of a virtual multi-DOF controller (e.g., virtual cursor or pointer associated with interaction point), or both.

Figure 6B:
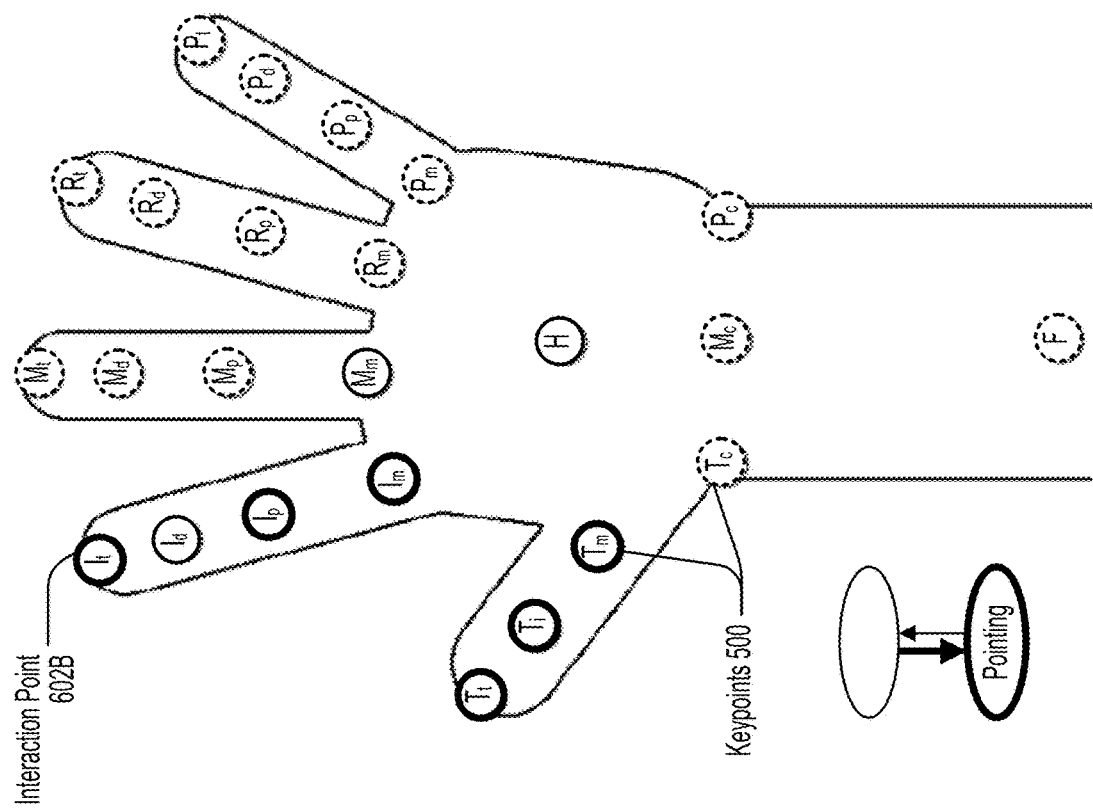
FIGS. 6A-6F illustrate examples of possible subsets of keypoints that may be selected based on a gesture that is identified by a wearable system.
Figure 6A:
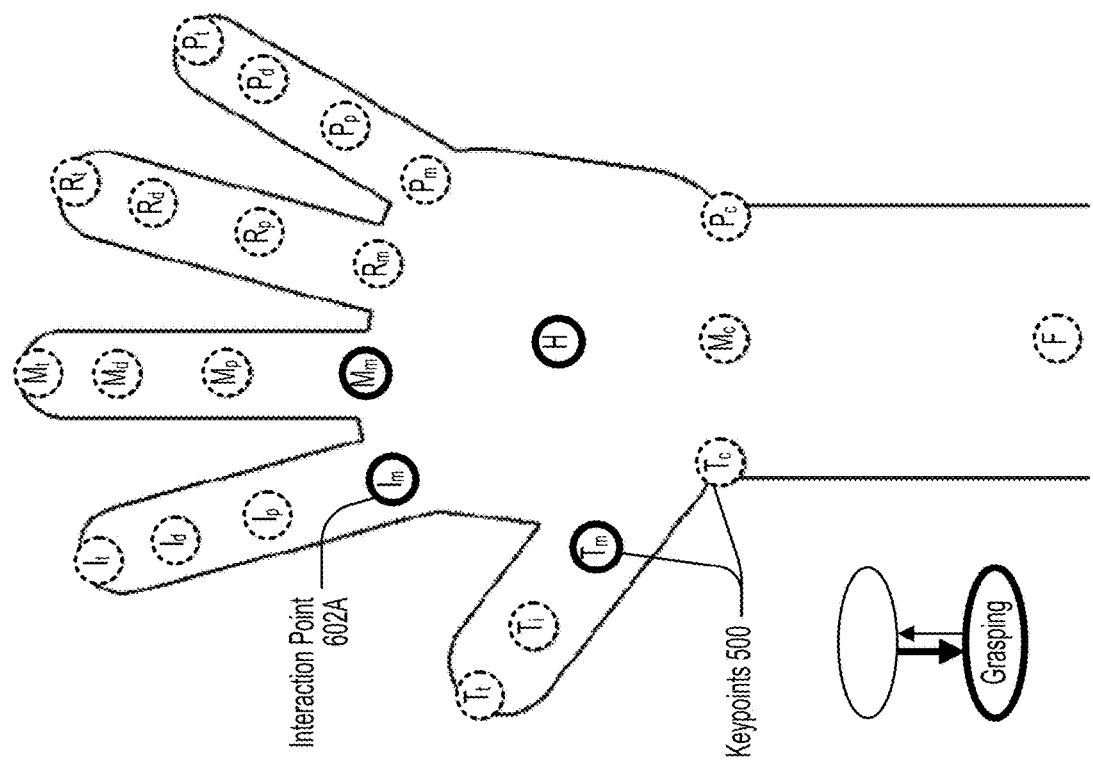

FIG. 6A illustrates an example of a subset of keypoints that may be selected when it is determined that the user's hand is making or is transitioning into making a grasping gesture (e.g., all of the user's fingers are curled inward). In the illustrated example, keypoints $I_m$, $T_m$, $M_m$, and H may be included in the subset and used to determine a particular location to which an interaction point 602A is registered. For instance, interaction point 602A may be registered to keypoint $I_m$. In some examples, the subset of keypoints may also be used to at least in part determine the orientation of a virtual multi-DOF controller associated with interaction point 602A. In some implementations, the subset of keypoints associated with the grasping gesture may include three or more of keypoints $I_m$, $T_m$, $M_m$, and H. In some embodiments, the particular location to which interaction point 602A is to be registered and/or the orientation of a virtual multi-DOF controller may be determined irrespective of some or all keypoints excluded from the subset of keypoints associated with the grasping gesture.

FIG. 6B illustrates an example of a subset of keypoints that may be selected when it is determined that the user's hand is making or is transitioning into making a pointing gesture (e.g., the user's index finger is fully extended outward, while other fingers of the user's hand are curled inward). In the illustrated example, keypoints $I_t$, $I_d$, $I_p$, $I_m$, $T_t$, $T_i$, $T_m$, $M_m$, and H may be included in the subset and used to determine a particular location to which interaction point 602B is registered. For instance, interaction point 602B may be registered to keypoint $I_t$. In some examples, the subset of keypoints may also be used to at least in part determine the orientation of a virtual multi-DOF controller associated with interaction point 602B. In some implementations, the subset of keypoints associated with the pointing gesture may include three or more of keypoints $I_t$, $I_d$, $I_p$, $I_m$, $T_t$, $T_i$, $T_m$, $M_m$, and H. As denoted by the outlines of the keypoints in FIG. 6B, in some embodiments, one or more of keypoints $I_d$, $M_m$, and H may be excluded from the subset of keypoints associated with the pointing gesture. In some embodiments, the particular location to which interaction point 602B is to be registered and/or the orientation of a virtual multi-DOF controller may be determined irrespective of some or all keypoints excluded from the subset of keypoints associated with the pointing gesture.

Figure 6D:
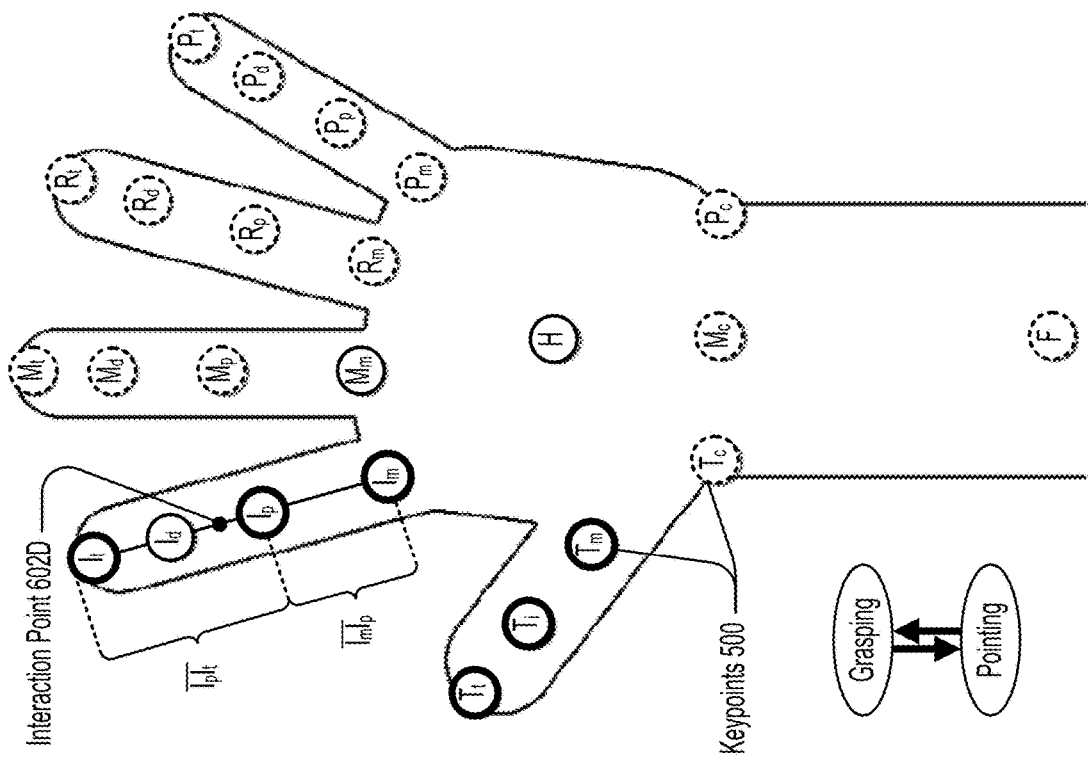
Figure 6C:
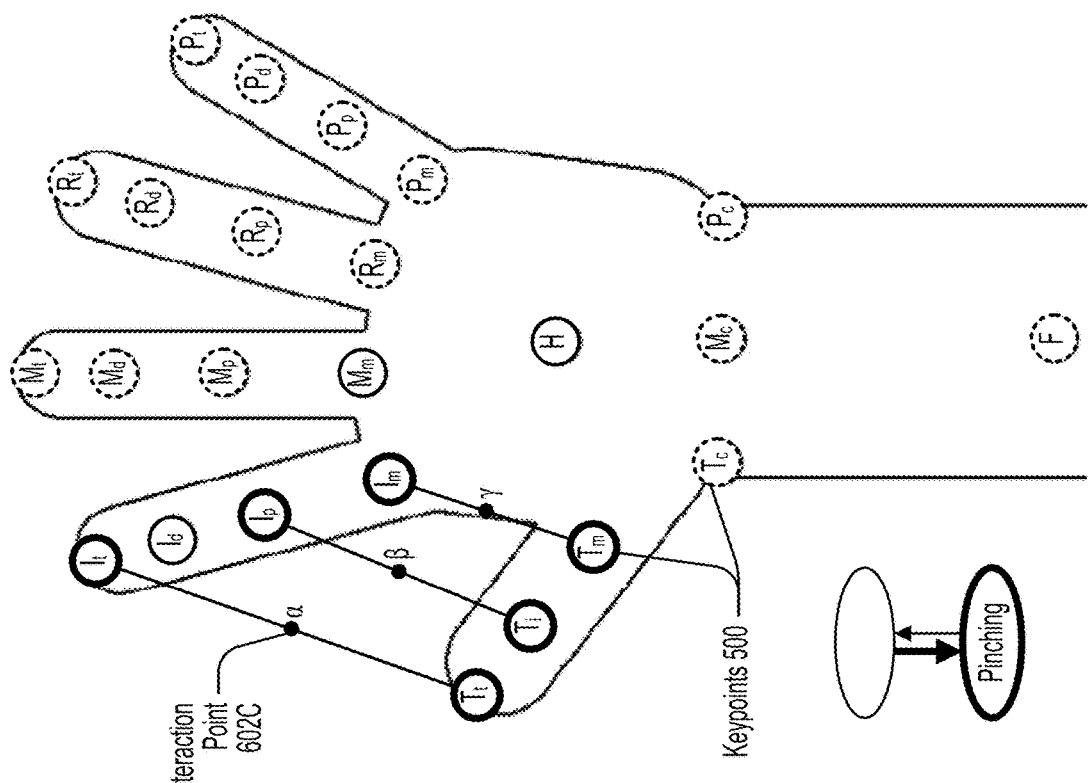

FIG. 6C illustrates an example of a subset of keypoints that may be selected when it is determined that the user's hand is making or is transitioning into making a pinching gesture (e.g., the user's thumb and index finger are at least partially extended outward and in close proximity to one another). In the illustrated example, keypoints $I_t$, $I_d$, $I_p$, $I_m$, $T_t$, $T_i$, $T_m$, $M_m$, and H may be included in the subset and used to determine a particular location to which an interaction point 602C is registered. For instance, interaction point 602C may be registered to a location along $\overline{T_t I_t}$, e.g., the midpoint of $\overline{T_t I_t}$ ("α"). Alternatively, the interaction point may be registered to a location along $\overline{T_i I_p}$, e.g., the midpoint of $\overline{T_i I_p}$ ("β"), or a location along $\overline{T_m I_m}$, e.g., the midpoint of $\overline{T_m I_m}$ ("γ"). Alternatively, the interaction point may be registered to a location along $\overline{T_t I_d}$, e.g., the midpoint of $\overline{T_t I_d}$, or a location along $\overline{T_i I_d}$, e.g., the midpoint of $\overline{T_i I_d}$. In some examples, the subset of keypoints may also be used to at least in part determine the orientation of a virtual multi-DOF controller associated with interaction point 602C. In some implementations, the subset of keypoints associated with the pinching gesture may include three or more of keypoints $I_t$, $I_d$, $I_p$, $I_m$, $T_t$, $T_i$, $T_m$, $M_m$, and H. As denoted by the outlines of the keypoints in FIG. 6C, in some embodiments, one or more of keypoints $I_d$, $M_m$, and H may be excluded from the subset of keypoints associated with the pinching gesture. In some embodiments, the particular location to which interaction point 602C is to be registered and/or the orientation of a virtual multi-DOF controller may be determined irrespective of some or all keypoints excluded from the subset of keypoints associated with the pinching gesture.

FIG. 6D illustrates an example of a subset of keypoints that may be selected when it is determined that the user's hand is transitioning between making a grasping gesture and making a pointing gesture (e.g., the user's index finger is partially extended outward, while other fingers of the user's hand are curled inward). In the illustrated example, keypoints $I_t$, $I_d$, $I_p$, $I_m$, $T_t$, $T_i$, $T_m$, $M_m$, and H may be included in the subset and used to determine a particular location to which an interaction point 602D is registered. For instance, interaction point 602D may be registered to a location along $\overline{I_m I_p}$ or $\overline{I_p I_t}$. Additionally or alternatively, the interaction point may be registered to a location along $\overline{I_m I_t}$, $\overline{I_p I_d}$, or $\overline{I_d I_t}$. In some embodiments, the location to which interaction point 602D is registered relative to the user's hand may travel along $\overline{I_m I_p}$ and $\overline{I_p I_t}$ (or along $\overline{I_m I_t}$, $\overline{I_p I_d}$, and/or $\overline{I_d I_t}$) as the user transitions between grasping and pointing gestures, and a visual representation of interaction point 602D that is displayed for the user (e.g., a ray) may reflect the same. That is, in these embodiments, the location to which interaction point 602D is registered relative to the user's hand may not abruptly snap between keypoints $I_m$ and $I_t$ when the user transitions between grasping and pointing gestures, but rather glide along one or more paths between such keypoints so as to provide a smoother and more intuitive user experience.

In some examples, when the user transitions between grasping and pointing gestures, the location at which a visual representation of interaction point 602D is displayed relative to the user's hand may intentionally trail that of the actual interaction point 602D according to the current positions of the subset of keypoints at a given point in time. For example, when the user transitions between grasping and pointing gestures, the location at which the visual representation of interaction point 602D is displayed for the user in the $n^{th}$ frame may correspond to the location the actual interaction point 602D according to the positions of the subset of keypoints in the $(n-m)^{th}$ frame, where m is a predetermined number of frames (e.g., a fixed time delay). In another example, when the user transitions between grasping and pointing gestures, the visual representation of interaction point 602D is displayed for the user may be configured to move at a fraction of the speed (e.g., a predetermined percentage) of the actual interaction point 602D according to the current positions of the subset of keypoints at a given point in time. In some embodiments, one or more filters or filtering techniques may be employed to achieve one or more of these behaviors. In some implementations, when the user is not transitioning between gestures or is otherwise maintaining a particular gesture, there may be little or no difference in the location at which the visual representation of interaction point 602D is displayed relative to the user's hand and the location of the actual interaction point 602D according to the current positions of the subset of keypoints at any given point in time. Other configurations are possible.

Figure 6F:
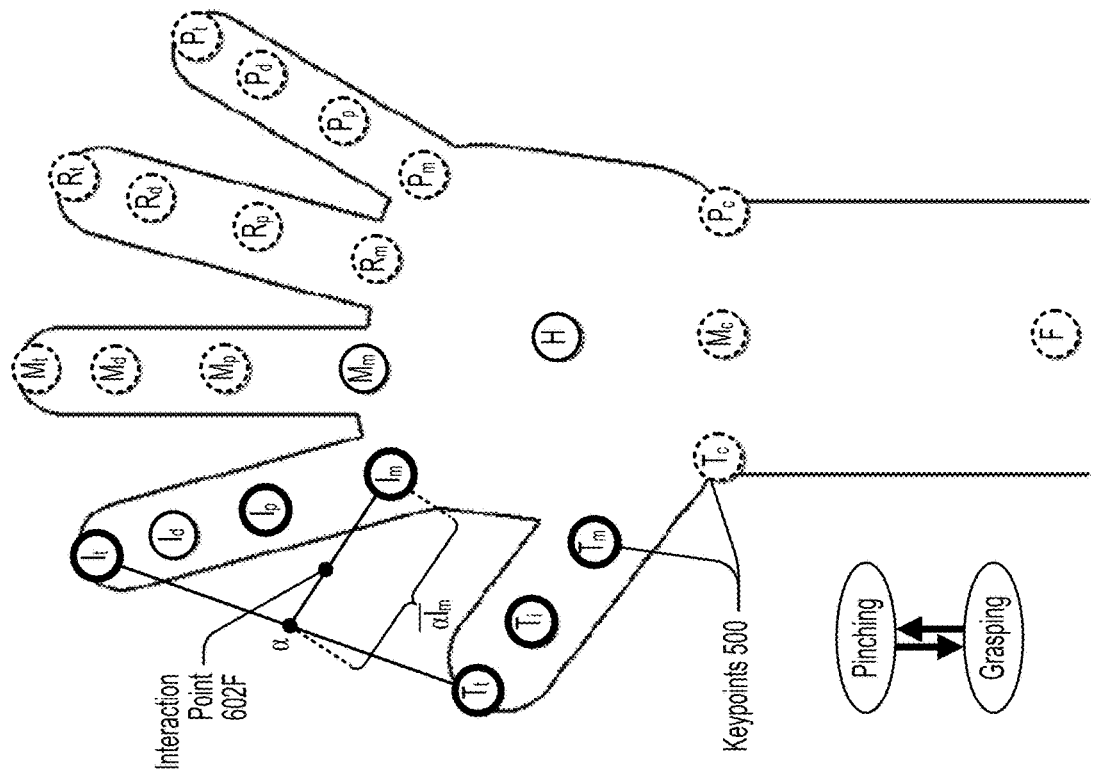
Figure 6E:
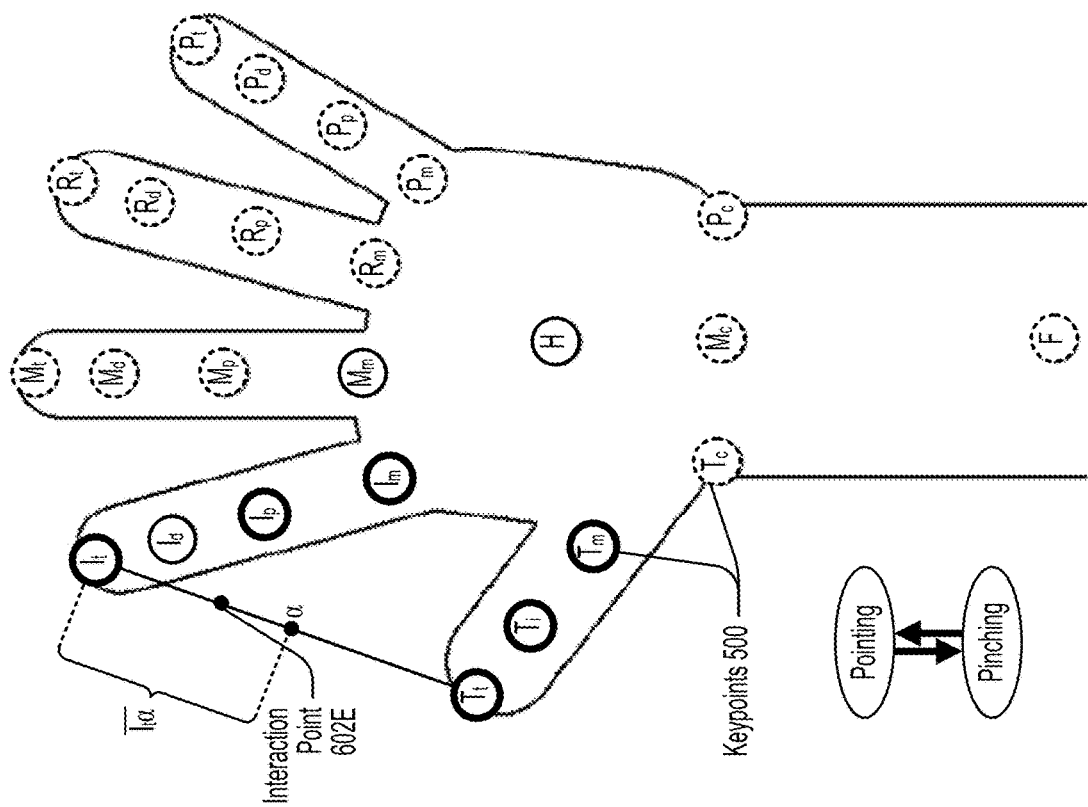

FIG. 6E illustrates an example of a subset of keypoints that may be selected when it is determined that the user's hand is transitioning between making a pointing gesture and making a pinching gesture (e.g., the user's thumb and index finger are at least partially extended outward and at least partially curled toward one another). In the illustrated example, keypoints $I_t$, $I_d$, $I_p$, $I_m$, $T_t$, $T_i$, $T_m$, $M_m$, and H may be included in the subset and used to determine a particular location to which an interaction point 602E is registered. For instance, interaction point 602E may be registered to a location along $\overline{I_t \alpha}$. In some embodiments, when the user transitions between pointing and pinching gestures, a visual representation of interaction point 602E may be displayed for the user (e.g., a ray) and/or the actual interaction point 602E according to the current positions of the subset of keypoints at a given point in time may behave in a manner similar or equivalent to that which has been described above in reference to FIG. 6D, which may serve to enhance user experience.

FIG. 6F illustrates an example of a subset of keypoints that may be selected when it is determined that the user's hand is transitioning between making a pinching gesture and making a grasping gesture (e.g., the user's thumb and index finger are at least partially extended outward and at least partially curled toward one another). In the illustrated example, keypoints $I_t$, $I_d$, $I_p$, $I_m$, $T_t$, $T_i$, $T_m$, $M_m$, and H may be included in the subset and used to determine a particular location to which an interaction point 602F is registered. For instance, interaction point 602F may be registered to a location along location along $\overline{\alpha I_m}$. In some embodiments, when the user transitions between pinching and grasping gestures, a visual representation of interaction point 602F may be displayed for the user (e.g., a ray) and/or the actual interaction point 602F according to the current positions of the subset of keypoints at a given point in time may behave in a manner similar or equivalent to that which has been described above in reference to FIGS. 6D-6E, which may serve to enhance the user experience.

FIGS. 7A-7C illustrate examples of ray casting for various gestures while the user's arm is extended outward, in accordance with some embodiments of the present disclosure. FIG. 7A illustrates a user making a grasping gesture while their arm is extended outward. An interaction point 702A is registered to keypoint $I_m$ (as described in reference to FIG. 6A) and a proximal point 704A is registered to a location at the user's shoulder (labeled "S"). A ray 706A may be cast from proximal point 704A through interaction point 702A.

FIG. 7B illustrates a user making a pointing gesture while their arm is extended outward. An interaction point 702B is registered to keypoint $I_t$ (as described in reference to FIG. 6B) and a proximal point 704B is registered to a location at the user's shoulder (labeled "S"). A ray 706B may be cast from proximal point 704B through interaction point 702B. FIG. 7C illustrates a user making a pinching gesture while their arm is extended outward. An interaction point 702C is registered to location a (as described in reference to FIG. 6C) and a proximal point 704C is registered to a location at the user's shoulder (labeled "S"). A ray 706C may be cast from proximal point 704C through interaction point 702C. The ranges of locations to which interaction points may be registered as the user transitions between the gestures of FIGS. 7A & 7B, the gestures of FIGS. 7B & 7C, and the gestures of FIGS. 7A & 7C are described in further detail above in reference FIG. 6D, FIG. 6E, and FIG. 6F, respectively.

FIGS. 8A-8C illustrate examples of ray casting for various gestures while the user's arm is retracted inward, in accordance with some embodiments of the present disclosure. FIG. 8A illustrates a user making a grasping gesture while their arm is retracted inward. An interaction point 802A is registered to keypoint $I_m$ (as described in reference to FIG. 6A) and a proximal point 804A is registered to a location at the user's elbow (labeled "E"). A ray 806A may be cast from proximal point 804A through interaction point 802A.

FIG. 8B illustrates a user making a pointing gesture while their arm is retracted inward. An interaction point 802B is registered to keypoint $I_t$ (as described in reference to FIG. 6B) and a proximal point 804B is registered to a location at the user's elbow (labeled "E"). A ray 806B may be cast from proximal point 804B through interaction point 802B. FIG. 8C illustrates a user making a pinching gesture while their arm is retracted inward. An interaction point 802C is registered to location a (as described in reference to FIG. 6C) and a proximal point 804C is registered to a location at the user's elbow (labeled "E"). A ray 806C may be cast from proximal point 804C through interaction point 802C. The ranges of locations to which interaction points may be registered as the user transitions between the gestures of FIGS. 8A & 8B, the gestures of FIGS. 8B & 8C, and the gestures of FIGS. 8A & 8C are also described in further detail above in reference FIG. 6D, FIG. 6E, and FIG. 6F, respectively.

It can be seen that the locations to which proximal points 704A-704C of FIGS. 7A-7C are registered relative to the user's body differ from the locations to which proximal points 804A-804C of FIGS. 8A-8C are registered relative to the user's body. Such differences in location may be a result of, among other things, the difference between the position and/or orientation of one or more portions of the user's arm in FIGS. 7A-7C (e.g., the user's arm is extended outward) and the position and/or orientation of one or more portions of the user's arm in FIGS. 8A-8C (e.g., user's arm is retracted inward). As such, in transitioning between the position and/or orientation of one or more portions of the user's arm in FIGS. 7A-7C and the position and/or orientation of one or more portions of the user's arm in FIGS. 8A-8C, the location to which the proximal point is registered may transition between a location at the user's shoulder ("S") and a location at the user's elbow ("E"). In some embodiments, when the position and/or orientation of one or more portions of the user's arm transitions between that of FIGS. 7A-7C and that of FIGS. 8A-8C, the proximal point and one or more visual representations associated therewith may behave in a manner similar or equivalent to that which has been described above in reference to FIGS. 6D-6F, which may serve to enhance user experience.

In some embodiments, the system may register the proximal point to one or more estimated locations within or along the surface of the user's knuckle(s), hand, wrist, forearm, elbow, arm (e.g., upper arm), shoulder, shoulder blade, neck, head, eye(s), face (e.g., cheek), chest, torso (e.g., naval region), or a combination thereof. In at least some of these embodiments, the system may cause the location to which the proximal point is registered to dynamically shift between such one or more estimated locations based on at least one of a variety of different factors. For example, the system may determine the location to which the proximal point is to be registered based on at least one of a variety of different factors including (a) a gesture that the user's hand is determined to be making or transitioning to making (e.g., grasping, pointing, pinching, etc.), (b) a position and/or orientation of the subset of keypoints associated with a gesture that the user's hand is determined to be making or transitioning to making, (c) a position of the interaction point, (d) an estimated position and/or orientation (e.g., pitch, yaw, and/or roll) of the user's hand, (e) one or more measures of wrist flexion and/or extension, (f) one or more measures of wrist adduction and/or abduction, (g) an estimated position and/or orientation (e.g., pitch, yaw, and/or roll) of the user's forearm, (h) one or more measures of forearm supination and/or pronation, (i) one or more measures of elbow flexion and/or extension, (j) an estimated position and/or orientation (e.g., pitch, yaw, and/or roll) of the user's arm (e.g., upper arm), (k) one or more measures of shoulder medial rotation and/or lateral rotation, (l) one or more measures of shoulder flexion and/or extension, (m) one or more measures of shoulder adduction and/or abduction, (n) an estimated position and/or orientation of the user's head, (o) an estimated position and/or orientation of the wearable device, (p) an estimated distance between the user's hand or interaction point and the user's head or the wearable device, (q) an estimated length or span of the user's entire arm (e.g., from shoulder to fingertip) or at least one portion thereof, (r) one or more measures of the user's visually coordinated attention, or (s) a combination thereof.

In some embodiments, the system may determine or otherwise evaluate one or more of the aforementioned factors based at least in part on data received from one or more outward-facing cameras, data received from one or more inward-facing cameras, data received from one or more other sensors of the system, data received as user input, or a combination thereof. In some embodiments, when one or more of the abovementioned factors vary, the proximal point and one or more visual representations associated therewith may behave in a manner similar or equivalent to that which has been described above in reference to FIGS. 6D-8C, which may serve to enhance user experience.

In some embodiments, the system may be configured such that (i) wrist adductions may serve to bias the location to which the proximal point is determined to be registered along the user's arm toward the user's knuckle(s), while wrist abductions may serve to bias the location to which the proximal point is determined to be registered along the user's arm toward the user's shoulder, neck, or other locations closer to the center of the user's body, (ii) elbow flexions may serve to bias the locations to which the proximal point is registered downward toward the naval region of the user's body, while elbow extensions may serve to bias the locations to which the proximal point is registered downward toward the user's head, shoulder, or other locations in the upper portion of the user's body, (iii) shoulder medial rotations may serve to bias the location to which the proximal point is determined to be registered toward the user's along the user's arm toward the user's elbow, hand, or knuckle(s), while shoulder lateral rotations may serve to bias the location to which the proximal point is determined to be registered toward the user's shoulder, neck, or other locations closer to the center of the user's body, (iv) shoulder adductions may serve to bias the location to which the proximal point is determined to be registered toward the user's head, neck, chest, or other locations closer to the center of the user's body, while shoulder abductions may serve to bias the location to which the proximal point is determined to be registered along the user's arm toward the user's shoulder, arm, or other locations further from the center of the user's body, or (v) a combination thereof. As such, in these embodiments, the location to which the proximal point is determined by the system to be registered may dynamically change over time as the user repositions and/or reorients one or more of their hand, forearm, and arm. In some examples, the system may assign different weights to different factors and determine the location to which the proximal point is to be registered based on one or more such factors and their assigned weights. For example, the system may be configured to give more weight to one or more measures of the user's visually coordinated attention than to some or all of the other aforementioned factors. Other configurations are possible.

For examples in which the system is configured to cause the location to which the proximal point is registered to dynamically shift between such one or more estimated locations based at least in part on one or more measures of the user's visually coordinated attention, such one or more measures may be determined by the system based at least in part on the user's eye gaze, one or more characteristics of virtual content that is being presented to the user, hand position and/or orientation, one or more transmodal convergences and/or divergences, or a combination thereof. Examples of transmodal convergences and divergences, as well as systems and techniques for detecting and responding to occurrences of such transmodal convergences and divergences are provided in U.S. Patent Publication No. 2019/0362557, which is incorporated by reference herein in its entirety. In some embodiments, the system may leverage one or more of the systems and/or techniques described in the aforementioned patent application to detect occurrences of one or more transmodal convergences and/or divergences, and may further determine the location of the proximal point based at least in part on detected occurrences of one or more transmodal convergences and/or divergences. Other configurations are possible.

Figure 9:
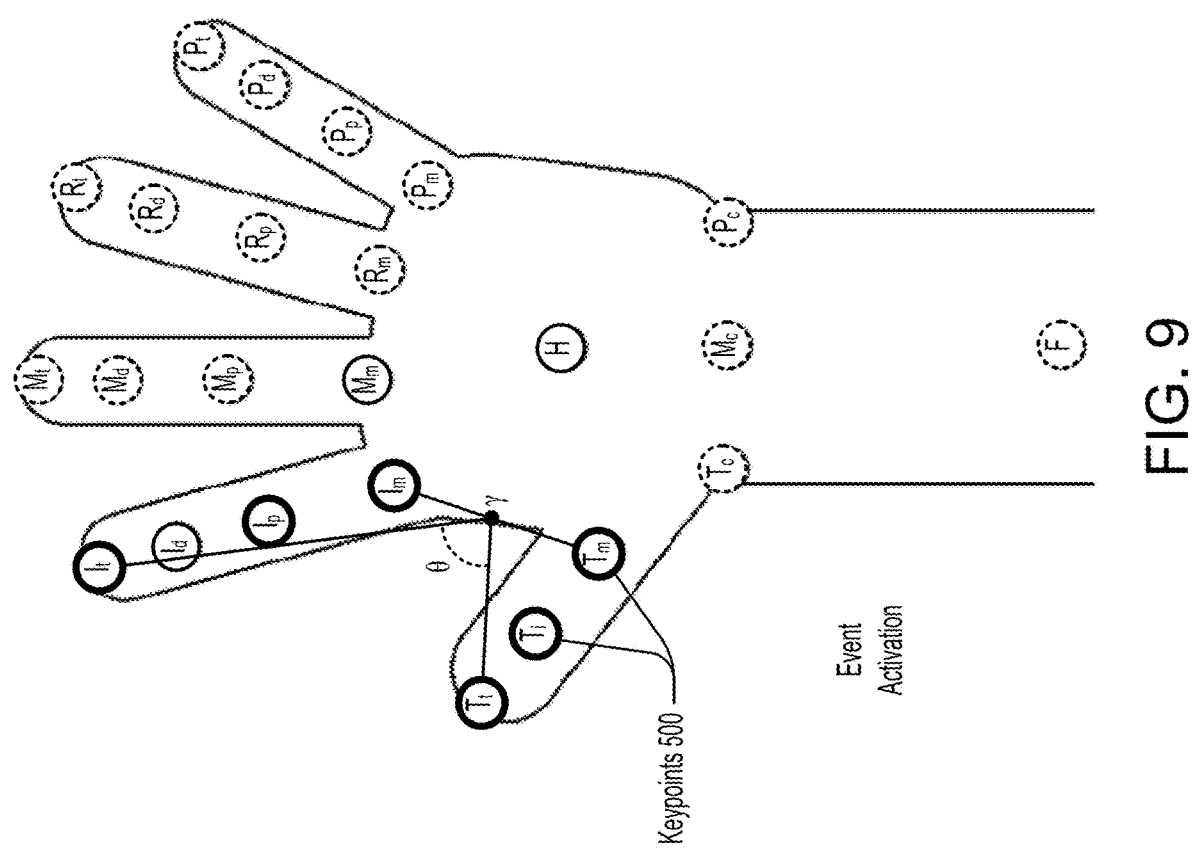
FIG. 9 illustrates an example of how action events can be detected using keypoints.

FIG. 9 illustrates an example of how action events (e.g., hover, touch, tap, hold, etc.) can be detected using keypoints, in accordance with some embodiments of the present disclosure. In some embodiments, an action event may be detected based least in part on an angle $\theta$ measured between $\overline{\gamma I_t}$ and $\overline{\gamma T_t}$ (i.e., $\theta = \angle I_t \gamma T_t$), where $\gamma$ represents the midpoint of $\overline{T_m I_m}$. For example, a "hover" action event may be detected if $\theta$ is determined to be greater than a predetermined threshold value, while a "touch" action event may be detected if $\theta$ is determined to be less than the predetermined threshold value. As another example, the "tap" and "hold" action events may be detected based on the duration of time for which $\theta$ is determined to be less than the predetermined threshold value. In the illustrated example, $I_t$ and $T_t$ may represent keypoints that are included in a subset of keypoints selected responsive to a determination that the user is making or transitioning to making a particular gesture (e.g., pinching gesture).

Figure 10A:
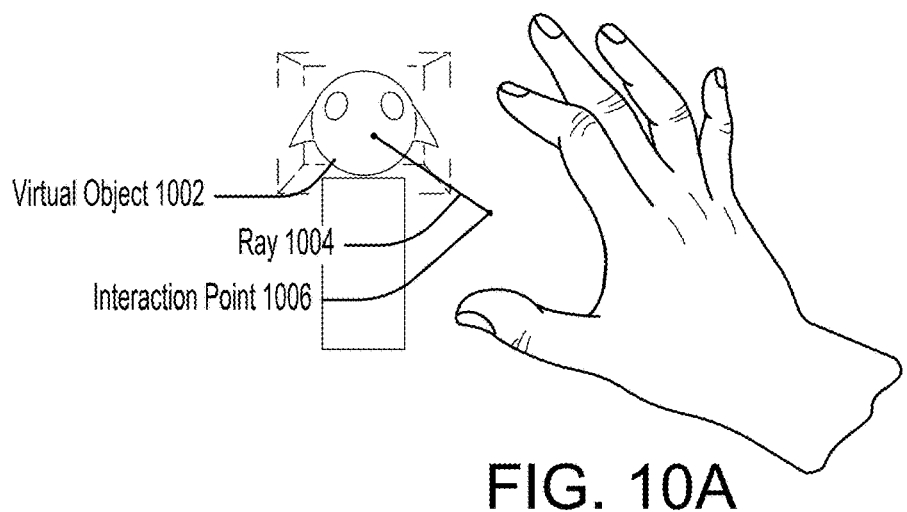
FIGS. 10A-10C illustrate example interactions with a virtual object using a ray.
Figure 10B:
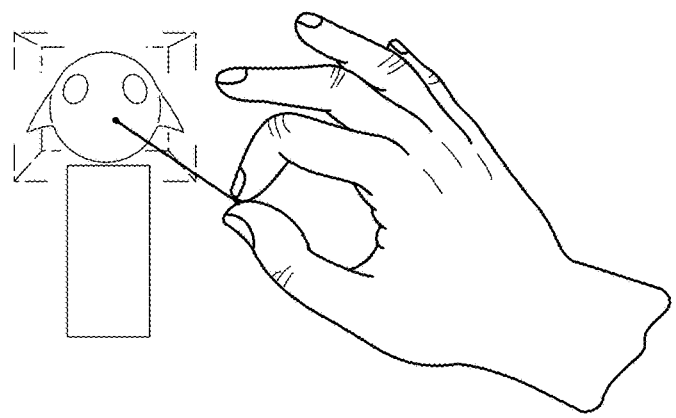
Figure 10C:
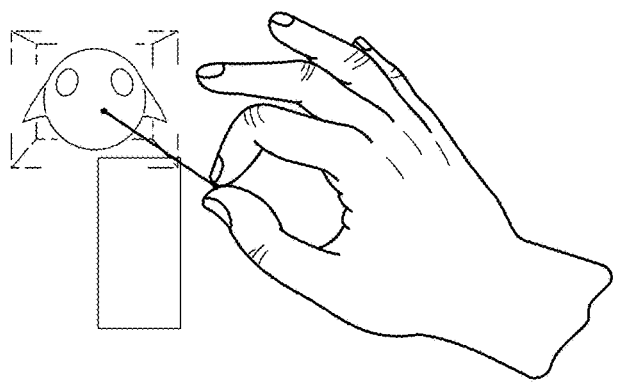

FIGS. 10A-10C illustrate example interactions with a virtual object using a ray, in accordance with some embodiments of the present disclosure. FIGS. 10A-10C demonstrate how some of the paradigms conveyed above can be employed in a wearable system and leveraged by users for totem-less interaction (e.g., interaction without the use of physical handheld controllers). Each of FIGS. 10A-10C includes a rendering of what a user of the wearable system might see at various points in time while using their hand to interact with a virtual object 1002. In this example, the user is able to manipulate the position of the virtual object by: (1) making a pinching gesture with their hand so as to conjure a virtual 6DoF ray 1004, (2) positioning their hand such that the virtual 6DoF ray intersects with the virtual object, (3) bringing the tip of their thumb and the tip of their index finger closer together while maintaining the position of their hand such that the value of angle θ transitions from being greater than a threshold value to being less than said threshold value while the virtual 6DoF ray is intersecting with the virtual object, and (4) guiding their hand to a new location while keeping their thumb and index finger pinched closely together so as to maintain the angle θ at a value below the threshold value.

FIG. 10A illustrates an interaction point 1006 registered to the α location while the user's hand is determined to be making a pinching gesture. The α location may be determined based on the positions of a subset of keypoints associated with the pinching gesture (e.g., $I_t$, $I_p$, $I_m$, $T_t$, $T_i$, and $T_m$) selected in response to determining that the user is making or transitioning to making the pinching gesture. This selected subset of keypoints may be tracked, utilized for determining the location to which register the interaction point 1006 (e.g., the α location), and further utilized for determining an angle θ that is similar or equivalent to that which has been described above in reference to FIG. 9.

In the illustrated example of FIG. 10A, ray 1004 has been cast through the interaction point from a location in the vicinity of the user's right shoulder or upper arm. A graphical representation of a portion of the ray from the interaction point onward is displayed through the headset and leveraged by the user as a sort of pointer or cursor with which to interact with virtual object 1002. In FIG. 10A, the user has positioned their hand such that the virtual 6DoF ray intersects the virtual object. Here, the angle θ is presumably greater than a threshold value, such that the user is considered to be merely "hovering" over the virtual object with the virtual 6DoF ray. As such, the system may compare the angle θ to one or more threshold values, and may determine whether the user is considered to be touching, grabbing, or otherwise selecting virtual content based on the comparison. In the illustrated example, the system may determine that the angle θ is greater than one or more threshold values and thus determine that the user is not considered to be touching, grabbing, or otherwise selecting virtual content.

FIG. 10B illustrates the user's hand still being positioned such that the virtual 6DoF ray intersects the virtual object and is still making a pinching gesture (note that the interaction point is still registered to the α location). However, in FIG. 10B, the user has brought the tip of their thumb and the tip of their index finger closer together. Thus, in FIG. 10B, the angle θ is presumably lower than one or more threshold values, such that the user is now considered to be touching, grabbing, or otherwise selecting the virtual object with the virtual 6DoF ray.

FIG. 10C illustrates the user still making the same pinching gesture as they were in the previous image, and thus the angle θ is presumably lower than the threshold value. However, in FIG. 10C, the user has moved their arm while keeping their thumb and index finger pinched closely together so as to effectively drag the virtual object to a new location. It should be noted that the interaction point has traveled with the user's hand by virtue of being registered to the α location. Although not shown in FIGS. 10A-10C, instead of or in addition to adjusting the position of the virtual object by adjusting the position of the interaction point relative to the headset while "holding" the virtual object, the user may also be able to adjust the orientation of the virtual object (e.g., the yaw, pitch, and/or roll of the virtual object) by adjusting the orientation of the system of keypoints (e.g., the yaw, pitch, and/or roll of at least one vector and/or at least one plane defined by at least two and/or at least three keypoints included in the selected subset of keypoints, respectively) associated with the pinching gesture relative to the headset while "holding" the virtual object. Although not shown in FIGS. 10A-10C, after manipulating the position and/or orientation of the virtual object, the user may "let go" of the virtual object by separating their thumb and index finger. In such an example, the system may determine that the angle θ is once again greater than one or more threshold values and thus determine that the user is once again not considered to be touching, grabbing, or otherwise selecting virtual content.

Figure 11:
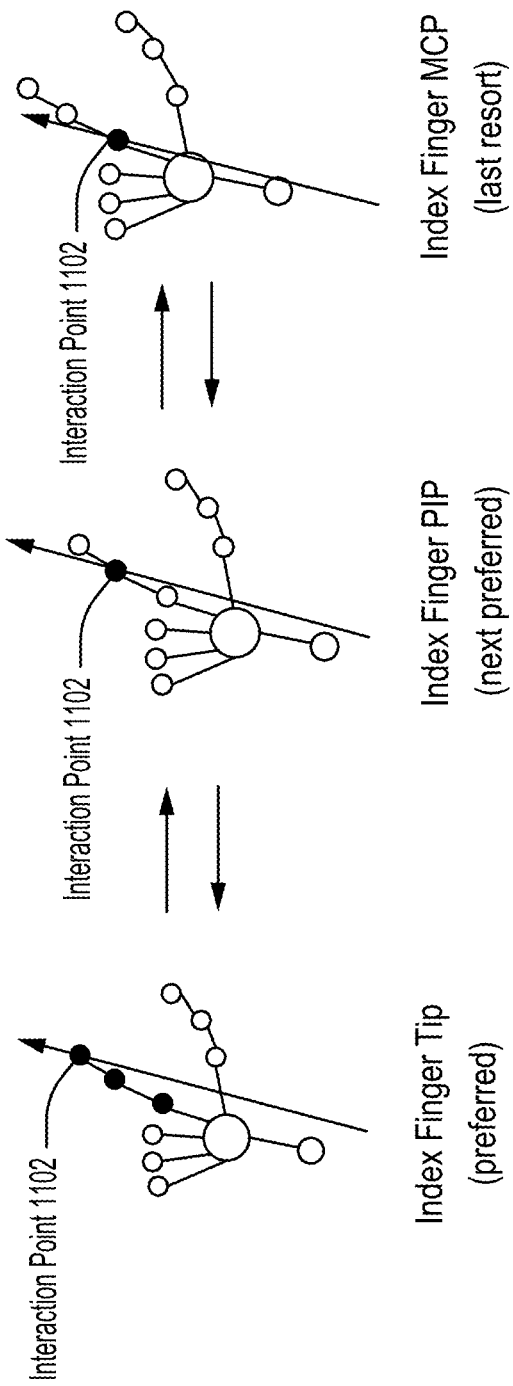
FIG. 11 illustrates an example scheme for managing a pointing gesture.

FIG. 11 illustrates an example scheme for managing the pointing gesture, in accordance with some embodiments of the present disclosure. An interaction point 1102 is preferably registered to the index finger tip keypoint (e.g., the $I_t$ keypoint). When the index finger tip is unavailable (e.g., occluded or below a critical confidence level), interaction point 1102 is moved to the next nearest neighbor, the index finger PIP keypoint (e.g., the $I_p$ keypoint). When the index finger PIP is unavailable (e.g., occluded or below a critical confidence level), interaction point 1102 is moved to the index finger MCP keypoint (e.g., the $I_m$ keypoint). In some embodiments, a filter is applied to smooth transitions between different possible keypoints.

Figure 12:
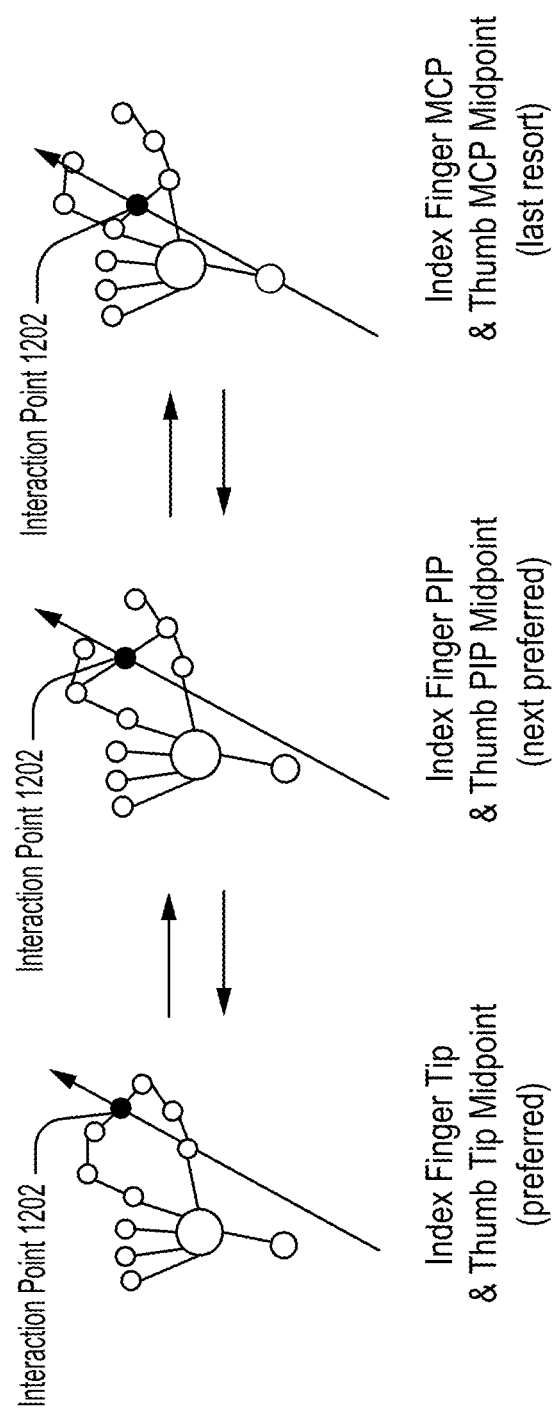
FIG. 12 illustrates an example scheme for managing a pinching gesture.

FIG. 12 illustrates an example scheme for managing the pinching gesture, in accordance with some embodiments of the present disclosure. An interaction point 1202 is preferably registered to the midpoint between the index finger tip keypoint and the thumb tip keypoint (e.g., the α location described above in reference to FIG. 6C). If the index finger tip keypoint is unavailable (e.g., occluded or below a critical confidence level), interaction point 1202 is moved to the midpoint between the index finger PIP keypoint and the thumb tip keypoint. If the thumb finger tip keypoint is unavailable (e.g., occluded or below a critical confidence level), interaction point 1202 is moved to the midpoint between the index finger tip keypoint and the thumb IP keypoint.

If both the index finger tip keypoint and the thumb tip keypoint are unavailable, interaction point 1202 is moved to the midpoint between the index finger PIP keypoint and the thumb IP keypoint (e.g., the β location described above in reference to FIG. 6C). If the index finger PIP keypoint is unavailable (e.g., occluded or below a critical confidence level), interaction point 1202 is moved to the midpoint between the index finger MCP keypoint and the thumb IP keypoint. If the thumb finger IP keypoint is unavailable (e.g., occluded or below a critical confidence level), interaction point 1202 is moved to the midpoint between the index finger PIP keypoint and the thumb MCP keypoint. If both the index finger PIP keypoint and the thumb IP keypoint are unavailable, interaction point 1202 is moved to the midpoint between the index finger MCP keypoint and the thumb MCP keypoint (e.g., the γ location described above in reference to FIG. 6C).

Figure 13:
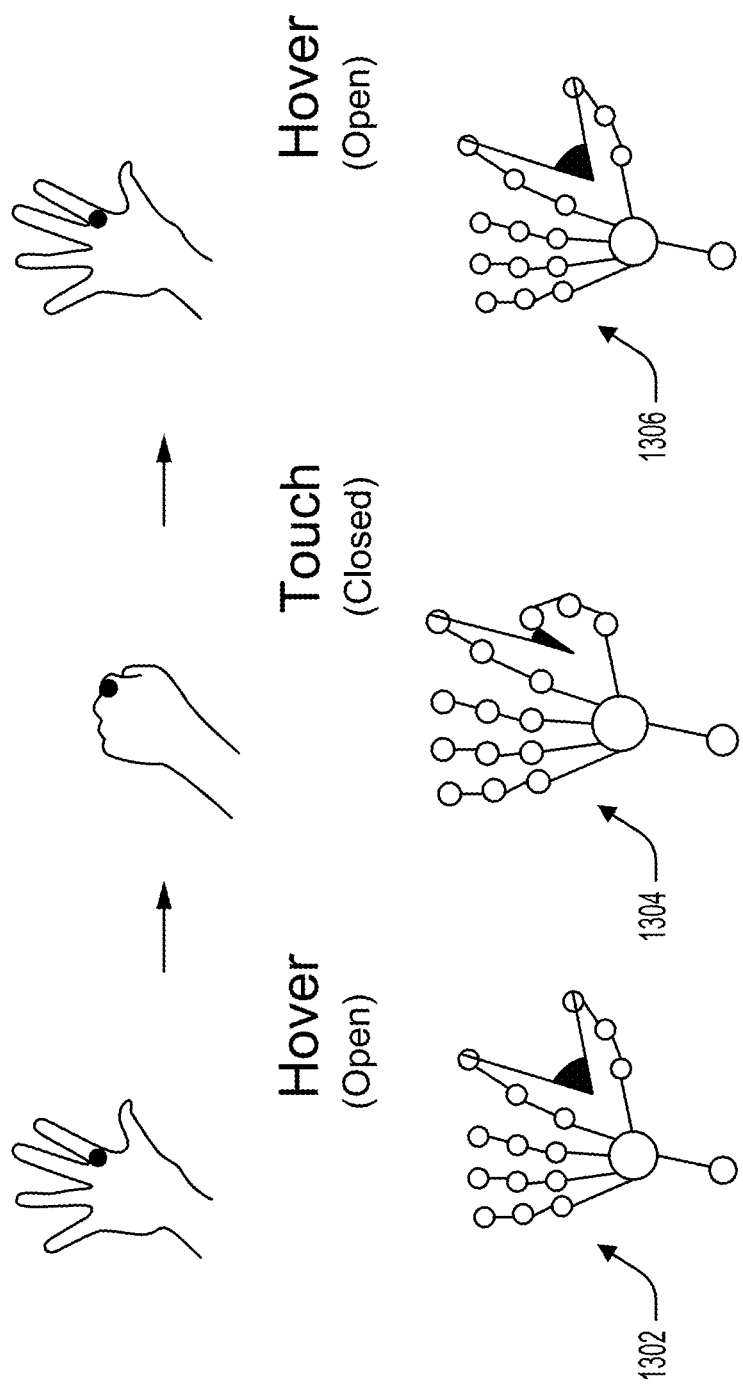
FIG. 13 illustrates an example scheme for detecting an action event while a user's hand is making a grasping gesture.

FIG. 13 illustrates an example scheme for detecting an action event while the user's hand is making the grasping gesture, in accordance with some embodiments of the present disclosure. The relative angular distance and the relative angular velocity may be tracked based on the angle between the index finger and the thumb vectors. If the index tip keypoint is unavailable, the index PIP keypoint may be used to form the angle. If the thumb tip keypoint is unavailable, the thumb IP keypoint may be used to form the angle. Additional description regarding the subset of keypoints that may be selectively tracked while the user is determined to be making the grasping gesture of FIG. 13 is provided above in reference to FIG. 6A.

At 1302, a first relative maximum angular distance (with its timestamp) may be detected. At 1304, a relative minimum angular distance (with its timestamp) may be detected. At 1306, a second relative maximum angular distance (with its timestamp) may be detected. It may be determined that an action event has been performed based on the differences in angular distance and the differences in times between the data detected at 1302, 1304, and 1306.

For example, the differences between the first relative maximum angular distance and the relative minimum angular distance may be compared to one or more first thresholds (e.g., upper and lower threshold), the differences between the relative minimum angular distance and the second relative maximum angular distance may be compared to one or more second thresholds (e.g., upper and lower threshold), the differences between the time stamps of the first relative maximum angular distance and the relative minimum angular distance may be compared to one or more third thresholds (e.g., upper and lower threshold), and the differences between the time stamps of the relative minimum angular distance and the second relative maximum angular distance may be compared to one or more fourth thresholds (e.g., upper and lower threshold).

Figure 14:
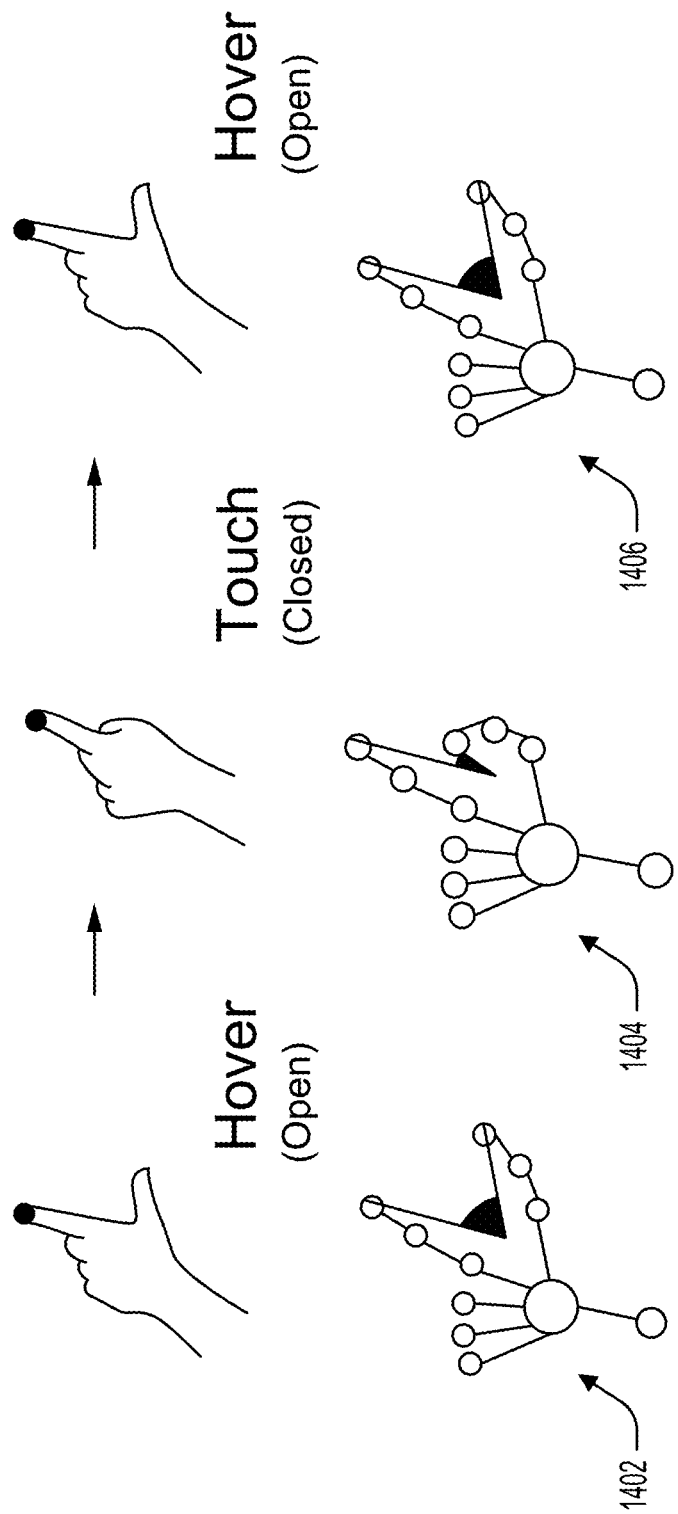
FIG. 14 illustrates an example scheme for detecting an action event while a user's hand is making a pointing gesture.

FIG. 14 illustrates an example scheme for detecting an action event while the user's hand is making the pointing gesture, in accordance with some embodiments of the present disclosure. The relative angular distance may be tracked based on the angle between the index finger and the thumb vectors. At 1402, a first relative maximum angular distance (with its timestamp) may be detected. At 1404, a relative minimum angular distance (with its timestamp) may be detected. At 1406, a second relative maximum angular distance (with its timestamp) may be detected. It may be determined that an action event has been performed based on the differences in angular distance and the differences in times between the data detected at 1402, 1404, and 1406. In some examples, such an angular distance may be at least analogous to the angle θ described above in reference to FIGS. 9 and 10A-10C. Additional description regarding the subset of keypoints that may be selectively tracked while the user is determined to be making the pointing gesture of FIG. 14 is provided above in reference to FIG. 6B.

For example, the differences between the first relative maximum angular distance and the relative minimum angular distance may be compared to one or more first thresholds (e.g., upper and lower threshold), the differences between the relative minimum angular distance and the second relative maximum angular distance may be compared to one or more second thresholds (e.g., upper and lower threshold), the differences between the time stamps of the first relative maximum angular distance and the relative minimum angular distance may be compared to one or more third thresholds (e.g., upper and lower threshold), and the differences between the time stamps of the relative minimum angular distance and the second relative maximum angular distance may be compared to one or more fourth thresholds (e.g., upper and lower threshold).

Figure 15:
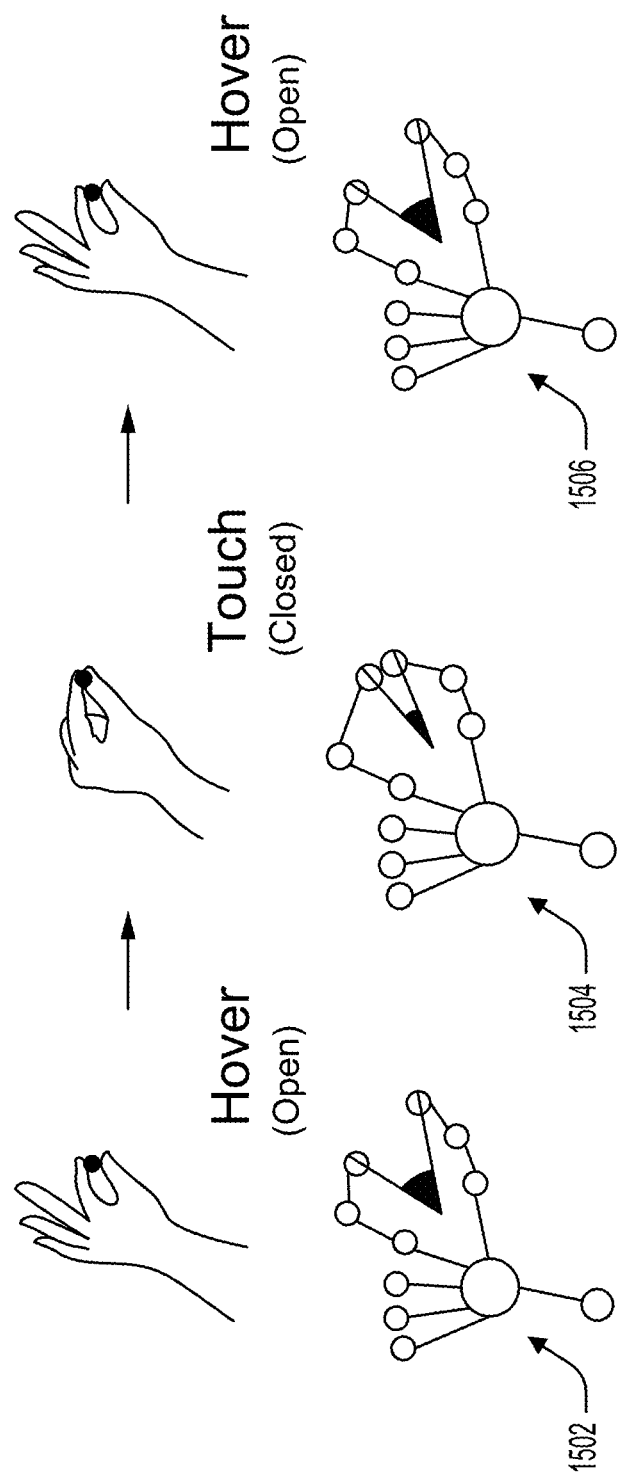
FIG. 15 illustrates an example scheme for detecting an action event while a user's hand is making a pinching gesture.

FIG. 15 illustrates an example scheme for detecting an action event while the user's hand is making the pinching gesture, in accordance with some embodiments of the present disclosure. The relative angular distance may be tracked based on the angle between the index finger and the thumb vectors. At 1502, a first relative maximum angular distance (with its timestamp) may be detected. At 1504, a relative minimum angular distance (with its timestamp) may be detected. At 1506, a second relative maximum angular distance (with its timestamp) may be detected. It may be determined that an action event has been performed based on the differences in angular distance and the differences in times between the data detected at 1502, 1504, and 1506. In some examples, such an angular distance may be at least analogous to the angle θ described above in reference to FIGS. 9 and 10A-10C. Additional description regarding the subset of keypoints that may be selectively tracked while the user is determined to be making the pinching gesture of FIG. 15 is provided above in reference to FIG. 6C.

For example, the differences between the first relative maximum angular distance and the relative minimum angular distance may be compared to one or more first thresholds (e.g., upper and lower threshold), the differences between the relative minimum angular distance and the second relative maximum angular distance may be compared to one or more second thresholds (e.g., upper and lower threshold), the differences between the time stamps of the first relative maximum angular distance and the relative minimum angular distance may be compared to one or more third thresholds (e.g., upper and lower threshold), and the differences between the time stamps of the relative minimum angular distance and the second relative maximum angular distance may be compared to one or more fourth thresholds (e.g., upper and lower threshold).

Figure 16:
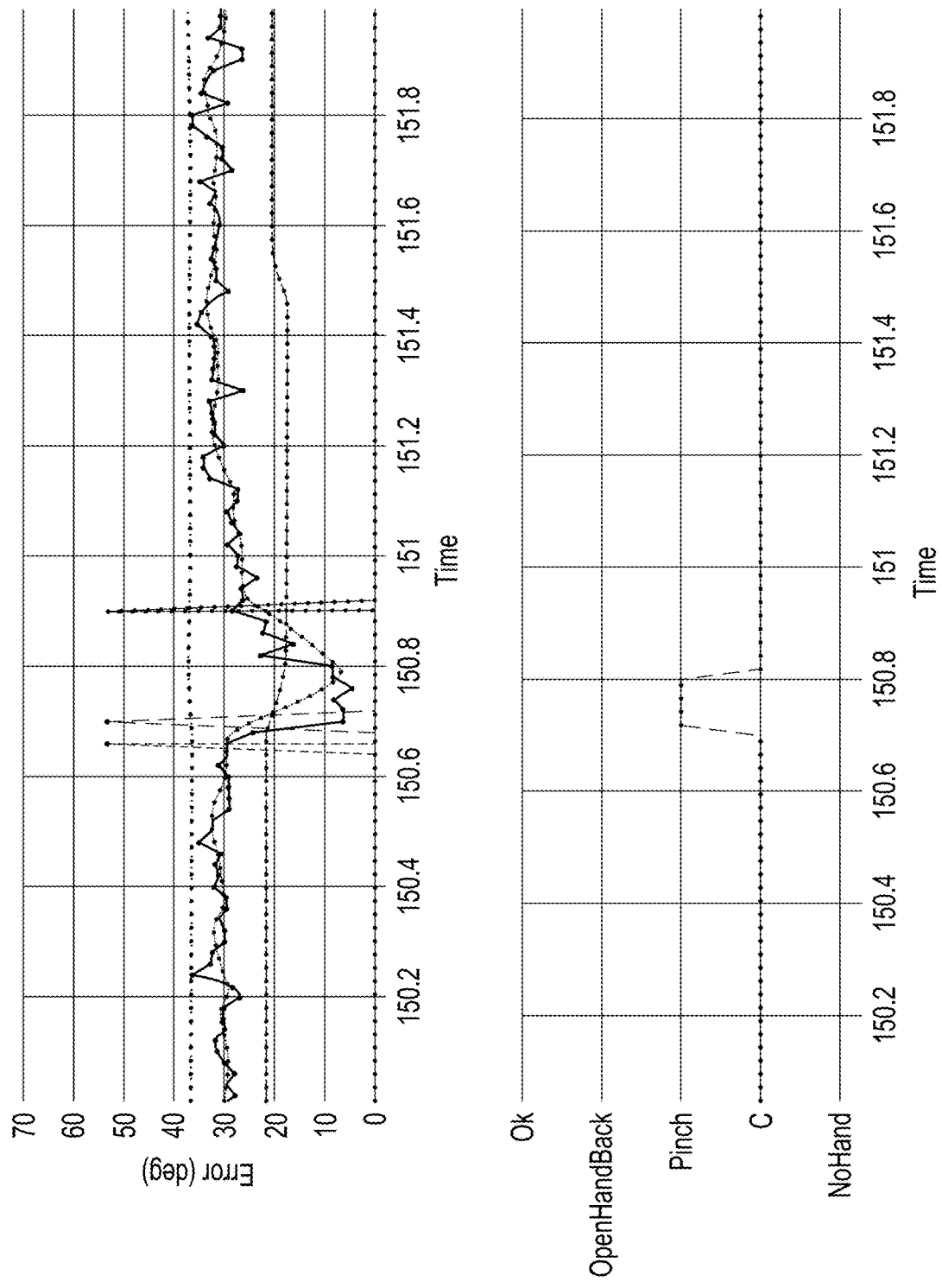
FIG. 16 illustrates example experimental data for detecting an action event while a user's hand is making a pinching gesture.

FIG. 16 illustrates example experimental data for detecting an action event while the user's hand is making the pinching gesture, in accordance with some embodiments of the present disclosure. The experimental data illustrated in FIG. 16 may correspond to the depicted movement of the user's hand in FIG. 15. In FIG. 16, the movement of the user's hand is characterized by the smoothed distance between the thumb and index finger. Noise is removed during low latency smoothing so that the remaining signal shows the inflection of the normalized, relative separation between paired finger features. The inflection as seen by a local minima followed by a local maxima, then immediately followed by a local minima can be used to recognize a tap action. Additionally, the same inflection pattern can be seen in the keypose state. Keypose A followed by keypose B then followed by A can also be used to recognize a tap action. In cases where the hand keypoints have low confidence, keypose inflection may be robust. In cases where keyposes have low confidence, the relative distance inflection can be used. In cases where confidence is high for both features changes both inflections can be used to recognize a tap action.

FIGS. 17A-17D illustrates example experimental data for detecting an action event while the user's hand is making the pinching gesture, in accordance with some embodiments of the present disclosure. The experimental data illustrated in FIGS. 17A-17D may correspond to the user's hand repeatedly making the movement shown in FIG. 15. FIG. 17A shows the distance between the tip of the user's index finger and the target content as the user's hand repeatedly approaches the target content. FIG. 17B shows the angular distance between the tip of the user's index finger and the tip of the user's thumb. FIG. 17C shows the angular velocity corresponding to the angle formed using the tip of the user's index finger and the tip of the user's thumb. FIG. 17D shows the keypose change determined based on various data, which optionally may include the data shown in FIGS.

17A-17C. The experimental data shown in FIGS. 17A-17D may be used to identify a tap action. In some embodiments, all feature inflections can be utilized concurrently or simultaneously to reduce false-positive recognition rates.

Figure 18:
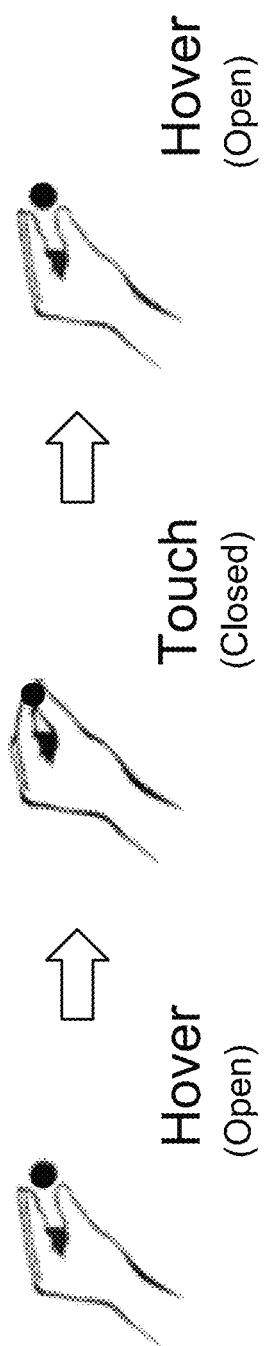
FIG. 18 illustrates an example scheme for detecting an action event while a user's hand is making a pinching gesture.

FIG. 18 illustrates an example scheme for detecting an action event while the user's hand is making the pinching gesture, in accordance with some embodiments of the present disclosure. FIG. 18 differs from FIG. 15 in that the user's middle finger, ring finger, and pinky finger are curled inward.

FIGS. 19A-19D illustrates example noisy experimental data for detecting an action event while the user's hand is making the pinching gesture, in accordance with some embodiments of the present disclosure. The experimental data illustrated in FIGS. 19A-19D may correspond to the user's hand repeatedly making the movement shown in FIG. 18. FIG. 19A shows the distance between the tip of the user's index finger and the target content. FIG. 19B shows the angular distance between the tip of the user's index finger and the tip of the user's thumb. FIG. 19C shows the angular velocity corresponding to the angle formed using the tip of the user's index finger and the tip of the user's thumb. FIG. 19D shows the keypose change determined based on various data, which optionally may include the data shown in FIGS. 19A-19C. The noisy experimental data shown in FIGS. 19A-19D may be used to identify a tap action, which is determined to occur within window 1902. This is representative of an edge case scenario that utilizes a determination of at least a medium confidence in all of the inflections to qualify as a recognized tap action.

Figure 20A:
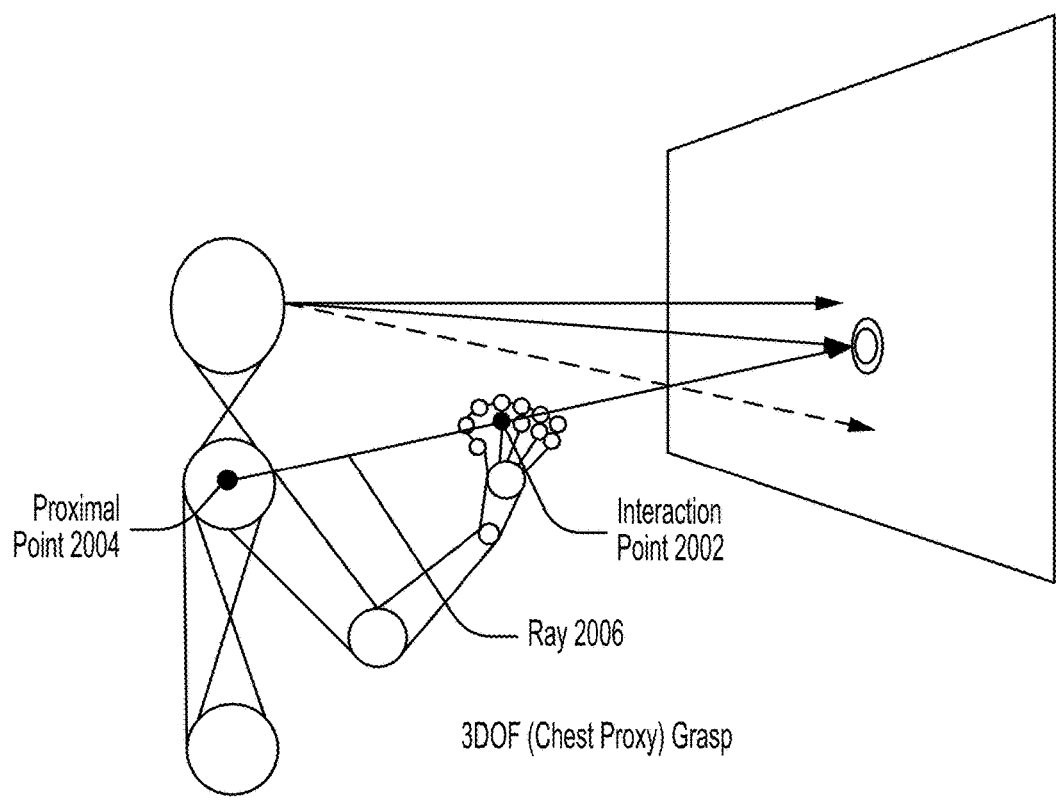
FIGS. 20A-20C illustrate an example scheme for managing a grasping gesture.
Figures 20B, 20C:
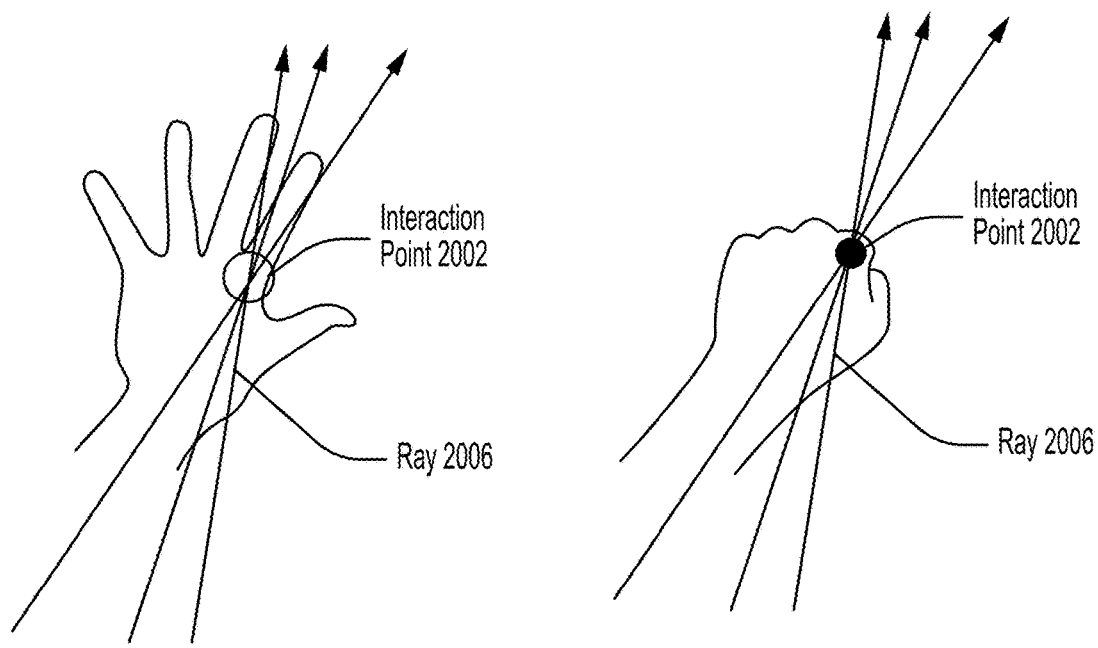

FIGS. 20A-20C illustrate an example scheme for managing the grasping gesture, in accordance with some embodiments of the present disclosure. A ray 2006 is cast from a proximal point 2004 (registered to a location on the user's shoulder) through an interaction point 2002 (registered to a location on the user's hand) as described herein. FIG. 20A shows a grasping gesture that enables a gross pointing mechanical action. This can be used for robust far-field targeting. FIG. 20B shows the size of the interaction point to be relative to the calculated hand radius as characterized by the relative distance between finger-tip features. FIG. 20C illustrates that as the hand changes from the open to first keyposes, the hand radius decrease so the size of the interaction point decreases proportionally.

Figure 21A:
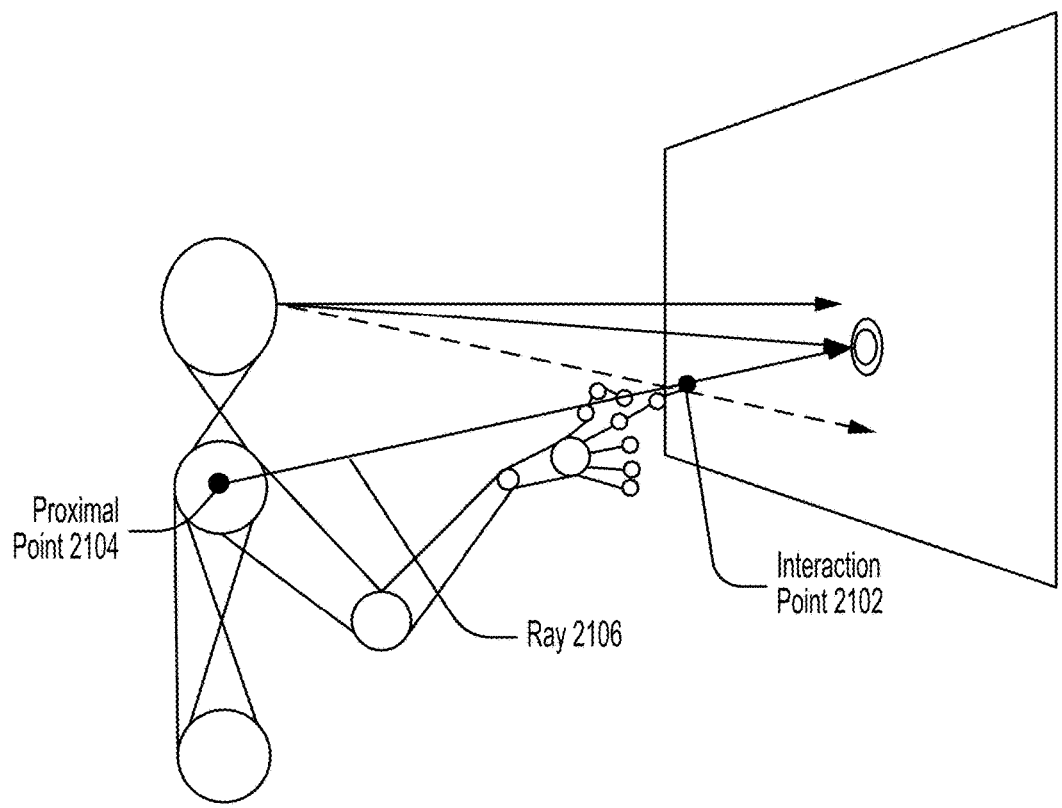
FIGS. 21A-21C illustrate an example scheme for managing a pointing gesture.
Figures 21B, 21C:
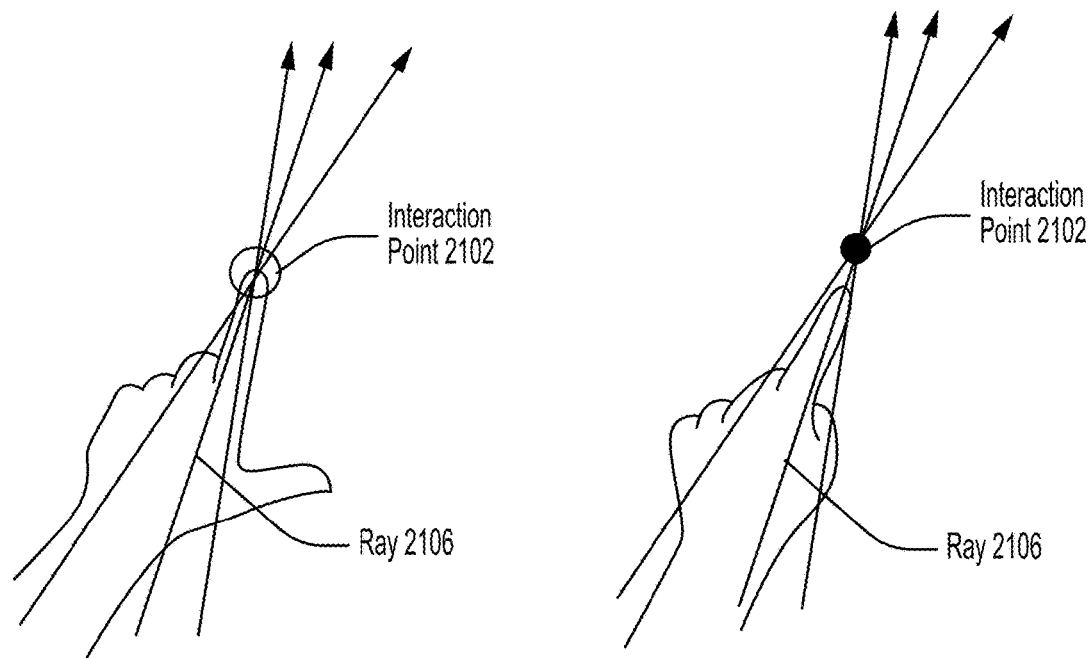

FIGS. 21A-21C illustrate an example scheme for managing the pointing gesture, in accordance with some embodiments of the present disclosure. A ray 2106 is cast from a proximal point 2104 (registered to a location on the user's shoulder) through an interaction point 2102 (registered to a location on the user's hand) as described herein. FIG. 21A shows a pointing and a selection mechanical action that leverages finger articulation for refined mid-field targeting. FIG. 21B shows a relaxed (open) pointing hand pose. The interaction point is placed at the index finger-tip. The relative distance between thumb and index fingertips is at a maximum, making the size of the interaction point proportionally large. FIG. 21C shows a (closed) pointing hand pose with the thumb curled under the index finger. The relative distance between the thumb and index finger-tip is at a minimum, resulting in a proportionally small interaction point size but still placed at the index tip.

Figure 22A:
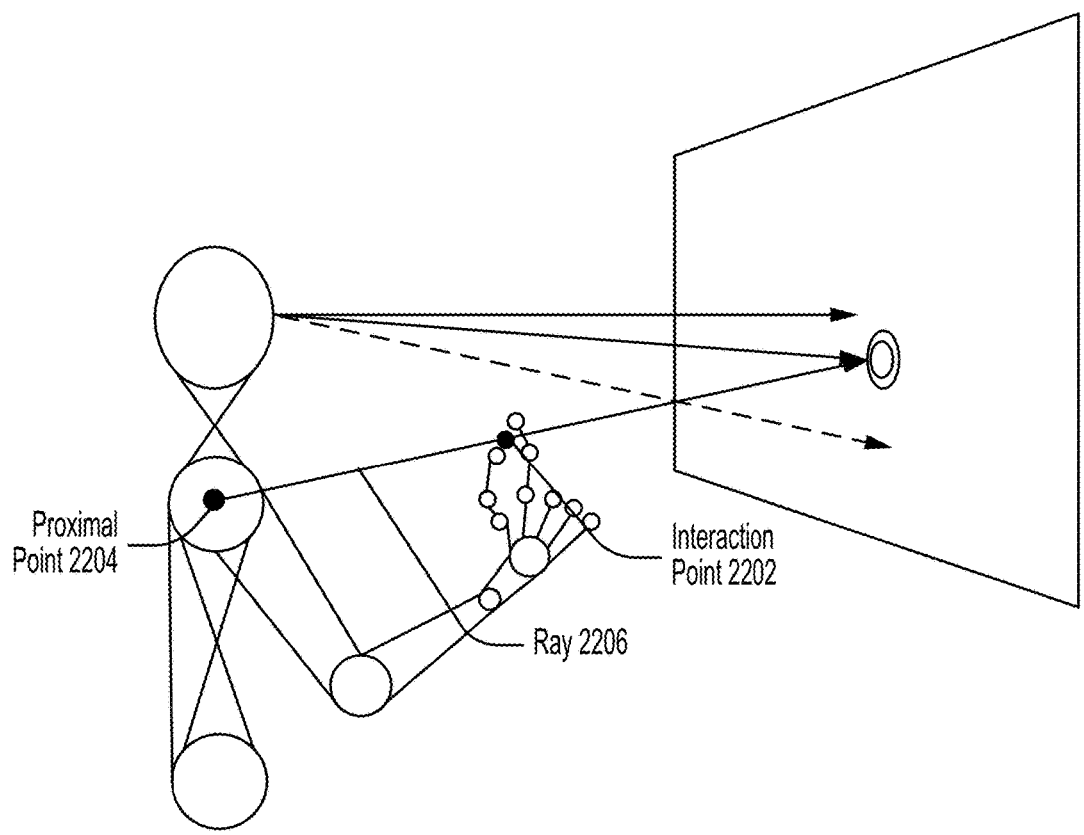
FIGS. 22A-22C illustrate an example scheme for managing a pinching gesture.
Figures 22B, 22C:
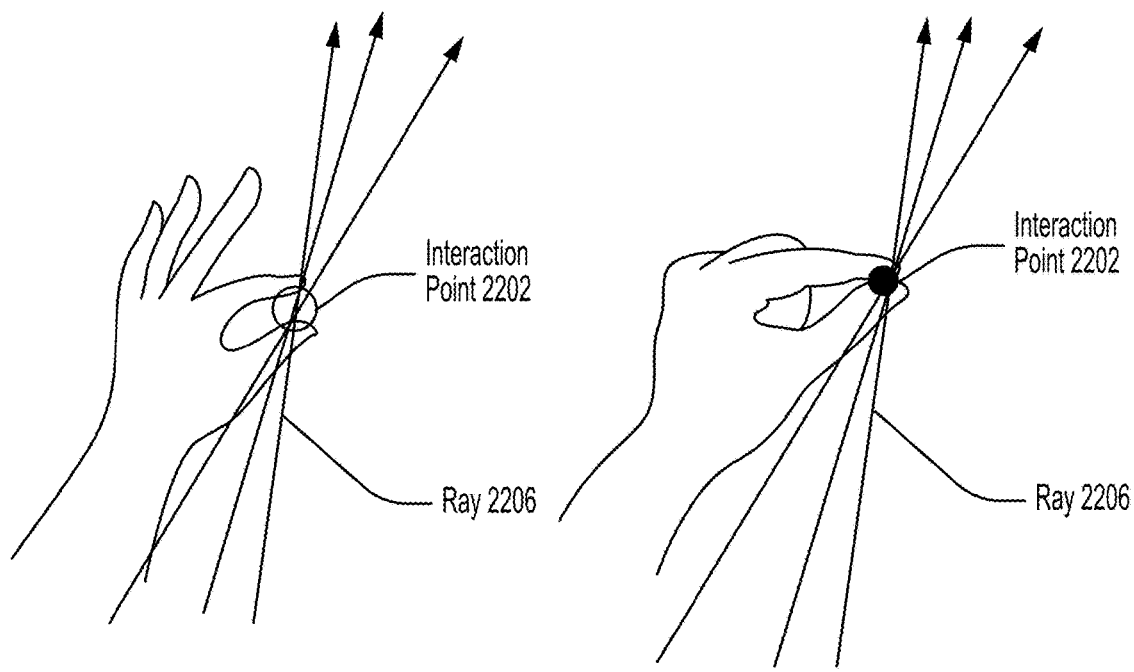

FIGS. 22A-22C illustrate an example scheme for managing the pinching gesture, in accordance with some embodiments of the present disclosure. A ray 2206 is cast from a proximal point 2204 (registered to a location on the user's shoulder) through an interaction point 2202 (registered to a location on the user's hand) as described herein. FIG. 22A shows a pointing and selection mechanical action that leverages finger articulation for refined mid-field targeting. FIG. 22B shows an open (OK) pinch pose. The interaction point is placed at the midpoint between the index fingertip and thumb as one of the multiple pinch styles enabled by the managed pinch pose. The relative distance between thumb and index fingertips is at a maximum making the size of the interaction point proportionally large. FIG. 22C shows a (closed) pinching hand pose with the middle, ring and pinky curled inwards with the index and thumb fingertips touching. The relative distance between the thumb and index finger-tip is at a minimum, resulting in a proportionally small interaction point size but still placed at the midpoint between the fingertips.

Figure 23:
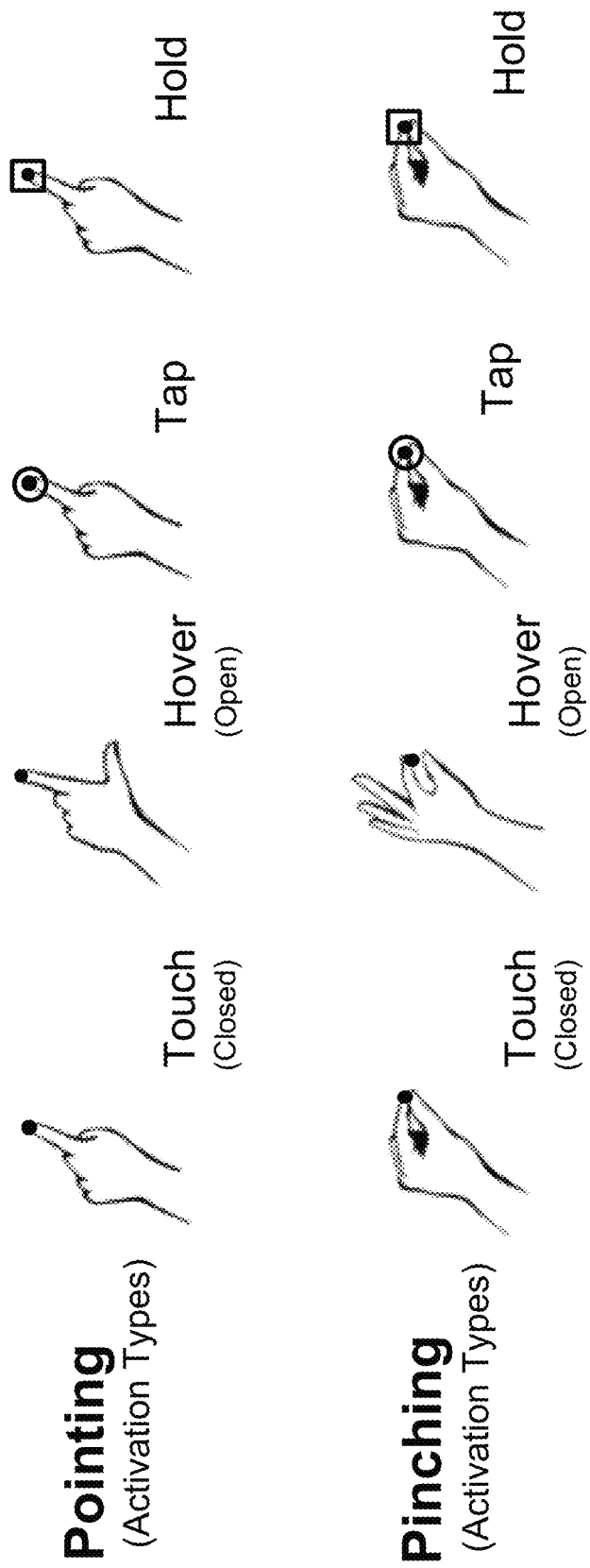
FIG. 23 illustrates various activation types for a pointing and pinching gestures.

FIG. 23 illustrates various activation types for the pointing and pinching gestures, in accordance with some embodiments of the present disclosure. For the pointing gesture, activation types include touch (closed), hover (open), tap, and hold. For the pinching gesture, the activation types include touch (closed), hover (open), tap and hold.

Figure 24:
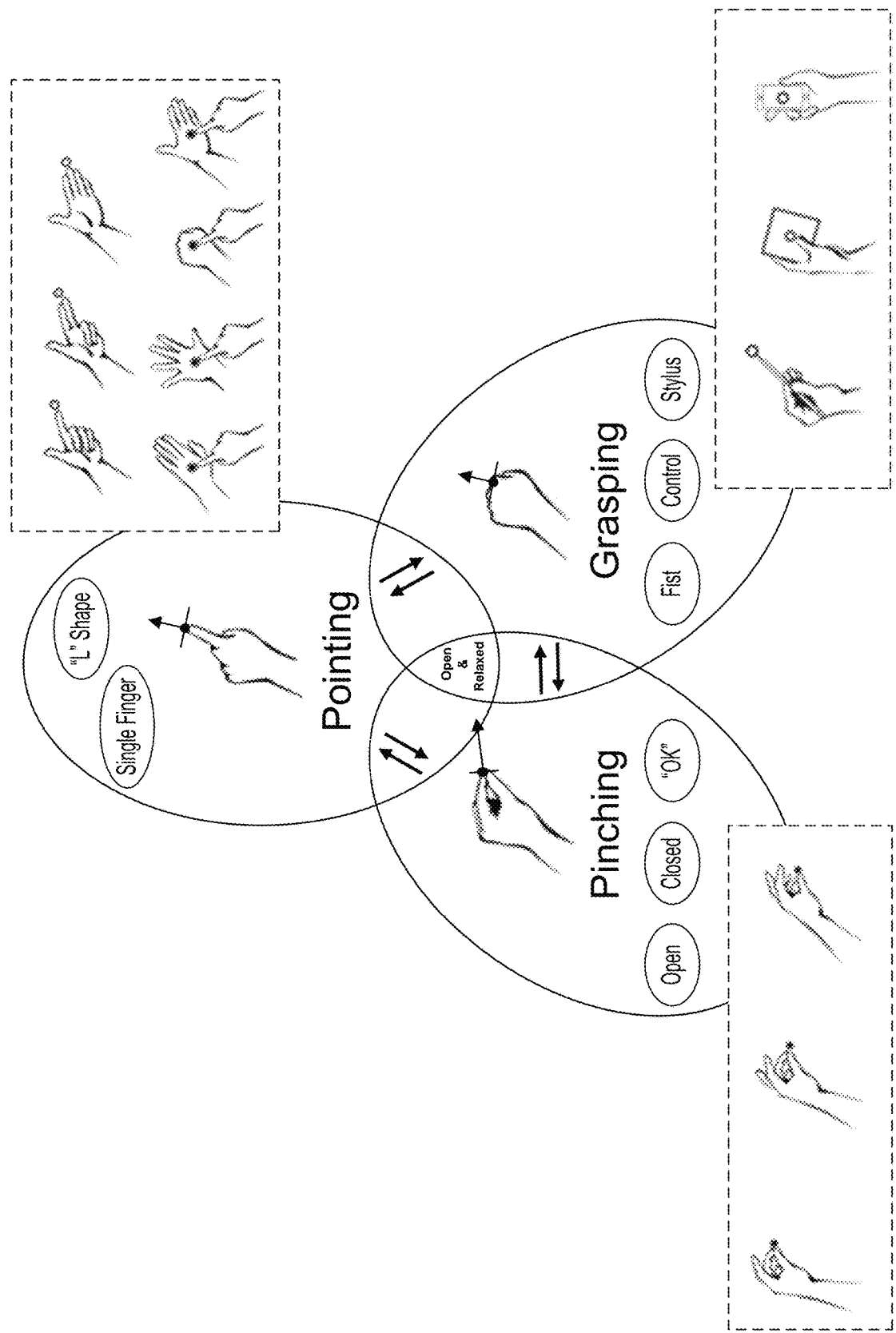
FIG. 24 illustrates various gestures and transitions between gestures.

FIG. 24 illustrates various gestures and transitions between gestures, in accordance with some embodiments of the present disclosure. In the illustrated example, the set of gestures includes the grasping gesture, the pointing gesture, and the pinching gesture, with transition states between each. Each of the gestures also include subgestures (or subposes) in which the determined gesture can be further specified by the wearable system. The grasping gesture may include a first subpose, a control subpose, and a stylus subpose, among other possibilities. The pointing gesture may include a single finger subpose and an "L" shape subpose, among other possibilities. The pinching gesture may include an open subpose, a closed subpose, and an "OK" subpose, among other possibilities.

Figure 25:
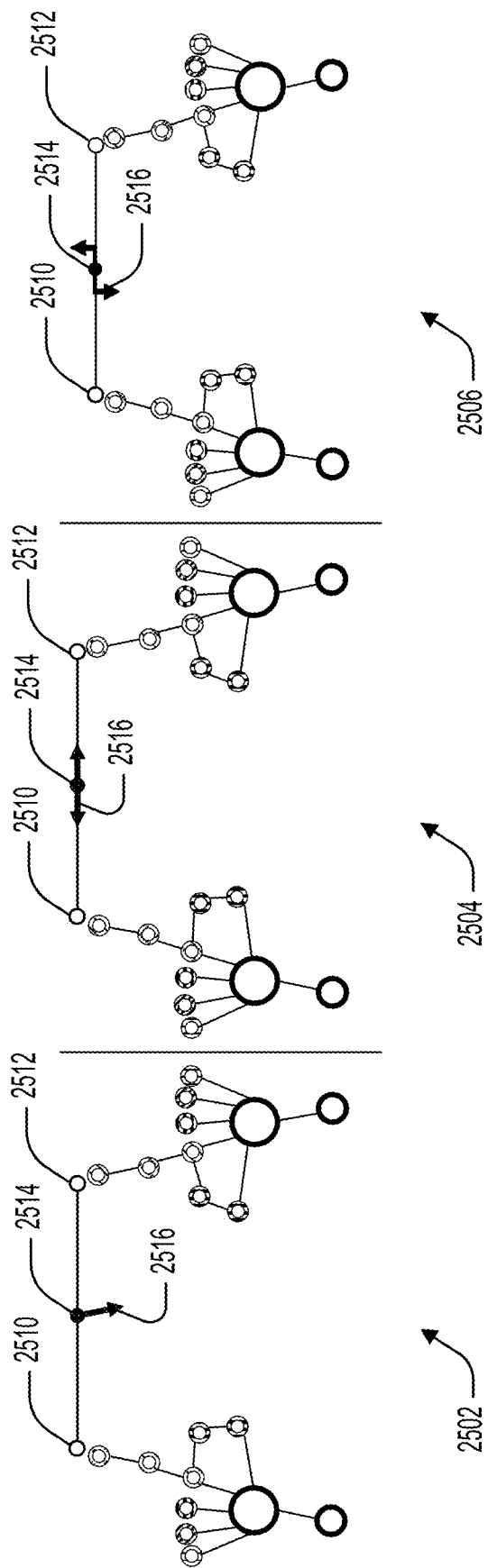
FIG. 25 illustrates examples of bimanual interaction.

FIG. 25 illustrates examples of bimanual interaction in which both of the user's hands are used to interact with a virtual object, in accordance with some embodiments of the present disclosure. In each of the illustrated examples, each of the user's hands is determined to be making the pointing gesture based on the keypoints of each respective hand. Interaction points 2510 and 2512 for both of the user's hands are determined based on the keypoints and the determined gesture of the respective hands. Interaction points 2510 and 2512 are used to determine a bimanual interaction point 2514, which may facilitate in selecting and targeting virtual objects for bimanual interaction. Bimanual interaction point 2514 may be registered to a location along the line (e.g., the midpoint) formed between interaction points 2510 and 2512.

In each of the illustrated examples, a delta 2516 is generated based on the movement of one or both of interaction points 2510 and 2512. At 2502, delta 2516 is a translation delta corresponding to a frame-to-frame translational movement of one or both of interaction points 2510 and 2512. At 2504, delta 2516 is a scaling delta corresponding to a frame-to-frame separation movement of one or both of interaction points 2510 and 2512. At 2506, delta 2516 is a rotation delta corresponding to a frame-to-frame rotational movement of one or both of interaction points 2510 and 2512.

Figure 26:
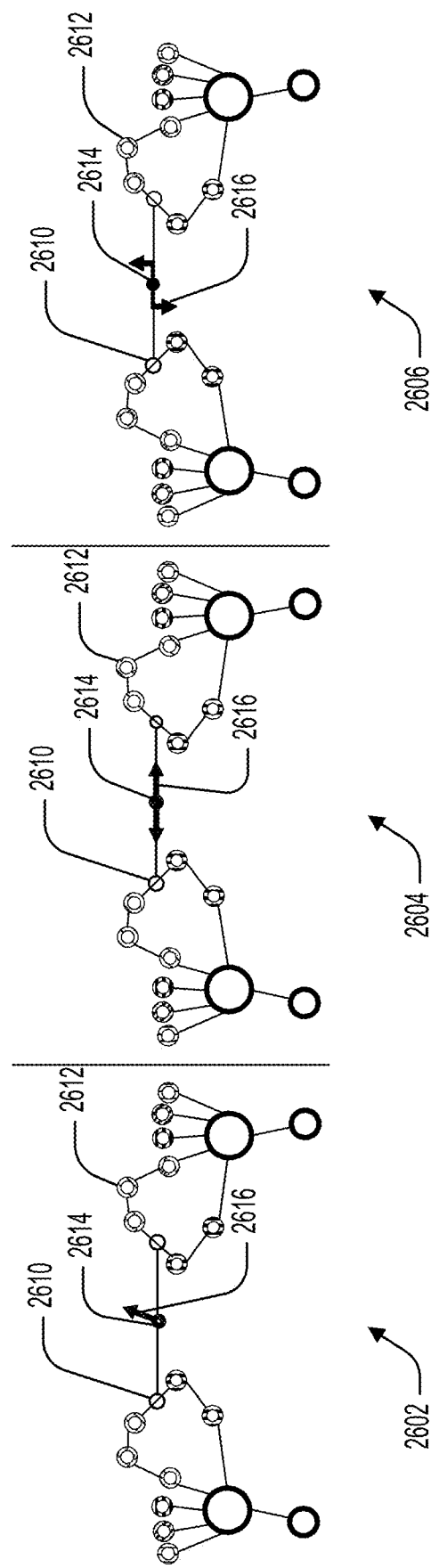
FIG. 26 illustrates examples of bimanual interaction.

FIG. 26 illustrates examples of bimanual interaction differing from FIG. 26 in that each of the user's hands is determined to be making the pinching gesture based on the keypoints of each respective hand. Interaction points 2610 and 2612 for both of the user's hands are determined based on the keypoints and the determined gesture of the respective hands. Interaction points 2610 and 2612 are used to determine a bimanual interaction point 2614, which may facilitate in selecting and targeting virtual objects for bimanual interaction. Bimanual interaction point 2614 may be registered to a location along the line (e.g., the midpoint) formed between interaction points 2610 and 2612.

In each of the illustrated examples, a delta 2616 is generated based on the movement of one or both of interaction points 2610 and 2612. At 2602, delta 2616 is a translation delta corresponding to a frame-to-frame translational movement of one or both of interaction points 2610 and 2612. At 2604, delta 2616 is a scaling delta corresponding to a frame-to-frame separation movement of one or both of interaction points 2610 and 2612. At 2606, delta 2616 is a rotation delta corresponding to a frame-to-frame rotational movement of one or both of interaction points 2610 and 2612.

Figure 27:
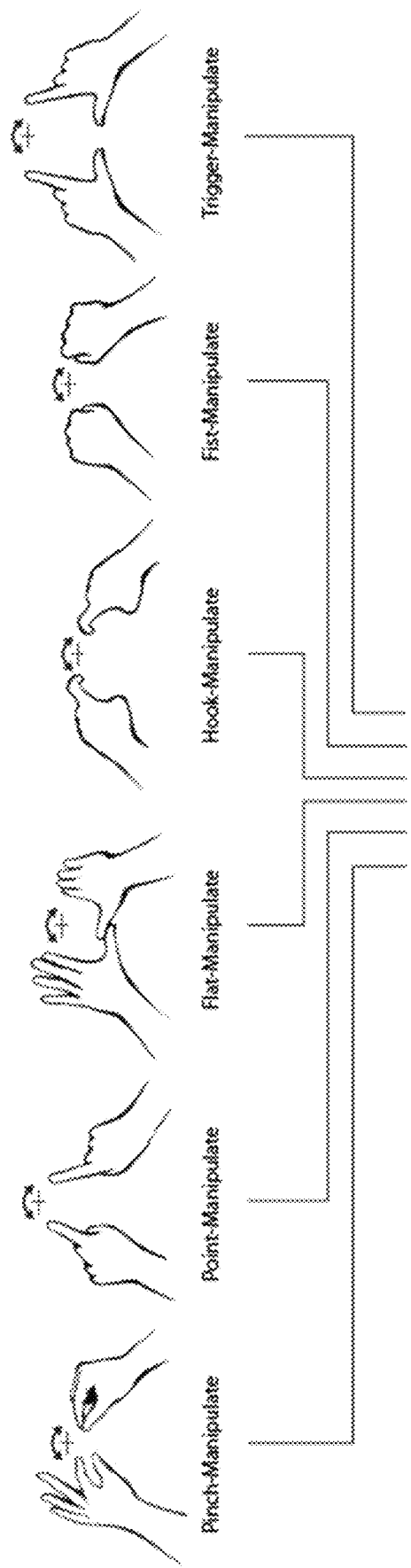
FIG. 27 illustrates various examples of cooperative bimanual interaction.

FIG. 27 illustrates various examples of cooperative bimanual interaction in which both hands cooperatively interact with virtual objects, in accordance with some embodiments of the present disclosure. The illustrated examples include pinch-manipulate, point-manipulate, flat-manipulate, hook-manipulate, fist-manipulate, and trigger-manipulate.

Figure 28:
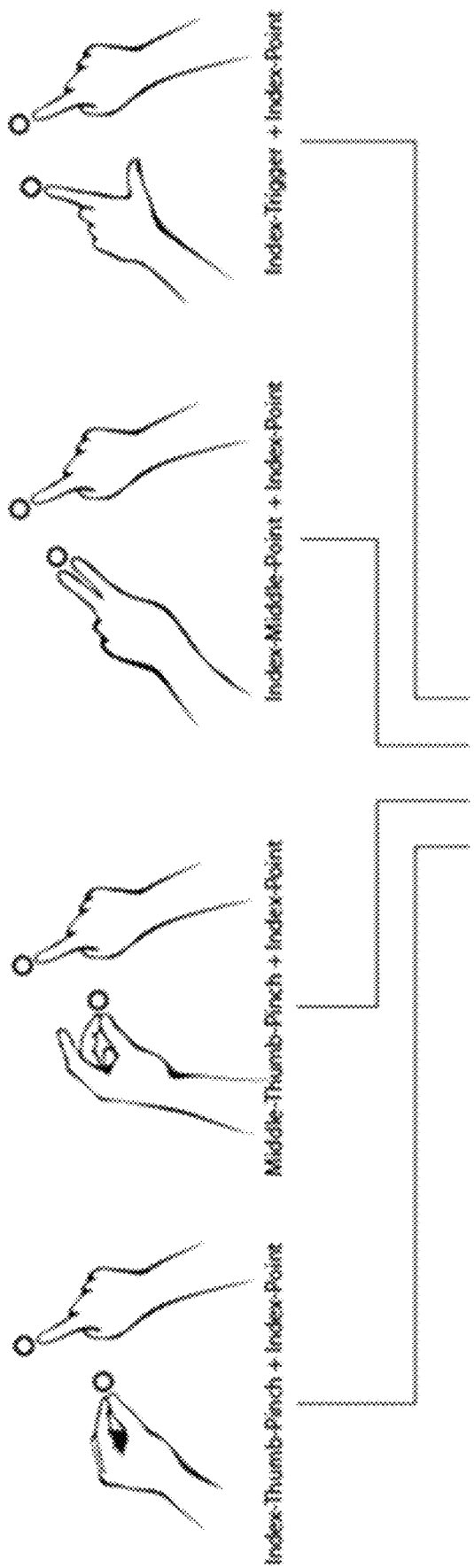
FIG. 28 illustrates examples of managed bimanual interaction.

FIG. 28 illustrates examples of managed bimanual interaction in which one hand manages how the other hand is interpreted, in accordance with some embodiments of the present disclosure. The illustrated examples include index-thumb-pinch+index-point, middle-thumb-pinch+index-point, index-middle-point+index-point, index-trigger+index-point.

FIG. 29 illustrates example manual interaction fields 2902 and bimanual interaction fields 2904, in accordance with some embodiments of the present disclosure. Each of interaction fields 2902 and 2904 includes a peripheral space, an extended workspace, a workspace, and a taskspace. Cameras of a wearable system may be oriented to capture one or both of the user's hands while operating within the various spaces based on whether the system is supporting manual or bimanual interaction.

Figure 30:
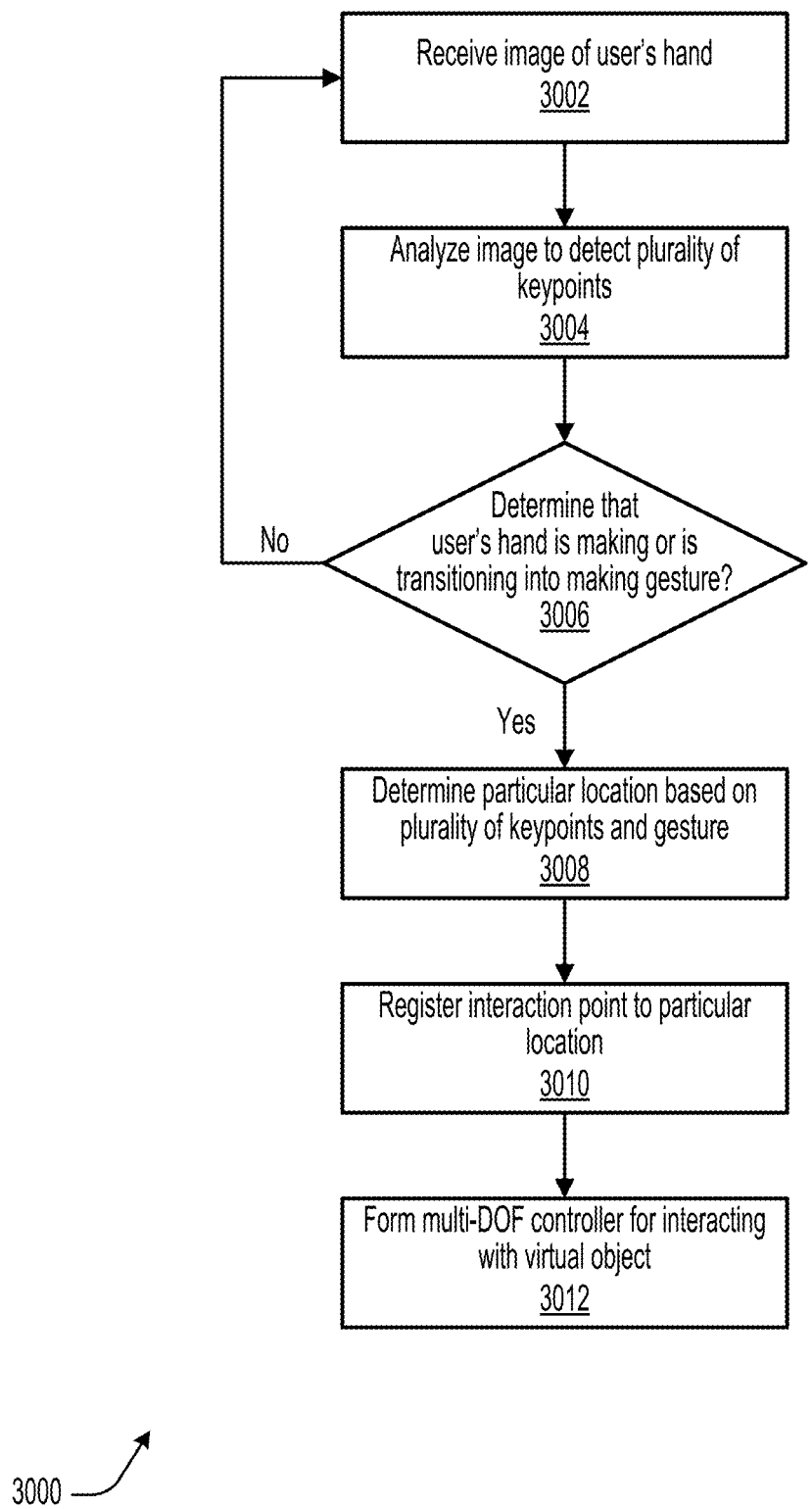
FIG. 30 illustrates a method of forming a multi-DOF controller associated with a user's hand for allowing a user to interact with a virtual object.

FIG. 30 illustrates a method 3000 of forming a multi-DOF controller associated with a user's hand for allowing the user to interact with a virtual object, in accordance with some embodiments of the present disclosure. One or more steps of method 3000 may be omitted during performance of method 3000, and steps of method 3000 need not be performed in the order shown. One or more steps of method 3000 may be performed by one or more processors of a wearable system, such as those included in processing module 250 of wearable system 200. Method 3000 may be implemented as a computer-readable medium or computer program product comprising instructions which, when the program is executed by one or more computers, cause the one or more computers to carry out the steps of method 3000. Such computer program products can be transmitted, over a wired or wireless network, in a data carrier signal carrying the computer program product.

At step 3002, an image of the user's hand is received. The image may be captured by an image capture device, which may be mounted to a wearable device. The image capture device may be a camera (e.g., a wide-angle lens camera, a fisheye lens camera, an infrared (IR) camera) or a depth sensor, among other possibilities.

At step 3004, the image is analyzed to detect a plurality of keypoints associated with a user's hand. The plurality of keypoints may be on or near the user's hand (within a threshold distance of the user's hand).

At step 3006, it is determined whether the user's hand is making or is transitioning into making any gesture from a plurality of gestures based on analyzing the image. The plurality of gestures may include a grasping gesture, a pointing gesture, and/or a pinching gesture, among other possibilities. If it is determined that the user's hand is making or is transitioning into making any gesture, method 3000 proceeds to step 3008. Otherwise, method 3000 returns to step 3002.

At step 3008, a particular location relative to the plurality of keypoints is determined. The particular location may be determined based on the plurality of keypoints and the gesture. As an example, the particular location may be set to the location of a first keypoint of the plurality of keypoints if the user's hand is determined to be making a first gesture of the plurality of gestures, and the particular location may be set to the location of a second keypoint of the plurality of keypoints if the user's hand is determined to be making a second gesture of the plurality of gestures. Continuing with the above example, the particular location may be set to a midpoint between the first keypoint and the second keypoint if the user's hand is determined to be making a third gesture of the plurality of gestures. Alternatively or additionally, the particular location may be set to a midpoint between a third keypoint and a fourth keypoint if the user's hand is determined to be making the third gesture.

At step 3010, an interaction point is registered to the particular location. Registering the interaction point to the particular location may include setting and/or moving the interaction point to the particular location. The interaction point (and similarly the particular location) may be a 3D value.

At step 3012, a multi-DOF controller for interacting with the virtual object is formed based on the interaction point. The multi-DOF controller may correspond to a ray that is cast through the interaction point from a proximal point. The ray may be used to perform various actions, such as: targeting, selecting, grabbing, scrolling, extracting, hovering, touching, tapping, and holding.

Figure 31:
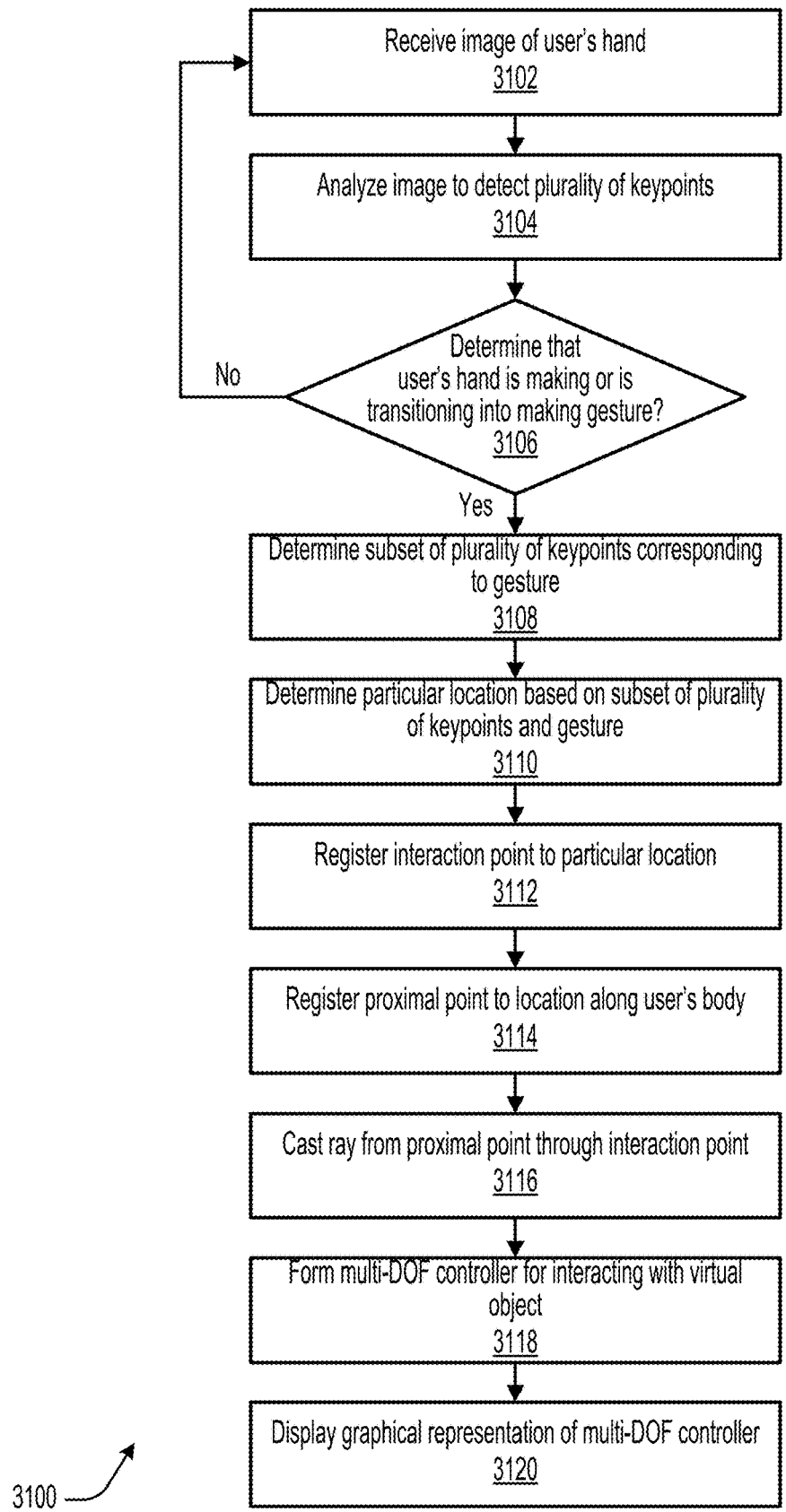
FIG. 31 illustrates a method of forming a multi-DOF controller associated with a user's hand for allowing a user to interact with a virtual object.

FIG. 31 illustrates a method 3100 of forming a multi-DOF controller associated with a user's hand for allowing the user to interact with a virtual object, in accordance with some embodiments of the present disclosure. One or more steps of method 3100 may be omitted during performance of method 3100, and steps of method 3100 need not be performed in the order shown. One or more steps of method 3100 may be performed by one or more processors of a wearable system, such as those included in processing module 250 of wearable system 200. Method 3100 may be implemented as a computer-readable medium or computer program product comprising instructions which, when the program is executed by one or more computers, cause the one or more computers to carry out the steps of method 3000. Such computer program products can be transmitted, over a wired or wireless network, in a data carrier signal carrying the computer program product.

At step 3102, an image of the user's hand is received. Step 3102 may be similar to step 3002 described in reference to FIG. 30.

At step 3104, the image is analyzed to detect a plurality of keypoints associated with a user's hand. Step 3104 may be similar to step 3004 described in reference to FIG. 30.

At step 3106, it is determined whether the user's hand is making or is transitioning into making any gesture from a plurality of gestures based on analyzing the image. Step 3106 may be similar to step 3006 described in reference to FIG. 30. If it is determined that the user's hand is making or is transitioning into making any gesture, method 3100 proceeds to step 3108. Otherwise, method 3100 returns to step 3102.

At step 3108, a subset of the plurality of keypoints that correspond to the particular gesture is selected. For example, a first subset of keypoints may correspond to a first gesture of the plurality of gestures and a second subset of keypoints may correspond to a second gesture of the plurality of gestures. Continuing with the above example, if it is determined that the user's hand is making the first gesture, the first subset of keypoints may be selected, or if it is determined that the user's hand is making the second gesture, the second subset of keypoints may be selected, At step 3110, a particular location relative to the subset of the plurality of keypoints is determined. The particular location may be determined based on the subset of the plurality of keypoints and the gesture. As an example, the particular location may be set to the location of a first keypoint of a first subset of the plurality of keypoints if the user's hand is determined to be making a first gesture of the plurality of gestures. As another example, the particular location may be set to the location of a second keypoint of a second subset of the plurality of keypoints if the user's hand is determined to be making a second gesture of the plurality of gestures.

At step 3112, an interaction point is registered to the particular location. Step 3112 may be similar to step 3010 described in reference to FIG. 30.

At step 3114, a proximal point is registered to a location along the user's body. The location to which the proximal point is registered may be at an estimated location of the user's shoulder, an estimated location of the user's elbow, or between the estimated location of the user's shoulder and the estimated location of the user's elbow.

At step 3116, a ray is cast from the proximal point through the interaction point.

At step 3118, a multi-DOF controller for interacting with the virtual object is formed based on the ray. The multi-DOF controller may correspond to the ray that is cast through the interaction point from the proximal point. The ray may be used to perform various actions, such as: targeting, selecting, grabbing, scrolling, extracting, hovering, touching, tapping, and holding.

At step 3120, a graphical representation of the multi-DOF controller is displayed by the wearable system.

Figure 32:
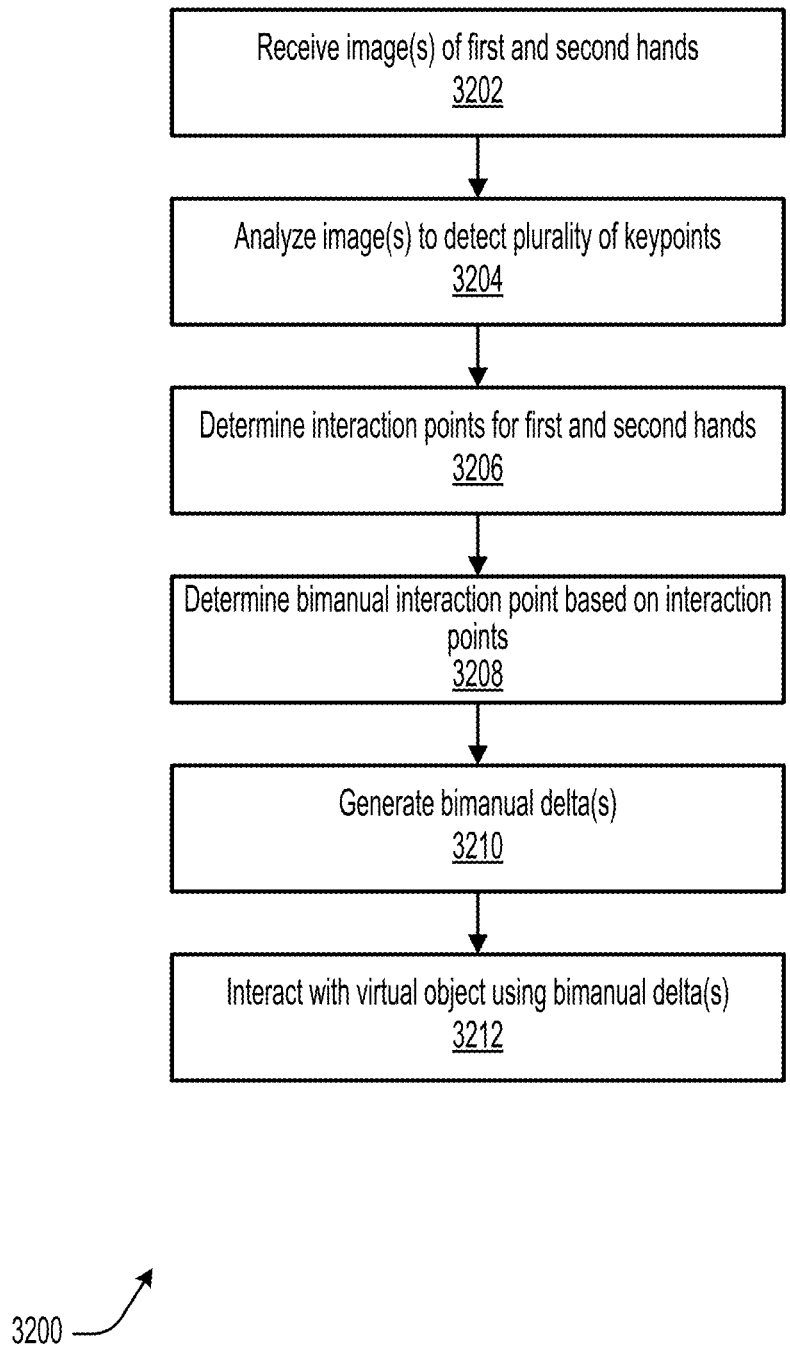
FIG. 32 illustrates a method of interacting with a virtual object using a bimanual input.

FIG. 32 illustrates a method 3200 of interacting with a virtual object using a bimanual input, in accordance with some embodiments of the present disclosure. One or more steps of method 3200 may be omitted during performance of method 3200, and steps of method 3200 need not be performed in the order shown. One or more steps of method 3200 may be performed by one or more processors of a wearable system, such as those included in processing module 250 of wearable system 200. Method 3200 may be implemented as a computer-readable medium or computer program product comprising instructions which, when the program is executed by one or more computers, cause the one or more computers to carry out the steps of method 3200. Such computer program products can be transmitted, over a wired or wireless network, in a data carrier signal carrying the computer program product.

At step 3202, one or more images of a first hand and a second hand of a user are received. Some of the one or more images may include both the first hand and the second hand and some may include only one of the hands. The one or more images may include a series of time-sequenced images. The one or more images may be captured by an image capture device, which may be mounted to a wearable device. The image capture device may be a camera (e.g., a wide-angle lens camera, a fisheye lens camera, an infrared (IR) camera) or a depth sensor, among other possibilities.

At step 3204, the one or more images are analyzed to detect a plurality of keypoints associated with each of the first hand and the second hand. For example, the one or more images may be analyzed to detect two separate sets of keypoints: a plurality of keypoints associated with the first hand and a plurality of keypoints associated with the second hand. Each plurality of keypoints may be on or near the respective hand (within a threshold distance of the respective hand). In some embodiments, a different plurality of keypoints may be detected for each time-sequenced image or each image frame.

At step 3206, an interaction point is determined for each of the first hand and the second hand based on the plurality of keypoints associated with each of the first hand and the second hand. For example, an interaction point for the first hand may be determined based on the plurality of keypoints associated with the first hand and an interaction point for the second hand may be determined based on the plurality of keypoints associated with the second hand. In some embodiments, it may be determined whether the first hand and the second hand are making (or are transitioning into making) a particular gesture from a plurality of gestures. Based on the particular gesture for each of the hands, the interaction point for each of the hands may be registered to a particular location, as described herein.

At step 3208, a bimanual interaction point is determined based on the interaction points for the first hand and the second hand. In some embodiments, the bimanual interaction point may be the average position of the interaction points. For example, a line may be formed between the interaction points and the bimanual interaction point may be registered to a point along the line (e.g., the midpoint). The location to which the bimanual interaction point is registered may also be determined based on the gesture that each hand is making (or is transitioning into making). For example, if one hand is making the pointing gesture and the other hand is making the grasping gesture or the pinching gesture, the bimanual interaction point may be registered to whichever hand is making the pointing gesture. As another example, if both hands are making the same gesture (e.g., the pinching gesture), the bimanual interaction point may be registered to a midpoint between the interaction points.

At step 3210, one or more bimanual deltas may be generated based on the interaction point for each of the first hand and the second hand. In some embodiments, the one or more bimanual deltas may be generated based on the movement (e.g., frame-to-frame movement) of the interaction points. For example, the one or more bimanual deltas may include a translation delta, a rotation delta, and/or a scaling delta. The translation delta may correspond to the translational movement of one or both of the interaction points, the rotation delta may correspond to the rotational movement of one or both of the interaction points, and the scaling delta may correspond to the separation movement of one or both of the interaction points.

In one example, a set of time-sequenced images may be analyzed to determine that the interaction points for the first hand and the second hand are moving closer together. In response, a scaling delta may be generated with a negative value to indicate that the interaction points are moving closer together. In another example, a set of time-sequenced images may be analyzed to determine that the interaction points are moving further apart, and a scaling delta may be generated with a positive value to indicate that the interaction points are moving further apart.

In another example, a set of time-sequenced images may be analyzed to determine that the interaction points for the first hand and the second hand are both moving in the positive X direction. In response, a translation delta may be generated to indicate that the interaction points are moving in the positive X direction. In another example, a set of time-sequenced images may be analyzed to determine that the interaction points for the first hand and the second hand are rotating with respect to each other (e.g., a line formed between the interaction points is rotating). In response, a rotation delta may be generated to indicate that the interaction points are rotating with respect to each other.

In some embodiments, bimanual deltas may be generated based on one of the interaction points and an established plane. For example, a plane may be established based on the user's hand, the head pose, the user's hip, a real-world object, a virtual object, among other possibilities. Upon establishing the plane, a translation delta may be generated based on a projection of the interaction point onto the plane, a rotation delta may be generated based on a rotation of the interaction point with respect to the plane, and a scaling delta may be generated based on a distance between the interaction point and the plane. In some examples, these deltas may be referred to as planar deltas.

The above-described examples of bimanual deltas may be generated for the same set of time-sequenced images. For example, bimanual deltas including a translation delta, a rotation delta, and a scaling delta may be generated for a single set of time-sequenced images. In some examples, only a specific type of bimanual delta may be generated based on the requirements of a particular application. For example, a user may initiate a scaling operation while keeping the position and the orientation of a virtual object fixed. In response, only scaling deltas may be generated while translation and rotation deltas may not be generated. As another example, a user may initiate a translation operation and rotation operation while keeping the size of a virtual object fixed. In response, only translation and rotation deltas may be generated while scaling deltas may not be generated. Other possibilities are contemplated.

At step 3212, the virtual object is interacted with using the one or more bimanual deltas. The virtual object may be interacted with by applying the one or more bimanual deltas to the virtual object by, for example, moving the virtual object using the one or more bimanual deltas. For example, applying a translation delta to the virtual object may cause the virtual object to translate by a particular amount indicated by the translation delta, applying a rotation delta to the virtual object may cause the virtual object to rotate by a particular amount indicated by the rotation delta, and applying a scaling delta to the virtual object may cause the virtual object to scale/resize by a particular amount indicated by the scaling delta.

In some embodiments, prior to interacting with the virtual object, it may be determined whether the virtual object is being targeted. In some instances, it may be determined whether the bimanual interaction point overlaps with or is within a threshold distance of the virtual object. In some embodiments, it may be determined whether the virtual object is currently selected or was previously selected by, for example, using a manual interaction as described herein. In one example, the virtual object may first be selected using a manual interaction and subsequently be interacted with using a bimanual interaction.

Figure 33:
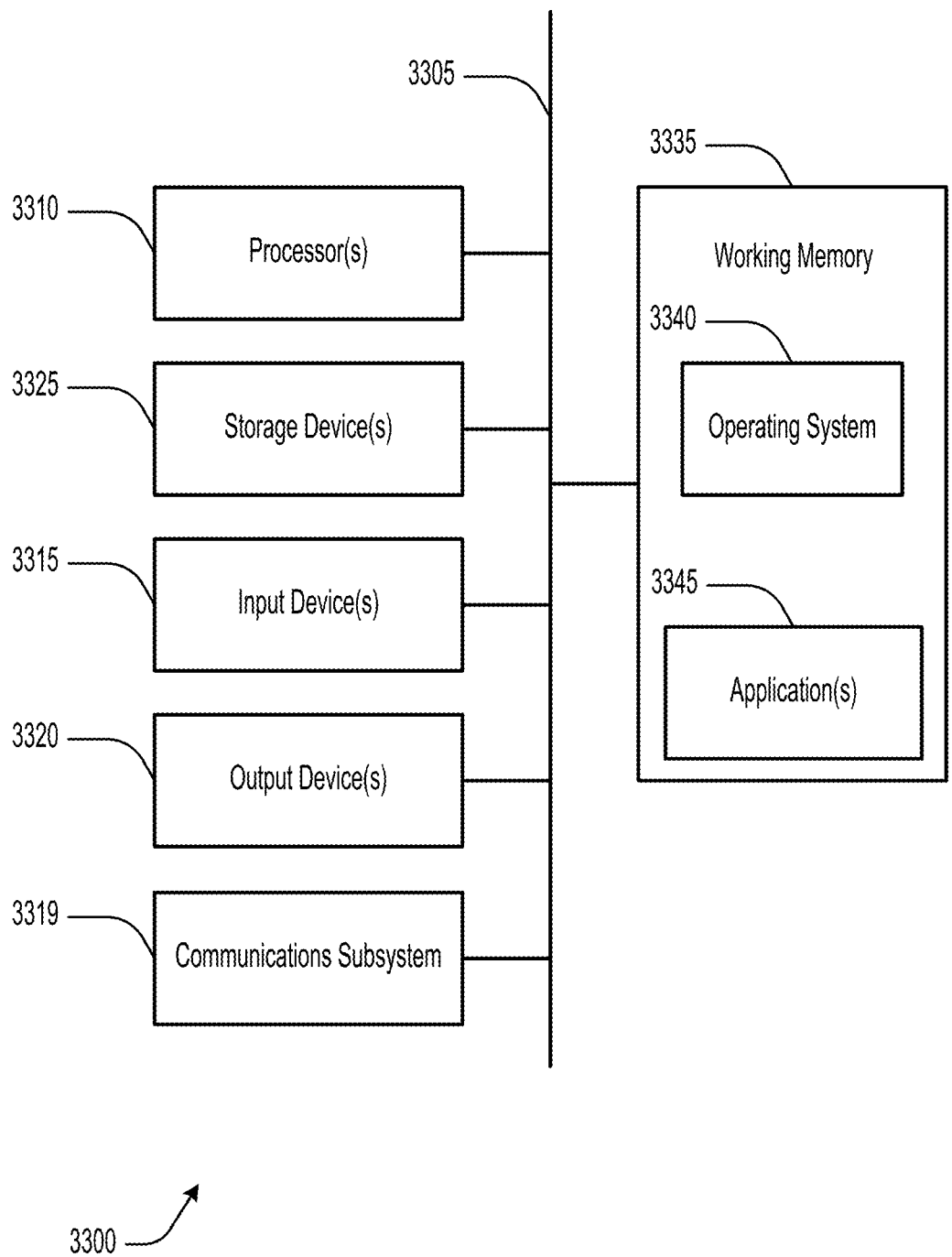
FIG. 33 illustrates a simplified computer system.

FIG. 33 illustrates a simplified computer system 3300, in accordance with some embodiments of the present disclosure. Computer system 3300 as illustrated in FIG. 33 may be incorporated into devices described herein. FIG. 33 provides a schematic illustration of one embodiment of computer system 3300 that can perform some or all of the steps of the methods provided by various embodiments. It should be noted that FIG. 33 is meant only to provide a generalized illustration of various components, any or all of which may be utilized as appropriate. FIG. 33, therefore, broadly illustrates how individual system elements may be implemented in a relatively separated or relatively more integrated manner.

Computer system 3300 is shown including hardware elements that can be electrically coupled via a bus 3305, or may otherwise be in communication, as appropriate. The hardware elements may include one or more processors 3310, including without limitation one or more general-purpose processors and/or one or more special-purpose processors such as digital signal processing chips, graphics acceleration processors, and/or the like; one or more input devices 3315, which can include without limitation a mouse, a keyboard, a camera, and/or the like; and one or more output devices 3320, which can include without limitation a display device, a printer, and/or the like.

Computer system 3300 may further include and/or be in communication with one or more non-transitory storage devices 3325, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 3300 might also include a communications subsystem 3319, which can include without limitation a modem, a network card (wireless or wired), an infrared communication device, a wireless communication device, and/or a chipset such as a Bluetooth™ device, an 802.11 device, a WiFi™ device, a WiMax™ device, cellular communication facilities, etc., and/or the like. The communications subsystem 3319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 3319. In other embodiments, a portable electronic device, e.g., the first electronic device, may be incorporated into computer system 3300, e.g., an electronic device as an input device 3315. In some embodiments, computer system 3300 will further include a working memory 3335, which can include a RAM or ROM device, as described above.

Computer system 3300 also can include software elements, shown as being currently located within the working memory 3335, including an operating system 3340, device drivers, executable libraries, and/or other code, such as one or more application programs 3345, which may include computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 3325 described above. In some cases, the storage medium might be incorporated within a computer system, such as computer system 3300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 3300 and/or might take the form of source and/or installable code, which, upon compilation and/or installation on computer system 3300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 3300 to perform methods in accordance with various embodiments of the technology. According to a set of embodiments, some or all of the procedures of such methods are performed by computer system 3300 in response to processor 3310 executing one or more sequences of one or more instructions, which might be incorporated into the operating system 3340 and/or other code, such as an application program 3345, contained in the working memory 3335. Such instructions may be read into the working memory 3335 from another computer-readable medium, such as one or more of the storage device(s) 3325. Merely by way of example, execution of the sequences of instructions contained in the working memory 3335 might cause the processor(s) 3310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 3300, various computer-readable media might be involved in providing instructions/code to processor(s) 3310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 3325. Volatile media include, without limitation, dynamic memory, such as the working memory 3335.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 3310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 3300.

The communications subsystem 3319 and/or components thereof generally will receive signals, and the bus 3305 then might carry the signals and/or the data, instructions, etc. carried by the signals to the working memory 3335, from which the processor(s) 3310 retrieves and executes the instructions. The instructions received by the working memory 3335 may optionally be stored on a non-transitory storage device 3325 either before or after execution by the processor(s) 3310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes one or more of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of interacting with a virtual object, the method comprising:
   receiving an image of a user's hand from one or more image capture devices of a wearable system;
   analyzing the image to detect a plurality of keypoints associated with the user's hand;
   determining, based on analyzing the image, whether the user's hand is making or is transitioning into making a particular gesture from a plurality of gestures;
   in response to determining that the user's hand is making or is transitioning into making the particular gesture:
      selecting a subset of the plurality of keypoints that correspond to the particular gesture;
      determining a particular location relative to the subset of the plurality of keypoints, wherein the particular location is determined based on the subset of the plurality of keypoints and the particular gesture;
      registering an interaction point to the particular location;
      registering a proximal point to a location along the user's body;
      casting a ray from the proximal point through the interaction point; and
      forming a multi-DOF controller for interacting with the virtual object based on the ray;
   determining an angle associated with at least three keypoints from the plurality of keypoints, wherein the angle is between (i) a first line connecting a tip of a thumb and a midpoint between two keypoints on the thumb and an index finger and (ii) a second line connecting a tip of the index finger and the midpoint between the two keypoints on the thumb and the index finger;
   detecting an action event associated with the multi-DOF controller based on the angle transitioning from being outside a particular range to being within the particular range;
   determining that the angle continues to be within the particular range while the ray is moving; and
   based on determining that the angle continues to be within the particular range while the ray is moving, causing the virtual object to move in accordance with a movement of the ray.

2. The method of claim 1, wherein the plurality of gestures includes at least one of a grasping gesture, a pointing gesture, or a pinching gesture.

3. The method of claim 1, wherein the subset of the plurality of keypoints is selected from a plurality of subsets of the plurality of keypoints, wherein each of the plurality of subsets of the plurality of keypoints corresponds to a different gesture from the plurality of gestures.

4. The method of claim 1, further comprising:
   displaying a graphical representation of the multi-DOF controller.

5. The method of claim 1, wherein the location to which the proximal point is registered is at an estimated location of the user's shoulder, an estimated location of the user's elbow, or between the estimated location of the user's shoulder and the estimated location of the user's elbow.

6. The method of claim 1, further comprising:
   capturing, by an image capture device of the one or more image capture devices, the image of the user's hand.

7. The method of claim 6, wherein the image capture device is mounted to a headset of a wearable system.

8. A system comprising:
   one or more processors; and
   a machine-readable medium comprising instructions that, when executed by the one or more processors, cause the one or more processors to perform operations comprising:
      receiving an image of a user's hand from one or more image capture devices of a wearable system;
      analyzing the image to detect a plurality of keypoints associated with the user's hand;
      determining, based on analyzing the image, whether the user's hand is making or is transitioning into making a particular gesture from a plurality of gestures;
      in response to determining that the user's hand is making or is transitioning into making the particular gesture:
         selecting a subset of the plurality of keypoints that correspond to the particular gesture;
         determining a particular location relative to the subset of the plurality of keypoints, wherein the particular location is determined based on the subset of the plurality of keypoints and the particular gesture;
         registering an interaction point to the particular location;
         registering a proximal point to a location along the user's body;
         casting a ray from the proximal point through the interaction point; and
         forming a multi-DOF controller for interacting with a virtual object based on the ray;
      determining an angle associated with at least three keypoints from the plurality of keypoints, wherein the angle is between (i) a first line connecting a tip of a thumb and a midpoint between two keypoints on the thumb and an index finger and (ii) a second line connecting a tip of the index finger and the midpoint between the two keypoints on the thumb and the index finger;

detecting an action event associated with the multi-DOF controller based on the angle transitioning from being outside a particular range to being within the particular range;

determining that the angle continues to be within the particular range while the ray is moving; and based on determining that the angle continues to be within the particular range while the ray is moving, causing the virtual object to move in accordance with a movement of the ray.

9. The system of claim 8, wherein the plurality of gestures includes at least one of a grasping gesture, a pointing gesture, or a pinching gesture.

10. The system of claim 8, wherein the subset of the plurality of keypoints is selected from a plurality of subsets of the plurality of keypoints, wherein each of the plurality of subsets of the plurality of keypoints corresponds to a different gesture from the plurality of gestures.

11. The system of claim 8, wherein the operations further comprise:

displaying a graphical representation of the multi-DOF controller.

12. The system of claim 8, wherein the location to which the proximal point is registered is at an estimated location of the user's shoulder, an estimated location of the user's elbow, or between the estimated location of the user's shoulder and the estimated location of the user's elbow.

13. The system of claim 8, wherein the operations further comprise:

capturing, by an image capture device of the one or more image capture devices, the image of the user's hand.

14. The system of claim 13, wherein the image capture device is mounted to a headset of a wearable system.

15. A non-transitory machine-readable medium comprising instructions that, when executed by one or more processors, cause the one or more processors to perform operations comprising:

receiving an image of a user's hand from one or more image capture devices of a wearable system;

analyzing the image to detect a plurality of keypoints associated with the user's hand;

determining, based on analyzing the image, whether the user's hand is making or is transitioning into making a particular gesture from a plurality of gestures; and in response to determining that the user's hand is making or is transitioning into making the particular gesture:

selecting a subset of the plurality of keypoints that correspond to the particular gesture;

determining a particular location relative to the subset of the plurality of keypoints, wherein the particular location is determined based on the subset of the plurality of keypoints and the particular gesture;

registering an interaction point to the particular location;

registering a proximal point to a location along the user's body;

casting a ray from the proximal point through the interaction point; and forming a multi-DOF controller for interacting with a virtual object based on the ray;

determining an angle associated with at least three keypoints from the plurality of keypoints, wherein the angle is between (i) a first line connecting a tip of a thumb and a midpoint between two keypoints on the thumb and an index finger and (ii) a second line connecting a tip of the index finger and the midpoint between the two keypoints on the thumb and the index finger;

detecting an action event associated with the multi-DOF controller based on the angle transitioning from being outside a particular range to being within the particular range;

determining that the angle continues to be within the particular range while the ray is moving; and based on determining that the angle continues to be within the particular range while the ray is moving, causing the virtual object to move in accordance with a movement of the ray.

16. The non-transitory machine-readable medium of claim 15, wherein the plurality of gestures includes at least one of a grasping gesture, a pointing gesture, or a pinching gesture.

17. The non-transitory machine-readable medium of claim 15, wherein the subset of the plurality of keypoints is selected from a plurality of subsets of the plurality of keypoints, wherein each of the plurality of subsets of the plurality of keypoints corresponds to a different gesture from the plurality of gestures.

18. The non-transitory machine-readable medium of claim 15, wherein the operations further comprise:

displaying a graphical representation of the multi-DOF controller.

19. The non-transitory machine-readable medium of claim 15, wherein the location to which the proximal point is registered is at an estimated location of the user's shoulder, an estimated location of the user's elbow, or between the estimated location of the user's shoulder and the estimated location of the user's elbow.

20. The non-transitory machine-readable medium of claim 15, wherein the operations further comprise:

capturing, by an image capture device of the one or more image capture devices, the image of the user's hand.

* * * * *